US008012019B2

(12) United States Patent
Escalera et al.

(10) Patent No.: US 8,012,019 B2
(45) Date of Patent: *Sep. 6, 2011

(54) 3-D TEXT IN A GAMING MACHINE

(75) Inventors: Anthony Escalera, Sparks, NV (US); Robert E. Breckner, Reno, NV (US); Greg A. Schlottmann, Sparks, NV (US); Alexey Kryuchkov, Reno, NV (US); Serge Antonov, Rose Bay (AU); Steven G. LeMay, Reno, NV (US)

(73) Assignee: IGT, Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/101,921

(22) Filed: Apr. 11, 2008

(65) Prior Publication Data

US 2008/0188304 A1 Aug. 7, 2008

Related U.S. Application Data

(63) Continuation of application No. 10/676,719, filed on Sep. 30, 2003, now Pat. No. 7,367,885, which is a continuation-in-part of application No. 09/927,901, filed on Aug. 9, 2001, now Pat. No. 6,887,157.

(60) Provisional application No. 60/414,982, filed on Sep. 30, 2002.

(51) Int. Cl.
*A63F 9/24* (2006.01)
*A63F 13/00* (2006.01)

(52) U.S. Cl. ................. 463/32; 463/16; 463/31; 463/33

(58) Field of Classification Search ............... 463/31–32
See application file for complete search history.

(56) References Cited

U.S. PATENT DOCUMENTS 4,332,389 A 6/1982 Loyd, Jr. et al.
(Continued)

FOREIGN PATENT DOCUMENTS

AU 200179477 5/2002
(Continued)

OTHER PUBLICATIONS

Microsoft Press Computer Dictionary Third Edition Redmond, WA 1997 p. 406.

(Continued)

*Primary Examiner* — Melba Bumgarner
*Assistant Examiner* — Steven J. Hylinski
(74) *Attorney, Agent, or Firm* — Weaver Austin Villeneuve & Sampson LLP

(57) ABSTRACT

Methods and apparatus on a gaming machine for presenting a plurality of game outcome presentations derived from one or more virtual 3-D gaming environments stored on the gaming machine are described. While a game of chance is being played on the gaming machine, two-dimensional images derived from a 3-D object in the 3-D gaming environment may be rendered to a display screen on the gaming machine in real-time as part of a game outcome presentation. The 3-D objects in the 3-D gaming environment may include 3-D texts objects that are used to display text to the display screen of the gaming machine as part of the game outcome presentation. Apparatus and methods are described for generating and displaying information in a textual format that is compatible with a 3-D graphical rendering system. In particular, font generation and typesetting methods that are applicable in a 3-D gaming environment are described.

16 Claims, 16 Drawing Sheets

U.S. PATENT DOCUMENTS

| | | | | | |
|---|---|---|---|---|---|
| 4,365,810 | A | | 12/1982 | Richardson | |
| 4,373,726 | A | | 2/1983 | Churchill et al. | |
| 4,455,025 | A | | 6/1984 | Itkis | |
| 4,572,509 | A | | 2/1986 | Sitrick | |
| 4,624,462 | A | | 11/1986 | Itkis | |
| 4,634,126 | A | | 1/1987 | Kimura | |
| 4,798,387 | A | | 1/1989 | Richardson | |
| 4,823,345 | A | | 4/1989 | Daniel et al. | |
| 4,848,771 | A | | 7/1989 | Richardson | |
| 4,856,787 | A | | 8/1989 | Itkis | |
| 4,885,703 | A | * | 12/1989 | Deering | 345/422 |
| 4,914,607 | A | | 4/1990 | Takanashi et al. | |
| 4,986,543 | A | | 1/1991 | Heller | |
| 5,007,649 | A | | 4/1991 | Richardson | |
| 5,227,771 | A | | 7/1993 | Kerr et al. | |
| 5,242,163 | A | | 9/1993 | Fulton | |
| 5,255,352 | A | | 10/1993 | Faulk | |
| 5,297,802 | A | | 3/1994 | Pocock et al. | |
| 5,303,388 | A | | 4/1994 | Kreitman et al. | |
| 5,339,390 | A | | 8/1994 | Robertson et al. | |
| 5,342,047 | A | | 8/1994 | Heidel et al. | |
| 5,351,970 | A | | 10/1994 | Fioretti | |
| 5,393,057 | A | | 2/1995 | Marnell, II | |
| 5,435,554 | A | | 7/1995 | Lipson | |
| 5,455,904 | A | | 10/1995 | Bouchet et al. | |
| 5,469,536 | A | | 11/1995 | Blank | |
| 5,485,197 | A | | 1/1996 | Hoarty | |
| 5,594,844 | A | | 1/1997 | Sakai et al. | |
| 5,604,852 | A | | 2/1997 | Watters et al. | |
| 5,608,850 | A | | 3/1997 | Robertson | |
| 5,621,906 | A | | 4/1997 | O'Neill et al. | |
| 5,639,088 | A | | 6/1997 | Schneider et al. | |
| 5,643,086 | A | | 7/1997 | Alcorn et al. | |
| 5,678,015 | A | | 10/1997 | Goh | |
| 5,689,628 | A | | 11/1997 | Robertson | |
| 5,729,673 | A | | 3/1998 | Cooper et al. | |
| 5,742,779 | A | | 4/1998 | Steele et al. | |
| 5,745,109 | A | | 4/1998 | Nakano et al. | |
| 5,755,621 | A | | 5/1998 | Marks et al. | |
| 5,766,074 | A | | 6/1998 | Cannon et al. | |
| 5,775,993 | A | | 7/1998 | Fentz et al. | |
| 5,788,573 | A | | 8/1998 | Baerlocher et al. | |
| 5,805,783 | A | * | 9/1998 | Ellson et al. | 345/468 |
| 5,807,172 | A | | 9/1998 | Piechowiak | |
| 5,816,918 | A | * | 10/1998 | Kelly et al. | 463/16 |
| 5,833,540 | A | | 11/1998 | Miodunski et al. | |
| 5,836,819 | A | | 11/1998 | Ugawa | |
| 5,880,733 | A | | 3/1999 | Horvitz et al. | |
| 5,903,271 | A | | 5/1999 | Bardon et al. | |
| 5,912,671 | A | | 6/1999 | Oka | |
| 5,934,672 | A | | 8/1999 | Sines et al. | |
| 5,941,772 | A | | 8/1999 | Paige | |
| 5,956,038 | A | | 9/1999 | Rekimoto | |
| 5,967,895 | A | | 10/1999 | Kellen | |
| 5,998,803 | A | | 12/1999 | Forrest et al. | |
| 6,002,403 | A | | 12/1999 | Sugiyama et al. | |
| 6,002,853 | A | | 12/1999 | de Hond | |
| 6,005,579 | A | | 12/1999 | Suglyama et al. | |
| 6,009,458 | A | | 12/1999 | Hawkins et al. | |
| 6,012,984 | A | | 1/2000 | Roseman | |
| 6,014,142 | A | | 1/2000 | LaHood | |
| 6,023,371 | A | | 2/2000 | Onitsuka et al. | |
| 6,027,115 | A | | 2/2000 | Griswold et al. | |
| 6,029,973 | A | | 2/2000 | Takemoto | |
| 6,031,545 | A | | 2/2000 | Ellenby et al. | |
| 6,033,307 | A | | 3/2000 | Vancura | |
| 6,043,818 | A | | 3/2000 | Nakano et al. | |
| 6,050,895 | A | | 4/2000 | Luciano et al. | |
| 6,057,856 | A | | 5/2000 | Miyashita et al. | |
| 6,062,978 | A | | 5/2000 | Martino et al. | |
| 6,080,063 | A | | 6/2000 | Khosla | |
| 6,089,976 | A | | 7/2000 | Schneider et al. | |
| 6,093,100 | A | | 7/2000 | Singer et al. | |
| 6,094,196 | A | | 7/2000 | Berry et al. | |
| 6,104,815 | A | | 8/2000 | Alcorn et al. | |
| 6,106,396 | A | | 8/2000 | Alcorn et al. | |
| 6,131,909 | A | | 10/2000 | Chilese | |
| 6,135,884 | A | | 10/2000 | Hedrick et al. | |
| 6,149,156 | A | | 11/2000 | Feola | |
| 6,149,522 | A | | 11/2000 | Alcorn et al. | |
| 6,159,095 | A | | 12/2000 | Frohm et al. | |
| 6,183,361 | B1 | | 2/2001 | Cummings et al. | |
| 6,203,009 | B1 | | 3/2001 | Sines et al. | |
| 6,203,428 | B1 | | 3/2001 | Giobbi et al. | |
| 6,206,782 | B1 | | 3/2001 | Walker et al. | |
| 6,220,593 | B1 | | 4/2001 | Pierce et al. | |
| 6,234,901 | B1 | | 5/2001 | Nagoshi et al. | |
| 6,254,483 | B1 | | 7/2001 | Acres | |
| 6,267,669 | B1 | | 7/2001 | Luciano, Jr. et al. | |
| 6,271,842 | B1 | | 8/2001 | Bardon et al. | |
| 6,280,325 | B1 | | 8/2001 | Fisk | |
| 6,287,201 | B1 | | 9/2001 | Hightower | |
| 6,315,666 | B1 | | 11/2001 | Mastera et al. | |
| 6,319,128 | B1 | | 11/2001 | Miyoshi et al. | |
| 6,331,146 | B1 | | 12/2001 | Miyamoto et al. | |
| 6,332,838 | B1 | | 12/2001 | Yamagami | |
| 6,342,892 | B1 | | 1/2002 | Van Hook et al. | |
| 6,346,956 | B2 | | 2/2002 | Matsuda | |
| 6,347,999 | B1 | | 2/2002 | Yuan | |
| 6,390,470 | B1 | | 5/2002 | Huang | |
| 6,398,218 | B1 | | 6/2002 | Vancura | |
| 6,409,602 | B1 | | 6/2002 | Wiltshire et al. | |
| 6,409,604 | B1 | | 6/2002 | Matsuno | |
| 6,413,162 | B1 | | 7/2002 | Baerlocher et al. | |
| 6,431,982 | B2 | | 8/2002 | Kobayashi | |
| 6,454,649 | B1 | | 9/2002 | Mattice et al. | |
| 6,458,032 | B1 | | 10/2002 | Yamagami | |
| 6,506,114 | B1 | | 1/2003 | Estes et al. | |
| 6,508,709 | B1 | | 1/2003 | Karmarkar | |
| 6,512,522 | B1 | * | 1/2003 | Miller et al. | 345/474 |
| 6,515,688 | B1 | | 2/2003 | Berry et al. | |
| 6,517,433 | B2 | | 2/2003 | Loose et al. | |
| 6,524,185 | B2 | | 2/2003 | Lind | |
| 6,533,273 | B2 | | 3/2003 | Cole et al. | |
| 6,537,150 | B1 | | 3/2003 | Luciano | |
| 6,542,168 | B2 | | 4/2003 | Negishi et al. | |
| 6,559,863 | B1 | | 5/2003 | Megiddo | |
| 6,569,017 | B2 | | 5/2003 | Enzminger et al. | |
| 6,570,587 | B1 | | 5/2003 | Efrat et al. | |
| 6,577,330 | B1 | | 6/2003 | Tsuda et al. | |
| 6,597,358 | B2 | | 7/2003 | Miller | |
| 6,597,380 | B1 | | 7/2003 | Wang et al. | |
| 6,626,760 | B1 | | 9/2003 | Miyamoto et al. | |
| 6,628,310 | B1 | | 9/2003 | Hiura et al. | |
| 6,641,478 | B2 | | 11/2003 | Sakai | |
| 6,645,070 | B2 | | 11/2003 | Lupo | |
| 6,656,040 | B1 | | 12/2003 | Brosnan et al. | |
| 6,656,044 | B1 | | 12/2003 | Lewis | |
| 6,661,426 | B1 | | 12/2003 | Jctha et al. | |
| 6,667,741 | B1 | | 12/2003 | Kataoka et al. | |
| 6,700,588 | B1 | | 3/2004 | MacInnis et al. | |
| 6,734,884 | B1 | | 5/2004 | Berry et al. | |
| 6,746,329 | B1 | | 6/2004 | Duhamel | |
| 6,760,050 | B1 | | 7/2004 | Nakagawa | |
| 6,769,982 | B1 | | 8/2004 | Brosnan | |
| 6,772,195 | B1 | | 8/2004 | Hatleid et al. | |
| 6,802,776 | B2 | | 10/2004 | Lind et al. | |
| 6,811,482 | B2 | | 11/2004 | Letovsky | |
| 6,822,662 | B1 | | 11/2004 | Cook et al. | |
| 6,840,858 | B2 | | 1/2005 | Adams | |
| 6,847,162 | B2 | | 1/2005 | Duggal et al. | |
| 6,866,585 | B2 | | 3/2005 | Muir | |
| 6,887,157 | B2 | | 5/2005 | LeMay et al. | |
| 6,902,481 | B2 | | 6/2005 | Breckner et al. | |
| 6,922,815 | B2 | | 7/2005 | Rosen | |
| 6,938,218 | B1 | | 8/2005 | Rosen | |
| 6,942,571 | B1 | | 9/2005 | McAllister et al. | |
| 7,008,324 | B1 | | 3/2006 | Johnson et al. | |
| 7,009,611 | B2 | * | 3/2006 | Di Lelle | 345/467 |
| 7,034,825 | B2 | | 4/2006 | Stowe et al. | |
| 7,070,504 | B2 | | 7/2006 | Iwamoto | |
| 7,179,166 | B1 | | 2/2007 | Abbott | |
| 7,192,345 | B2 | | 3/2007 | Muir et al. | |
| 7,291,068 | B2 | | 11/2007 | Bryant et al. | |
| 7,318,774 | B2 | | 1/2008 | Bryant et al. | |
| 7,367,885 | B2 | | 5/2008 | Escalera et al. | |
| 7,400,322 | B1 | | 7/2008 | Urbach | |

| | | | |
|---|---|---|---|
| 7,465,230 | B2 | 12/2008 | LeMay et al. |
| 7,503,003 | B2 | 3/2009 | Kamen et al. |
| 7,503,006 | B2 | 3/2009 | Danieli |
| 7,572,186 | B2 | 8/2009 | Lemay et al. |
| 7,581,195 | B2 | 8/2009 | Sciammarella et al. |
| 7,901,289 | B2 | 3/2011 | Schlottmann et al. |
| 7,909,696 | B2 | 3/2011 | Beaulieu et al. |
| 7,918,730 | B2 | 4/2011 | Brosnan et al. |
| 7,934,994 | B2 | 5/2011 | LeMay et al. |
| 2001/0054794 | A1 | 12/2001 | Cole et al. |
| 2002/0013170 | A1 | 1/2002 | Miller |
| 2002/0016201 | A1 | 2/2002 | Bennett et al. |
| 2002/0019253 | A1 | 2/2002 | Reitzen et al. |
| 2002/0105515 | A1 * | 8/2002 | Mochizuki .................... 345/419 |
| 2002/0111208 | A1 | 8/2002 | Marta |
| 2002/0111212 | A1 | 8/2002 | Muir |
| 2002/0113369 | A1 | 8/2002 | Weingardt |
| 2002/0113820 | A1 | 8/2002 | Robinson et al. |
| 2002/0132661 | A1 | 9/2002 | Lind |
| 2002/0175466 | A1 | 11/2002 | Loose et al. |
| 2003/0013517 | A1 | 1/2003 | Bennett et al. |
| 2003/0032479 | A1 | 2/2003 | LeMay et al. |
| 2003/0045345 | A1 | 3/2003 | Berman |
| 2003/0064781 | A1 | 4/2003 | Muir |
| 2003/0064801 | A1 | 4/2003 | Brccknor et al. |
| 2003/0119581 | A1 | 6/2003 | Cannon et al. |
| 2003/0125101 | A1 | 7/2003 | Campo |
| 2004/0002380 | A1 | 1/2004 | Brosnan |
| 2004/0029636 | A1 | 2/2004 | Wells |
| 2004/0048657 | A1 | 3/2004 | Gauselmann |
| 2004/0077402 | A1 | 4/2004 | Schlottmann |
| 2004/0077404 | A1 | 4/2004 | Schlottmann et al. |
| 2004/0092302 | A1 | 5/2004 | Gauselmann |
| 2004/0102244 | A1 | 5/2004 | Kryuchkov et al. |
| 2004/0102245 | A1 | 5/2004 | Escalera et al. |
| 2004/0198485 | A1 | 10/2004 | Loose et al. |
| 2004/0266515 | A1 | 12/2004 | Gauselmann |
| 2005/0001845 | A1 | 1/2005 | Noyle |
| 2005/0075167 | A1 | 4/2005 | Beaulieu et al. |
| 2005/0225559 | A1 | 10/2005 | Robertson et al. |
| 2005/0233798 | A1 | 10/2005 | Van Asdale |
| 2005/0233799 | A1 | 10/2005 | LeMay et al. |
| 2006/0025199 | A1 | 2/2006 | Harkins et al. |
| 2006/0229122 | A1 | 10/2006 | Macke |
| 2006/0287058 | A1 | 12/2006 | Resnick et al. |
| 2007/0155471 | A1 | 7/2007 | Powell et al. |
| 2007/0155472 | A1 | 7/2007 | Gail et al. |
| 2007/0155473 | A1 | 7/2007 | Powell et al. |
| 2007/0161423 | A1 | 7/2007 | Bienvenue et al. |
| 2008/0045331 | A1 | 2/2008 | LeMay et al. |
| 2008/0076546 | A1 | 3/2008 | Moyle et al. |
| 2008/0188303 | A1 | 8/2008 | Schlottmann et al. |
| 2008/0303746 | A1 | 12/2008 | Schlottmann et al. |
| 2009/0062001 | A1 | 3/2009 | LeMay et al. |

FOREIGN PATENT DOCUMENTS

| | | | |
|---|---|---|---|
| AU | 200210214 | | 8/2002 |
| AU | 200210214 | A1 | 8/2002 |
| AU | 200227720 | | 2/2003 |
| AU | 2003237479 | B2 | 1/2004 |
| AU | 2006203556 | B2 | 9/2006 |
| CA | 2 343 870 | A1 | 10/2001 |
| EP | 0 475 581 | A2 | 3/1992 |
| EP | 0 759 315 | A1 | 2/1997 |
| EP | 0 830 881 | A2 | 3/1998 |
| GB | 2 405 107 | | 2/2005 |
| GB | 2 412 282 | | 9/2005 |
| GB | 2 420 294 | | 5/2006 |
| GB | 2 459 628 | | 11/2009 |
| GR | 62140 | B | 1/1979 |
| JP | 2002-099926 | A | 4/2002 |
| RU | 2 067 775 | C1 | 10/1996 |
| RU | 2 168 192 | C2 | 5/2001 |
| WO | WO 98/45004 | | 10/1998 |
| WO | WO 02/32521 | | 4/2002 |
| WO | WO 02/073501 | | 9/2002 |
| WO | WO 2004/002591 | | 1/2004 |
| WO | WO2004/028650 | | 4/2004 |
| WO | WO 2004/029893 | | 4/2004 |
| WO | WO 2005/016473 | | 2/2005 |
| WO | WO 2005/034054 | | 4/2005 |
| WO | WO 2006/039324 | | 4/2006 |
| WO | WO 2008/005278 | | 1/2008 |
| WO | WO 2008/154433 | | 12/2008 |

OTHER PUBLICATIONS

Carson G. S.: "Standards Pipeline the OpenGL Specification" Computer Graphics, ACM, US, vol. 31, No. 2, May 1997, pp. 17-18, XP000969297, ISSN: 097-8930.

Mason Woo, Jackie Neider, Tom Davis, Dave Shreiner, OpenGL Program Guide: The Official Guide to Learning OpenGL, Introduction to OpenGL Chapter 1, Version 1.2, 3.sup.rd edition, Open GL Architecture Review Board, Addison-Wesley Publishing, Co., 1999, ISBN: 0201604582.

"White Paper", Power VR (PowerVR), 3D Graphical Processing, Nov. 14, 2000, Copyright Power VR 2000 8 pages.

M2 Presswire, "Aristocrat Technologies to use PowerVR Technology in Casino Video Machines; Australian Company Leads Market for Video Machine Games of Chance", Oct. 17, 2000, http://www.aristocrat.com.au/PR181000.htm, Copyright 2000 M2 Communications Ltd. printed on Jul. 3, 2001 pp. 1-2.

David Einstein, "3D Web Browsing on the Horizon", Forbes.com Nov. 27, 2000, available at http://www.forbes.com/2001/11/27/1127thread.html. pp. 1-2.

GameSpot Staff. "15 Most Influential Games of All Time" Gamespot [online], retrieved May 30, 2007]. Retrieved from the Internet <http://web.archive.org/web/20010618175937/http://gamespot.com/gamespot/features/pc/most_influential/p16.html>.

"3D Modelers Are Running under Linux" LinuxFocus: vol. Nr. 4, May 1998 http://mercury.chem.pitt.edu/~tiho/LinuxFocus/English/May1998/index.html printed on Oct. 11, 2002.

Phillip Ross, "Hardware Review: 3Dfx Graphics Card" LinuxFocus vol. 2, pp. 1-7 http://mercury.chem.pitt.edu/~tiho/LinuxFocus/English/January1998/artilce18.ht printed on Oct. 11, 2002.

"Learn How to Program 3D Graphics" LinuxFocus vol. NR 2, Jan. 1998 1-2 pages http://mercury.chem.pitt.edu/~tiho/LinuxFocus/English/January1998/index/html.

Miguel Angel Sepulveda, "Open GL Programming: The 3D Scene" pp. 1-7 http://mercury.chem.pitt.edu/~tiho/LinuxFocus/English/May1998/article46.html.

Miguel Angel Sepulveda, "What is OpenGL?" LinuxFocus vol. 2 pp. 1-5 http://mercury.chem.pitt.edu/~tiho/LinuxFocus/English/January1998/article15.html printed on Oct. 11, 2002.

"TE 5 Graphics Accelerator Technology Preview" NEC Aug. 2001, 7 pages.

"A Primer form Mercury Research the Basics of 3D Graphics Technology" The Meter available at http://www.themeter.com/artilces/3DBasics.shtml printed on Janaury 31, 2003 pp. 1-2.

"The Basics of 3D: Tackling the Pipeline", The Meter, available at http://www.themeter.com/articles/3DBasics-2.shtml, printed on Jan. 31, 2003 pp. 1-2.

"The Basics of 3D: Balancing the Pipeline", The Meter, available at http://www.themeter.com/articles/3DBasics-3.shtml, printed on Jan. 31, 2003 pp. 1-2.

"The Basics of 3D: Adding Parallelism", The Meter, available at http://www.themeter.com/articles/3DBasics-4.shtml, printed on Jan. 31, 2003 pp. 1-2.

"The Basics of 3D: What's Next", The Meter, available at http://www.themeter.com/articles/3DBasics-5.shtml, printed on Jan. 31, 2003 p. 1.

"The Basics of 3D: Transform and Lighting", The Meter, available at http://www.themeter.com/articles/3DBasics-6.shtml, printed on Jan. 31, 2003 pp. 1-2.

"The Basics of 3D: The Next Generation", The Meter, available at http://www.themeter.com/articles/3DBasics-7.shtml, printed on Jan. 31, 2003 pp. 1-2.

Scott et al. "An Overview of the Visualize fx Graphics Accelerator Hardware" Article 4 Hewlet Packard Company May 1998 HP Journal.

"Pattern Display Device," Patent Abstracts of Japan, Publication No. 2002-085624, published Mar. 26, 2002.

"Game Machine," Patent Abstracts of Japan, Publication No. 2001-252394, published Sep. 18, 2001.
"Game Machine," Patent Abstracts of Japan, Publication No. 2001-252393, pubilshed Sep. 18, 2001.
"Slot Machine," Patent Abstracts of Japan, Publication No. 2001-062032, published Mar. 13, 2001.
Segal et al., "The OpenGL Graphics System: A Specification (Version 1.3)", 2001, printed from http://www.opengl.org/documentation/specs/version1.3/glspec13.pdf, pp. 1-11, 66-73 and 181-189 (29 pages).
Rose, "Nevada A.G. Finds Free Internet Gambling is Stiil Gambling", Mar. 2001 printed from http://rose.casinocitytimes.com/articles.974.html, pp. 1-4.
Segal et al., "The OpenGL Graphics System: A Specification (Version 1.3)", 2001, printed from http://www.opengl.org/documentation/specs/version1.3/glspec13.pdf, pp. 1-11, 66-73 and 181-189 (40 pages).
U.S. Office Action dated Jun. 13, 2003 issued in U.S. Appl. No. 09/927,901.
U.S. Final Office Action dated Dec. 22, 2003 issued in U.S. Appl. No. 09/927,901.
U.S. Examiner Interview Summary dated Mar. 16, 2004 issued in U.S. Appl. No. 09/927,901.
U.S. Office Action dated Jun. 21, 2004 issued in U.S. Appl. No. 09/927,901.
U.S. Examiner Interview Summary dated Jul. 27, 2004 issued in U.S. Appl. No. 09/927,901.
U.S. Notice of Allowance dated Dec. 16, 2004 issued in U.S. Appl. No. 09/927,901.
U.S. Office Action dated Dec. 10, 2007 issued in U.S. Appl. No. 11/112,076.
U.S. Notice of Allowance dated Sep. 15, 2008 issued in U.S. Appl. No. 11/112,076.
U.S. Office Action dated Dec. 12, 2007 issued in U.S. Appl. No. 11/829,807.
US Notice of Allowance dated Sep. 8, 2008 issued in U.S. Appl. No. 11/829,807.
U.S. Office Action dated Mar. 15, 2010 issued in U.S. Appl. No. 12/264,877.
U.S. Notice of Allowance dated Aug. 16, 2010 issued in U.S. Appl. No. 12/264,877.
U.S. Notice of Allowance dated Nov. 1, 2010 issued in U.S. Appl. No. 12/264,877.
U.S. Office Action (IDS considered) dated Mar. 24, 2011 issued in U.S. Appl. No. 12/264,877.
U.S. Office Action dated Aug. 18, 2010 issued in U.S. Appl. No. 11/481,666.
U.S. Office Action (Ex Parte Quayle) dated Feb. 9, 2011 issued in U.S. Appl. No. 11/481,666.
U.S. Office Action dated Jun. 17, 2005 issued in U.S. Appl. No. 10/187,343.
U.S. Final Office Action dated Jan. 30, 2007 issued in U.S. Appl. No. 10/187,343.
U.S. Office Action dated Jun. 27, 2007 issued in U.S. Appl. No. 10/187,343.
U.S. Office Action dated Aug. 21, 2008 issued in U.S. Appl. No. 10/187,343.
U.S. Office Action dated May 15, 2009 issued in U.S. Appl. No. 10/187,343.
U.S. Final Office Action dated May 10, 2010 issued in U.S. Appl. No. 10/187,343.
U.S. Notice of Allowance dated Aug. 6, 2010 issued in U.S. Appl. No. 10/187,343.
U.S. Notice of Allowance dated Nov. 30, 2010 issued in U.S. Appl. No. 10/187,343.
U.S. Office Action (IDS considered) dated Feb. 14, 2011 issued in U.S. Appl. No. 10/187,343.
U.S. Office Action dated Sep. 6, 2007 issued in U.S. Appl. No. 10/803,233.
U.S. Office Action dated Jun. 24, 2008 issued in U.S. Appl. No. 10/803,233.
U.S. Office Action dated Jan. 23, 2009 issued in U.S. Appl. No. 10/803,233.
U.S. Final Office Action dated Oct. 1, 2009 issued in U.S. Appl. No. 10/803,233.
U.S. Notice of Allowance dated Jan. 27, 2010 issued in U.S. Appl. No. 10/803,233.
U.S. Notice of Allowance dated Mar. 11, 2010 issued in U.S. Appl. No. 10/803,233.
U.S. Notice of Allowance dated Jul. 12, 2010 issued in U.S. Appl. No. 10/803,233.
U.S. Notice of Allowance and Examiners Communication dated Nov. 3, 2010 issued in U.S. Appl. No. 10/803,233.
U.S. Office Action (IDS considered) dated Feb. 10, 2011 issued in U.S. Appl. No. 10/803,233.
U.S. Office Action dated Jun. 12, 2007 issued in U.S. Appl. No. 10/674,884.
U.S. Office Action dated Feb. 20, 2008 issued in U.S. Appl. No. 10/674,884.
U.S. Action—Examiner's Answer re Brief on Appeal, dated Jun. 22, 2009 issued in U.S. Appl. No. 10/674,884.
U.S. Action—Examiner's Communication re IDS Considered dated Jul. 27, 2009 issued in U.S. Appl. No. 10/674,884.
U.S. Office Action dated Feb. 12, 2007 issued in U.S. Appl. No. 10/676,719.
U.S. Notice of Allowance dated Sep. 24, 2007 issued in U.S. Appl. No. 10/676,719.
U.S. Office Action dated Aug. 25, 2010 issued in U.S. Appl. No. 11/759,825.
U.S. Final Office Action dated Jan. 28, 2011 issued in U.S. Appl. No. 11/759,825.
U.S. Officc Action (Noticc of Pancl Dccision on Prc-Appcal Bricf Rcvicw) datcd Apr. 6, 2011 issued in U.S. Appl. No. 11/759,825.
U.S. Office Action dated Feb. 8, 2005 issued in U.S. Appl. No. 10/272,788.
U.S. Office Action dated May 25, 2005 issued in U.S. Appl. No. 10/272,788.
U.S. Office Action dated Jun. 1, 2006 issued in U.S. Appl. No. 10/272,788.
U.S. Office Action dated Oct. 26, 2006 issued in U.S. Appl. No. 10/272,788.
U.S. Office Action dated Feb. 22, 2007 issued in U.S. Appl. No. 10/272,788.
U.S. Office Action (Notice of Panel Decision on Pre-Appeal Brief Review) dated Aug. 2, 2007 issued in U.S. Appl. No. 10/272,788.
U.S. Office Action dated Nov. 5, 2008 issued in U.S. Appl. No. 12/024,931.
U.S. Final Office Action dated Jun. 9, 2009 issued in U.S. Appl. No. 12/024,931.
U.S. Office Action dated Dec. 31, 2009 issued in U.S. Appl. No. 12/024,931.
U.S. Notice of Non-Compliant Amendment (37 CFR 1.121) dated Aug. 11, 2010 issued in U.S. Appl. No. 12/024,931.
U.S. Notice of Allowance dated Sep. 20, 2010 issued in U.S. Appl. No. 12/024,931.
U.S. Notice of Allowance dated Nov. 15, 2010 issued in U.S. Appl. No. 12/024,931.
U.S. Office Action (IDS considered) dated Feb. 8, 2011 issued in U.S. Appl. No. 12/024,931.
Australian Examiner's first report dated Nov. 21, 2005 issued in AU 27720/02.
Australian Examiner's first report dated Jun. 26, 2008 issued in AU 2006203556.
PCT International Search Report and Written Opinion dated Feb. 12, 2008 issued in PCT/US2007/015015.
PCT International Preliminary Report on Patentability and Written Opinion dated Jan. 6, 2009 issued in PCT/US2007/015015.
EP Examination Report dated Jun. 3, 2009 issued in EP 07 809 991.8-2221.
EP Result of Consultation dated Sep. 1, 2009 issued in EP 07 809 991.8-2221.
PCT International Search Report dated Jan. 13, 2004 issued in PCT/US2003/018028.
Australian Examiner's first report dated Jun. 18, 2008 issued in AU 2003237479.

British Examination Report dated Jun. 9, 2005 issued in UK 0427512.9.
British Examination Rcport datcd Nov. 7, 2006 issucd in GB 0427512.9.
Uk Combined Search and Examination Report under Sections 17 and 18(3) dated Mar. 15, 2006 issucd in GB0600005.3.
Australian Examiner's first report dated Mar. 12, 2010 issued in AU 2005201148.
Australian Examiner's Report No. 2 dated Aug. 10, 2010 issued in AU 2005201148.
UK Search Report under Section 17(5) dated Jun. 22, 2005 issued in GB 0505328.5.
British Examination Report dated May 14, 2009 issued in GB 0505328.5.
British Examination Report dated Dec. 9, 2009 issued in GB 0505328.5.
PCT International Search Report dated Mar. 1, 2004 issued in PCT/US2003/031138.
Australian Examiner's first report dated Feb. 16, 2009 issued in AU 2003279092.
European Office Action dated Nov. 24, 2005 issued in EP 03 770 604.1-1238.
Russian Advisory Office Action dated Jul. 19, 2007 issued in RU 2005109160/09 (010839).
PCT International Search Report dated Mar. 19, 2004 issued in PCT/US2003/031158.
Australian Examiner's first report dated Feb. 6, 2009 issued in AU 2003279742.
European Examination Report dated Dec. 15, 2005 issued in EP 03 773 084.32218.
European Office Action dated Jun. 29, 2007 issued in EP 03 773 084.3-2218.
Russian Advisory Action dated Jul. 19, 2007 issued in RU 2005109161/09 (010840).
PCT International Search Report and Written Opinion dated Oct. 24, 2008 issued in PCT/US2008/066196.
PCT International Preliminary Report on Patentability and Written Opinion dated Dec. 7, 2009 issued in PCT/US2008/066196.
England and Wales High Court (Patent Court) Decisions; Neutral Citation No. [2005] EWHC 2416 (Pat) Case No. CH/2005/APP/0232 http://www.bailii.org/we/cases/EWHC/Patents/2005/2416.html (5 pgs.).
Patents Act 1977: Examining for Patentability Article http://www.patent.gov.uk/patent/notices/practice/examforpat.htm (3 pgs.).
"PowerVR Technologies Debuts KYRO II SE Graphics Processor at CeBIT 2002", Tech/Zone, Mar. 13, 2002, available at http://www.techzone.pcvsconsole.com/news.php?tzd=1246, 3 pages.

* cited by examiner

3-D TEXT IN A GAMING MACHINE

RELATED APPLICATION DATA

The application is a continuation of and claims priority to U.S. patent application Ser. No. 10/676,719, entitled, "3-D TEXT IN A GAMING MACHINE," by Escalera, et al., filed Sep. 30, 2003, which is a continuation-in-part and claimed priority to U.S. patent application Ser. No. 09/927,901, by Lemay, et al, filed on Aug. 9, 2001, titled "VIRTUAL CAMERAS AND 3-D GAMING ENVIRONMENTS IN A GAMING MACHINE," now U.S. Pat. No. 6,887,157 and also claimed priority under 35 U.S.C. §119(e) to U.S. Provisional Patent Application No. 60/414,982, by Escalera, et al., "3-D TEXT IN A GAMING MACHINE," filed Sep. 30, 2002, each of which is incorporated by herein reference and for all purposes.

BACKGROUND OF THE INVENTION

This invention relates to game presentation methods for gaming machines such as slot machines and video poker machines. More particularly, the present invention relates to apparatus and methods of for displaying game presentations derived from a 3-D gaming environment.

As technology in the gaming industry progresses, the traditional mechanically driven reel slot machines are being replaced with electronic counterparts having CRT, LCD video displays or the like. These video/electronic gaming advancements enable the operation of more complex games, which would not otherwise be possible on mechanical-driven gaming machines. Gaming machines such as video slot machines and video poker machines are becoming increasingly popular. Part of the reason for their increased popularity is the nearly endless variety of games that can be implemented on gaming machines utilizing advanced electronic technology.

There are a wide variety of associated devices that can be connected to video gaming machines such as video slot machines and video poker machines. Some examples of these devices are lights, ticket printers, card readers, speakers, bill validators, ticket readers, coin acceptors, display panels, key pads, coin hoppers and button pads. Many of these devices are built into the gaming machine or components associated with the gaming machine such as a top box, which usually sits on top of the gaming machine.

Typically, utilizing a master gaming controller, the gaming machine controls various combinations of devices that allow a player to play a game on the gaming machine and also encourage game play on the gaming machine. For example, a game played on a gaming machine usually requires a player to input money or indicia of credit into the gaming machine, indicate a wager amount, and initiate a game play. These steps require the gaming machine to control input devices, including bill validators and coin acceptors, to accept money into the gaming machine and recognize user inputs from devices, including key pads and button pads, to determine the wager amount and initiate game play.

After game play has been initiated, the gaming machine determines a game outcome, presents the game outcome to the player and may dispense an award of some type depending on the outcome of the game. A game outcome presentation may utilize many different visual and audio components such as flashing lights, music, sounds and graphics. The visual and audio components of the game outcome presentation may be used to draw a player's attention to various game features and to heighten the player's interest in additional game play. Maintaining a game player's interest in game play, such as on a gaming machine or during other gaming activities, is an important consideration for an operator of a gaming establishment.

One method for maintaining a player's interest is to present multiple games at the same time during a game presentation. For instance, triple play poker in which a player plays three hands of poker during each game presentation has become very popular game implemented on a video gaming machine. Variants of triple play poker include game presentations where a hundred or more poker hands are played during each game presentation. The presentation of multiple games during a single game presentation may be extended to other types of games, such as video slot games.

One difficulty associated with presenting multiple games in a video game presentation is the screen resolution of the display on a gaming machine. A typical display resolution on a gaming machine is about 640 pixels by 480 pixels. As the number of games presented in a game presentation increases, the amount of detail may be limited by the screen resolution. For instance, for a hundred-hand poker game where a hundred poker hands are displayed during each game presentation, each card must be drawn fairly small without much detail to accommodate all of the cards on a single display screen. The lack of detail and small card size may discourage some game players from playing such games.

Another method for maintaining a player's interest in playing a game on a gaming machine is to present an exciting game presentation that is shown on a display screen on the gaming machine. Many newer game systems use graphical generation schemes employing mass storage devices that utilize varied load times and stream-able media formats to generate an exciting game presentation. With these game systems, many game scenes are generated during the game play using complex renderings and video playback capabilities. Typically, however, for efficiency reasons, a player has little control over the game outcome presentation other than through game decisions they make during the play of the game.

In view of the above, it would be desirable to provide method and apparatus that allow detailed game presentations accommodating the simultaneous play of multiple games to be presented on a video gaming machine where the game presentation may also be controlled by a game player.

SUMMARY OF THE INVENTION

This invention addresses the needs indicated above by providing method and apparatus on a gaming machine for presenting a plurality of game outcome presentations derived from one or more virtual 3-D gaming environments stored on the gaming machine. While a game of chance is being played on the gaming machine, two-dimensional images derived from a 3-D object in the 3-D gaming environment may be rendered to a display screen on the gaming machine in real-time as part of a game outcome presentation. The 3-D objects may include 3-D texts objects that are used to display text to the display screen of the gaming machine as part of the game outcome presentation. Apparatus and methods are described for generating and displaying information in a textual format that is compatible with a 3-D graphical rendering system. In particular, font generation and typesetting methods that are applicable in a 3-D gaming environment are described.

One aspect of the present invention provides a method of providing a game of chance in a gaming machine that is operable i) to receive cash or indicia of credit for a wager on a game of chance and ii) to output cash or an indicia of credit as an award for the game of chance where the gaming machine comprises a master gaming controller, a display device, a memory device and a 3-D graphical rendering system. The method may be generally characterized as comprising: a) receiving the wager for the games of chance controlled by the master gaming controller on the gaming machine; b) determining a game outcome the games of chance; c) rendering one or more two-dimensional images derived from three-dimensional (3-D) objects in a 3-D gaming environment stored in the memory device on the gaming machine wherein at least one of the 3-D objects is a 3-D text object adapted for conveying textual information; and d) displaying the one or more rendered two-dimensional images to the display device on the gaming machine. In general, the 3-D gaming environment comprises a plurality of 3-D text objects and the 3-D graphical rendering system may be compatible with OpenGL.

In particular embodiments, the method may further comprise: a) mapping a text string comprising one or more alphanumeric characters to the 3-D text object where the 3-D text object may be configured to convey at least one of the alphanumeric characters in the text string, b) mapping textures with patterns of alphanumeric characters to the 3-D text object to convey the textual information, c) modeling the 3-D text object in a shape of an alphanumeric character to convey the textual information. The shape of the alphanumeric character may be defined by a plurality of parameterized curves.

In other embodiments, the method may further comprise scaling the 3-D text object for conveying the textual information by a scaling factor. The 3-D gaming environment may comprises two or more 3-D text objects where the gaming machine is operable to apply a different scale factor to each of the two or more 3-D text objects. The scaling factor may vary as a function of time. The 3-D text object may be scaled in less three of its dimensions. Further, the gaming machine may be operable to apply a different scale factor to each of the three dimensions of the 3-D text object. The 3-D text object may be scaled using mip mapping.

In yet other embodiments, the gaming machine may be operable to scale a plurality of 3-D text objects to fit to a bounding surface. A shape of the bounding surface may change as a function of time. In one example, the bounding surface may be a planar surface. A shape of the 3-D text objects change may also change as a function of time.

In particular embodiments, the method may further comprise positioning each of the 3-D objects in the 3-D gaming environment. The position of one or more of the 3-D objects may change as a function of time. A plurality of the 3-D text objects may be positioned along a straight line, two or more parallel lines or along a 3-D curve in the 3-D gaming environment. In general, a plurality of 3-D text objects may be positioned in the 3-D gaming environment.

In one embodiment, the method may further comprise guiding a placement of the 3-D text objects using a text page surface. One or more of a shape of the text page surface, a position of the text page surface or an orientation of the text page surface may change as a function of time. A shape of the text page surface may be a planar rectangle, a planar multi-sided polygon or a 3-D surface. The text page surface may be invisible. Further, the method may further comprise: a) applying one or more of a static texture, an animated texture or combinations thereof to the text page surface, b) clipping a portion of a first 3-D text object that extends beyond a boundary defined by the text page surface and c) scaling the 3-D text object to fit within boundaries defined by the text page surface.

In other embodiments, the method may comprise orientating an angular position of each of the 3-D text objects in the 3-D gaming environment. The angular position of each the 3-D text objects may vary as a function of time. In particular, the angular positions of each the 3-D text objects may be oriented so that one surface of the 3-D text objects is aligned with a slope or a normal of a curved line or a curved surface in the 3-D gaming environment.

In particular embodiments, the method may further comprise rendering the textual information in the 3-D gaming environment for one or more of i) a game outcome presentation for the game of chance, ii) a gaming maintenance operation, iii) an attract mode feature, iv) a promotional feature, v) casino information, vi) bonus game presentation and capturing the textual information on the one or more two-dimensional images. Further, the textual information conveyed by the 3-D text objects may be information from one or more of a game of chance, a bonus game, an advertisement, news, stock quotes, electronic mail, a web page, a message service, a locator service or a hotel/casino service, a movie, a musical selection, a casino promotion, a broadcast event, a maintenance operation, a player tracking service, a drink menu and a snack menu.

In particular embodiments, a text string comprising a plurality of alphanumeric characters may be mapped to a plurality of 3-D text objects where each of the 3-D text objects conveys the textual information for one of the alphanumeric characters in the text string. The method may further comprise applying one or more typesetting rules for improving a quality of the textual information rendered from the plurality of 3-D text objects representing the text string. The typesetting rules may be for one or more of i) adjusting a spacing between the characters, ii) adjusting color weights of the characters, iii) justifying the text string, iv) centering the characters, v) adjusting dimensions of strokes defining the characters, vi) aligning the characters with a baseline, vii), positioning the text string to two or more lines, viii) adjusting the spacing between two or more lines of text, ix) adjusting the vertical or horizontal alignment of the characters, x) adjusting a relative size of each character, xi) adjusting pixels defining a text character and xii) and adjusting texels defining a text character. In other embodiments, the method may further comprise one or more of a) prior to rendering the one or more two dimensional images, generating one or more font textures wherein each font texture comprises a plurality of characters and loading the one or more font textures to a first memory device on the gaming machine, b) displaying a menu of games of chance available on the gaming machine; receiving one or more inputs signals containing information used to select one or more of games of chance listed on said menu, c) generating an animated surface texture in the 3-D gaming environment, d) storing one or more of the rendered two-dimensional images to a memory device located on the gaming machine or e) loading one or more font textures to a font library in the memory device on the gaming machine.

Another aspect of the present invention provides a method of providing textual information for a gaming machine that is operable i) to receive cash or indicia of credit for a wager on a game of chance and ii) to output cash or an indicia of credit as an award for the game of chance where the gaming machine comprises a master gaming controller, a display device, a memory device and a 3-D graphical rendering system. The method may be generally characterized as comprising: a) generating a font texture comprising a plurality of characters drawn in a particular font style where the font texture comprises one or more font parameters for defining global characteristics of the plurality of characteristics in the font texture and one or more character parameters for defining characteristics of each character; b) determining a text string comprising a plurality of characters; c) determining a text page surface for guiding a placement of the plurality of characters in a 3-D gaming environment, d) for each character in the text string, sizing a 3-D object for the character using the font parameters and character parameters; mapping a texture of the character from the font texture to the 3-D object and placing each 3-D object on the text page surface; e) applying one or more typesetting rules to the 3-D objects for improving a visual quality of the text string rendered from the 3-D objects; and f) rendering the text string using the 3-D graphical rendering system.

In particular embodiments, the method may further comprise displaying the rendered text string on the display device or locating a first character in the font texture using character locating coordinates. The 3-D graphical rendering system may be compatible with OpenGL. Further, the game of chance may be selected from the group consisting of a slot game, a keno game, a poker game, a pachinko game, a video black jack game, a bingo game, a baccarat game, a roulette game, a dice game and a card game.

In other embodiments, the method may further comprise storing one or more generated font textures in a font library in the memory device on the gaming machine. The font library further comprises a plurality of font textures with the same font style and different font parameters or character parameters. The font library may further comprise a plurality of font textures with different font styles. The font parameters in the font texture may be one or more of a font name, a font style, a font typeface, a font weight, a font baseline, a font ascent, a font descent, a font slant, a font maximum height, a font maximum width and a number of characters in the font texture. The character parameters in the font texture may be one or more of a character height, a character width, a character ascent, a character descent, a character origin, a character shape or character location coordinates for locating the character in the font texture.

Yet another aspect of the present invention provides a gaming machine. The gaming machine may generally be characterized as comprising: 1) a housing; 2) a master gaming controller coupled to the housing designed or configured to control a game of chance played on the gaming machine; 3) a three-dimensional (3-D) gaming environment for rendering at least a game outcome presentation for the game of chance stored on a memory device on the gaming machine; 4) game logic for rendering one or more two-dimensional images derived from 3-D objects in the 3-D gaming environment wherein at least one of the 3-D objects is a 3-D text object adapted for conveying textual information; 5) at least one display devices for displaying the rendered one or more two-dimensional images where the gaming machine is operable i) to receive cash or indicia of credit for a wager on the game of chance and ii) to output cash or an indicia of credit as an award for the game of chance.

The gaming machine may further comprise one or more of a) a 3-D graphical rendering system for rendering the one or more 2-D images, b) game logic designed or configured for rendering textual information from a gaming machine maintenance operation in the 3-D gaming environment using a plurality of the 3-D text objects and to capture the gaming machine maintenance operation on the one or more two-dimensional images, c) game logic designed or configured for rendering textual information from one or more of i) a gaming machine operational feature, ii) a gaming machine maintenance operation in the 3-D gaming environment, iii) an attract mode feature, iv) a promotional feature, v) casino information or vi) a bonus game presentation using a plurality of the 3-D text objects and to capture the gaming machine operation feature on the one or more two-dimensional images, d) a graphical processing unit, separate from said master gaming controller, designed or configured to execute the graphical operations used to render one or more two-dimensional images derived from the 3-D objects in the 3-D gaming environment, e) a network interface board designed or configured to allow the master gaming controller to communicate rendered textual information to a remote display device, f) a multi-headed video card, g) a memory device for storing font textures in a font library on the gaming machine. The font library further may comprise a plurality of font textures with the same font style and different font parameters or character parameters or a plurality of font textures with different font styles.

Another aspect of the invention pertains to computer program products including a machine-readable medium on which is stored program instructions for implementing any of the methods described above. Any of the methods of this invention may be represented as program instructions and/or data structures, databases, etc. that can be provided on such computer readable media.

These and other features of the present invention will be presented in more detail in the following detailed description of the invention and the associated figures.

DESCRIPTION OF THE PREFERRED EMBODIMENTS

Figure 1:
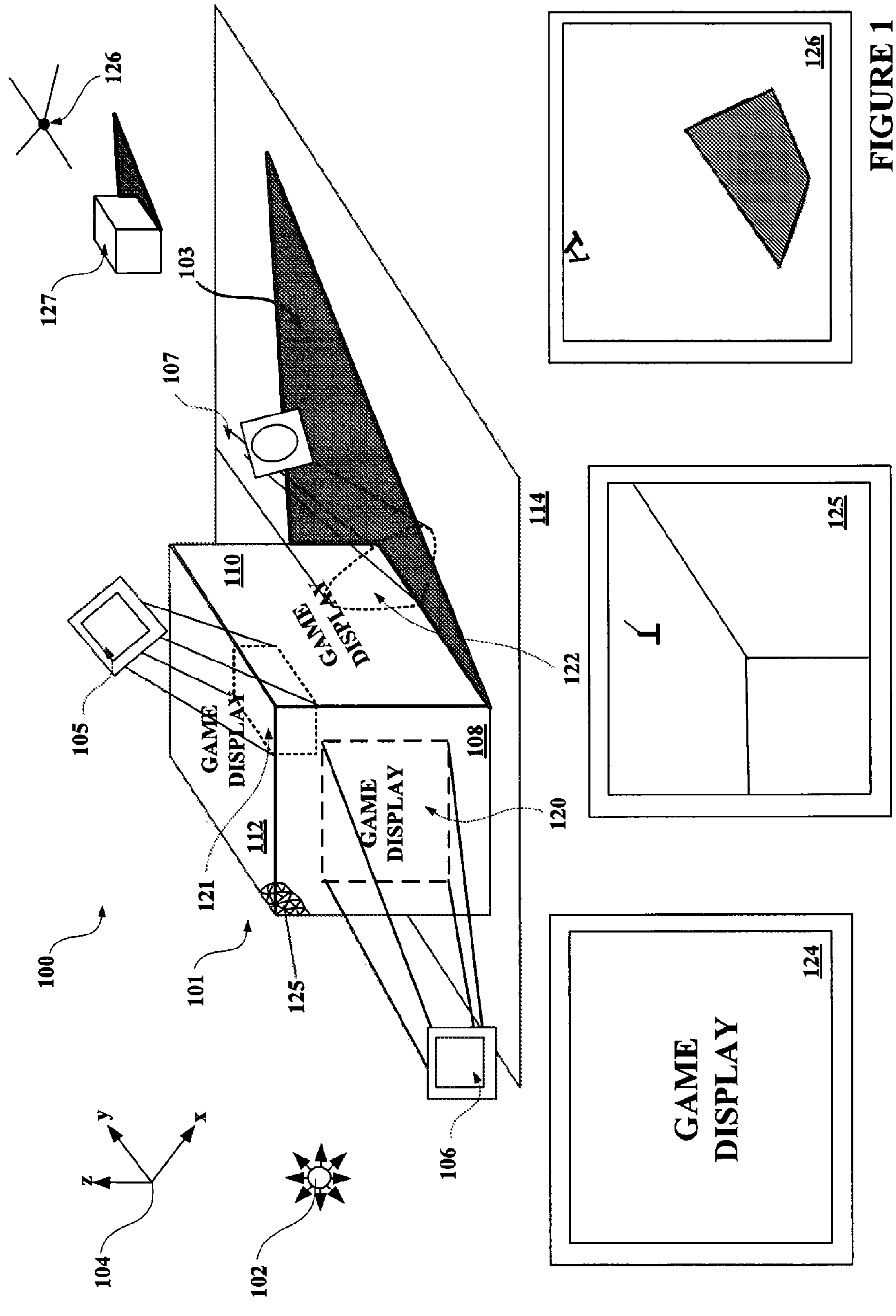
FIG. 1 is a perspective drawing of a 3-D virtual gaming environment implemented on a gaming machine for one embodiment of this invention.

FIG. 1 is a perspective drawing of a 3-D virtual gaming environment 100 implemented on a gaming machine for one embodiment of this invention. The 3-D virtual gaming environment may be used by the master gaming controller on the gaming machine to present a game of chance. The game of chance played on the gaming machine may include: 1) a wager selected by a player playing a game on the gaming machine, 2) an initiation of the game of chance on the gaming machine by the player, 3) a determination of an outcome for the game of chance by the gaming machine and 4) a presentation on the gaming machine of the game outcome to the player. In the present invention, the 3-D gaming environment may be used to present a game outcome to the player, describe operating functions of the gaming machine and provide an interface for obtaining gaming information and services. In particular, methods and apparatus of displaying a text string in a 3-D gaming environment, such as a text string used in a credit meter displayed on the gaming machine or a text string used to provide game information for a game of chance displayed on the gaming machine, are described. The text strings may be generated using textures that are applied to a 3-D object in the 3-D gaming environment. Apparatus and methods implementing these features are described with respect to FIGS. 1-11

Figure 2:
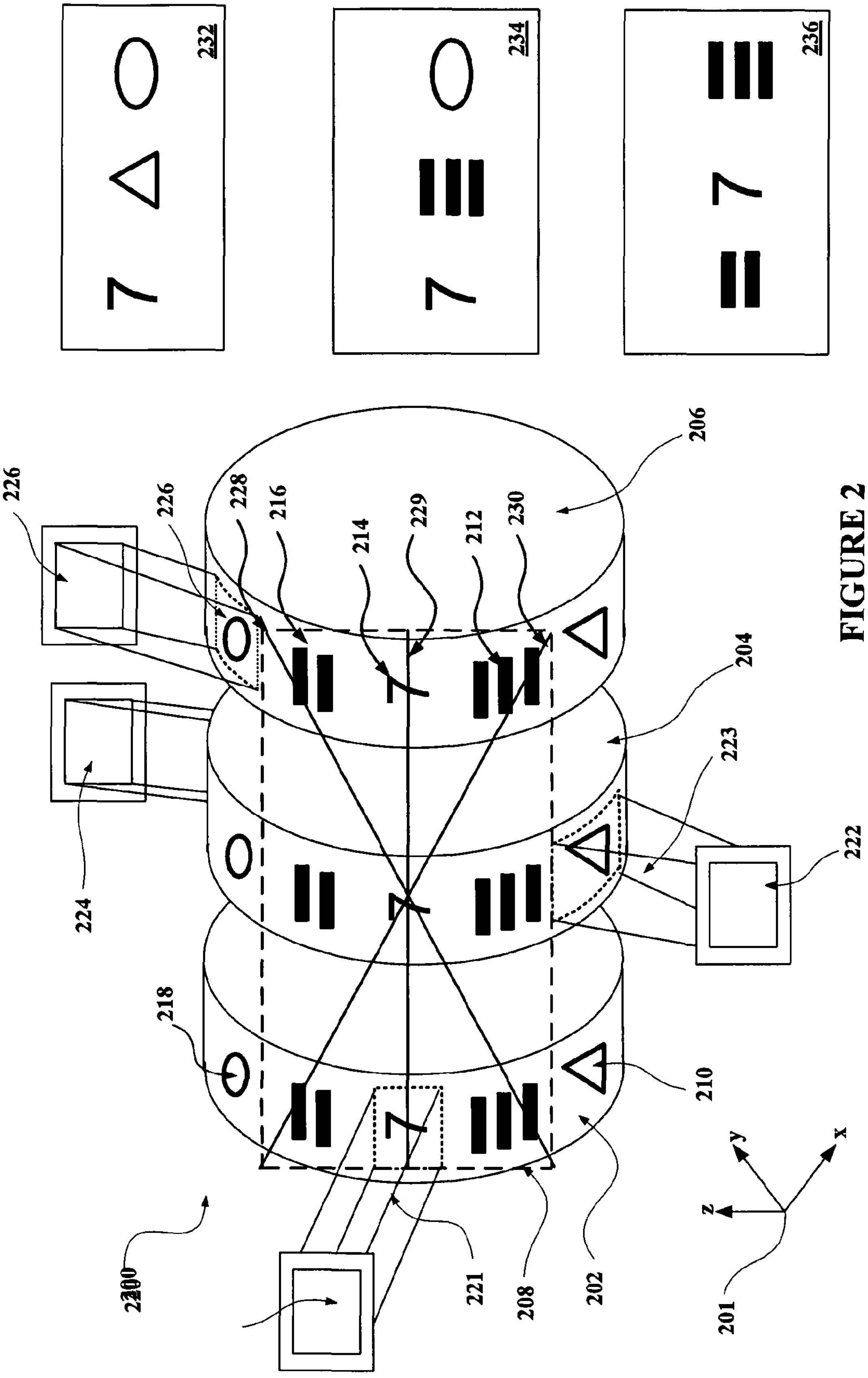
FIG. 2 is a perspective drawing of virtual slot reels in a 3-D virtual gaming environment implemented on a gaming machine for one embodiment of this invention.
Figure 3:
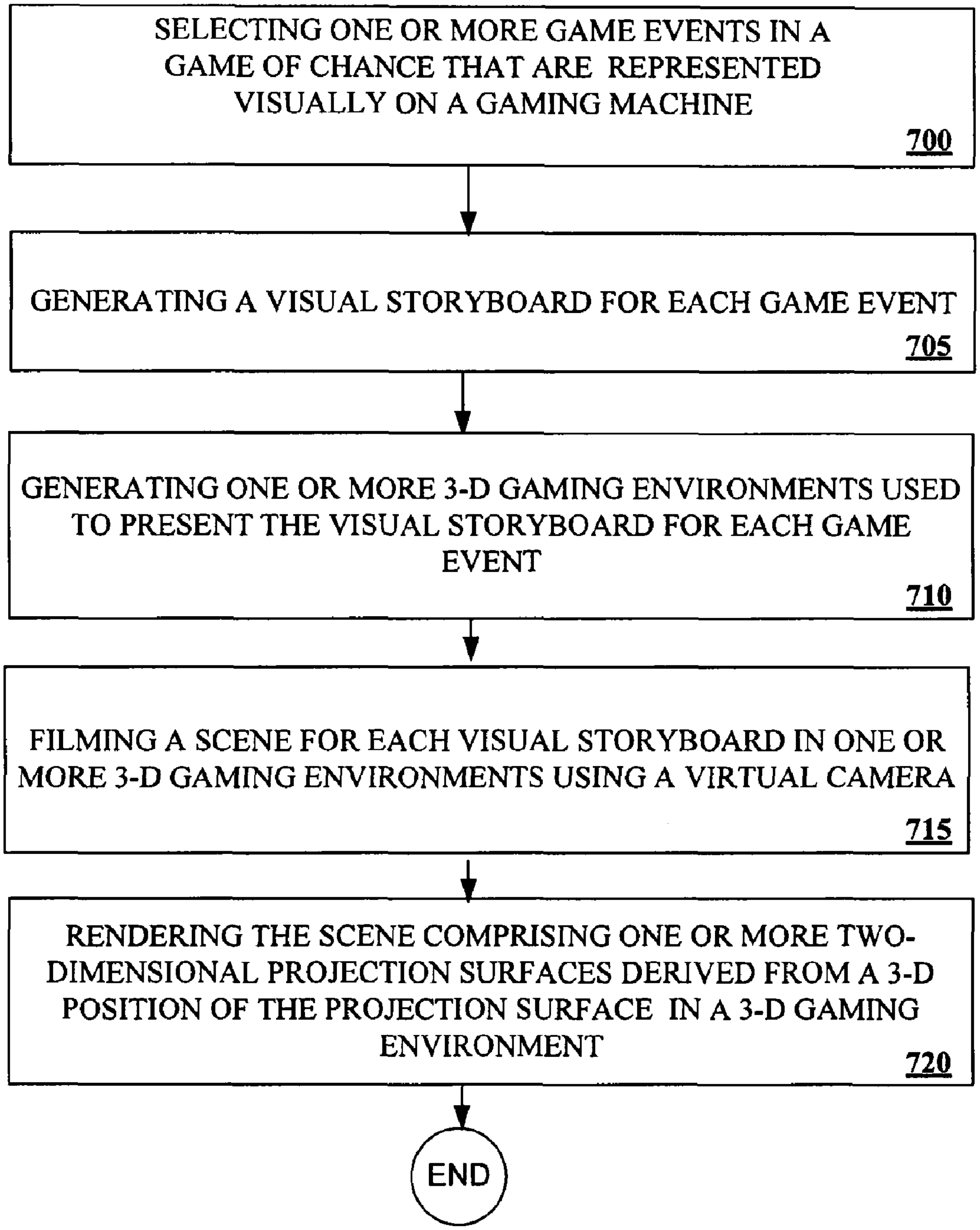
FIG. 3 is a flow chart for a method of generating a game of chance of the present invention.
Figure 5A:
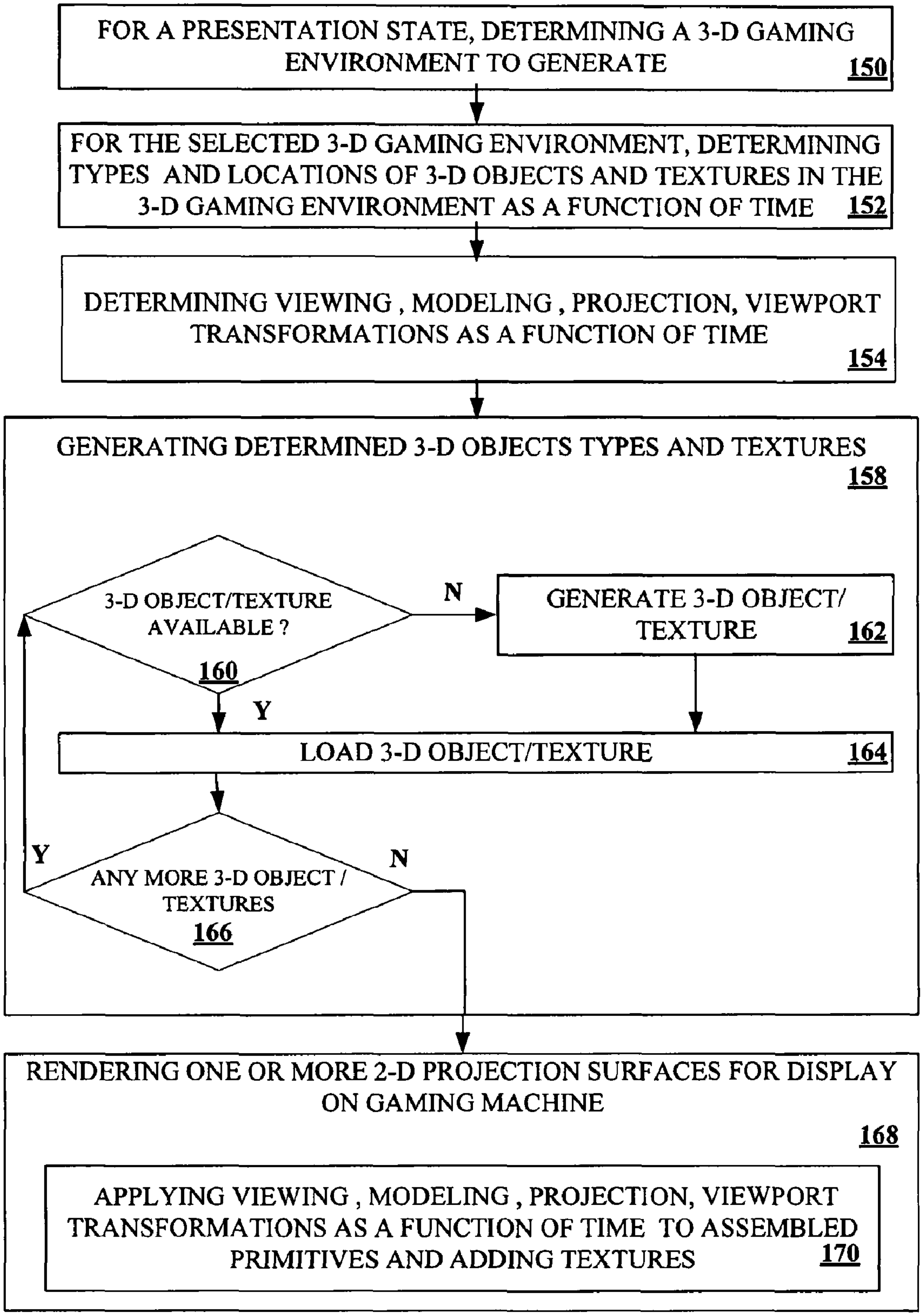
FIGS. 5A-5B are block diagrams describing the rendering of 3-D text objects in a 3-D gaming environment of the present invention.
Figure 5B:
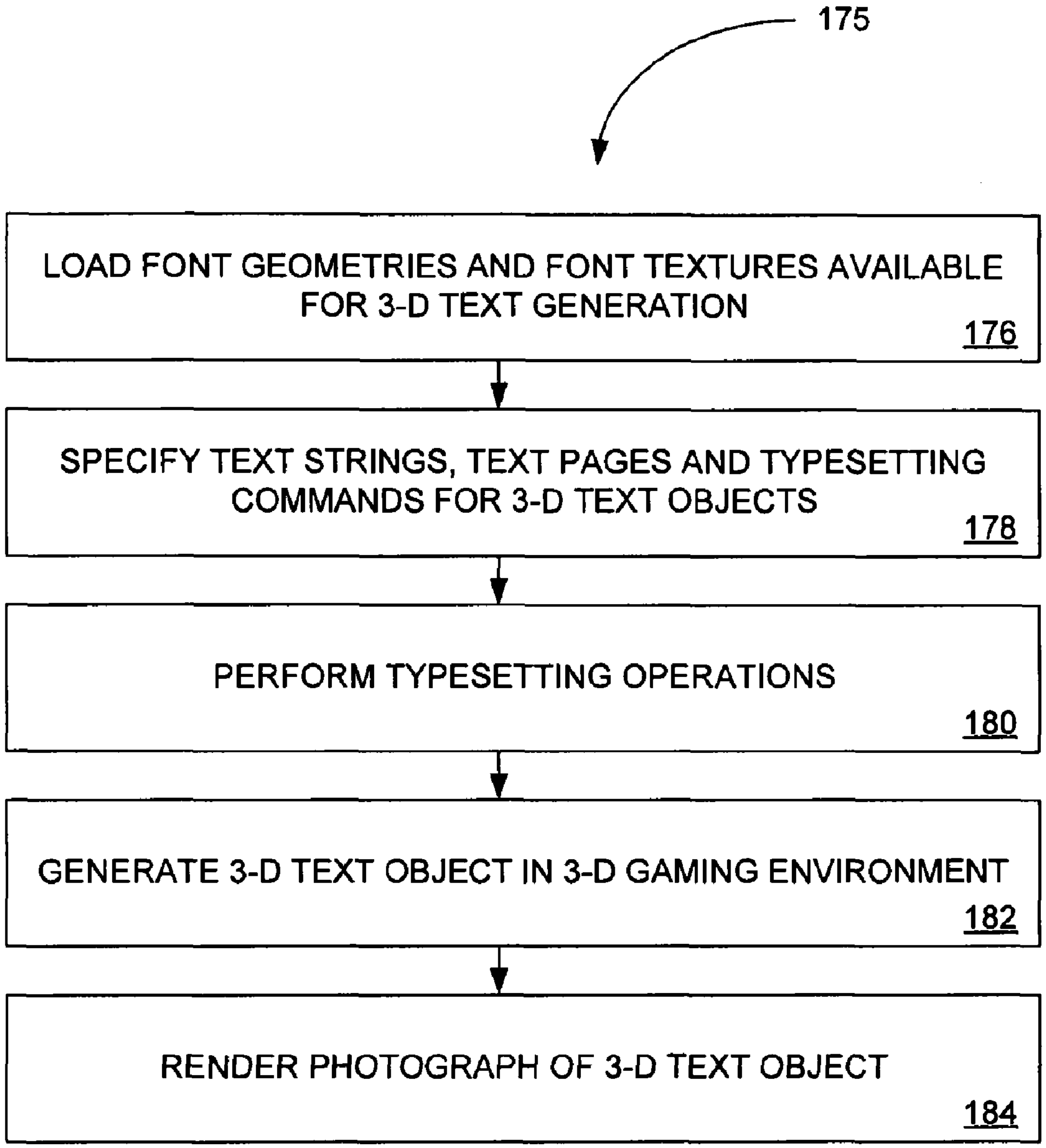
Figure 6A:
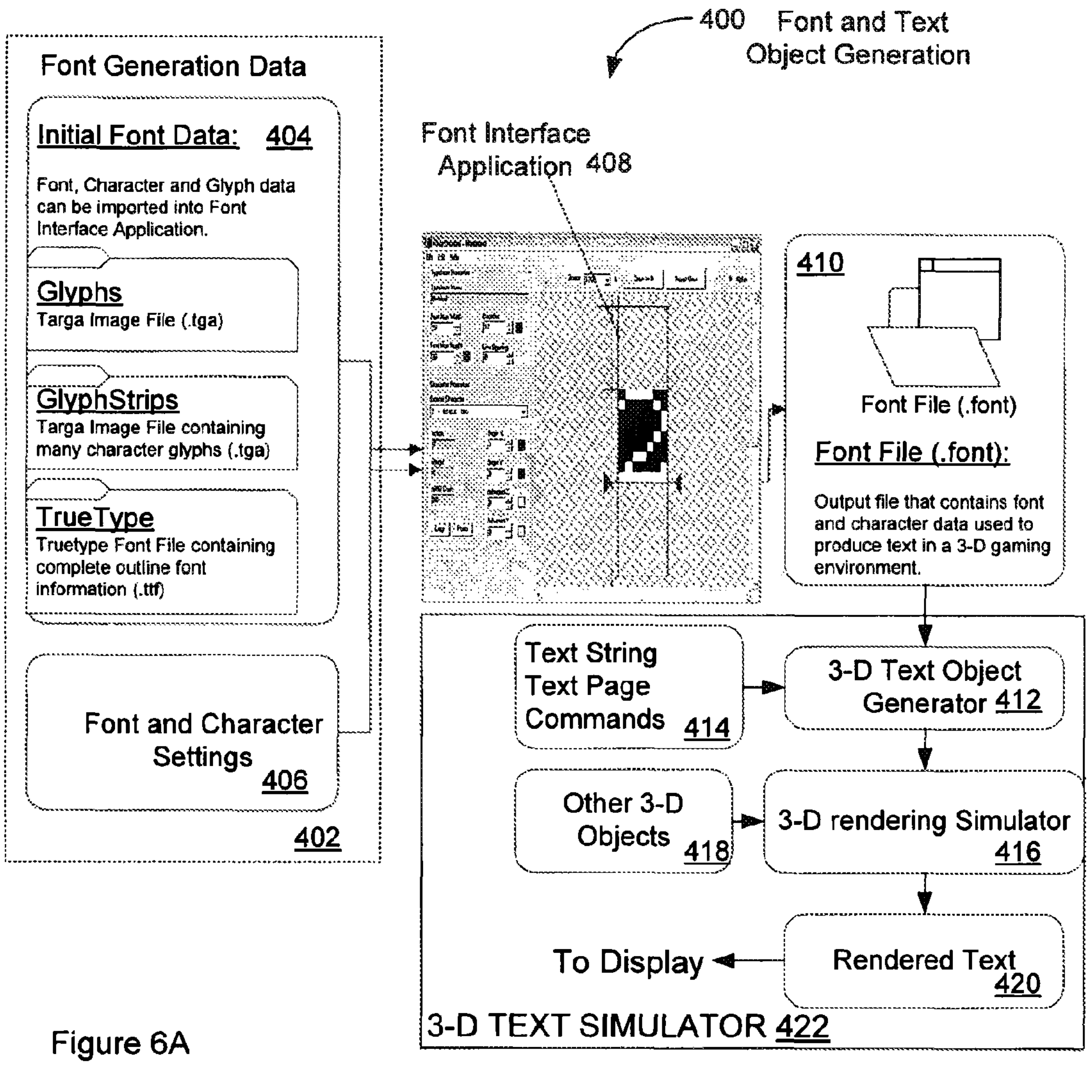
FIG. 6A is a block diagram showing the creation of a font file.
Figure 6B:
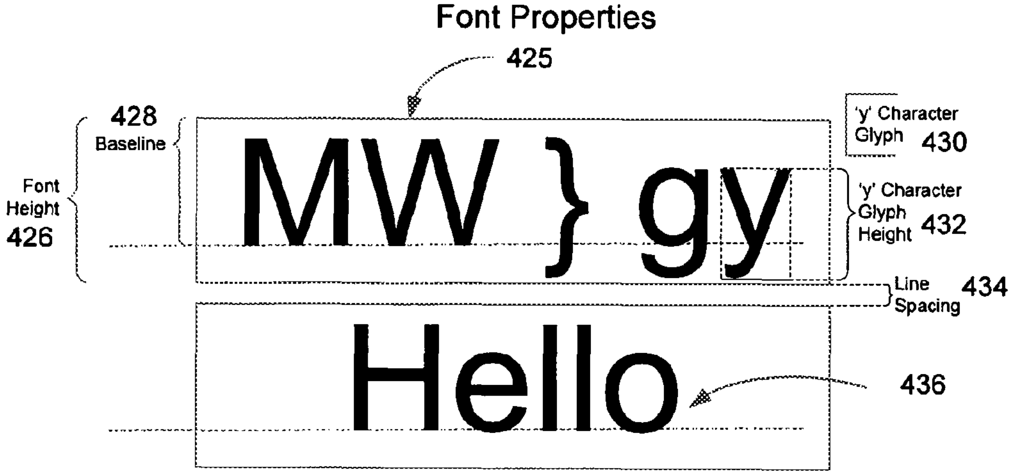
FIG. 6B is a diagram of font properties.
Figure 6C:
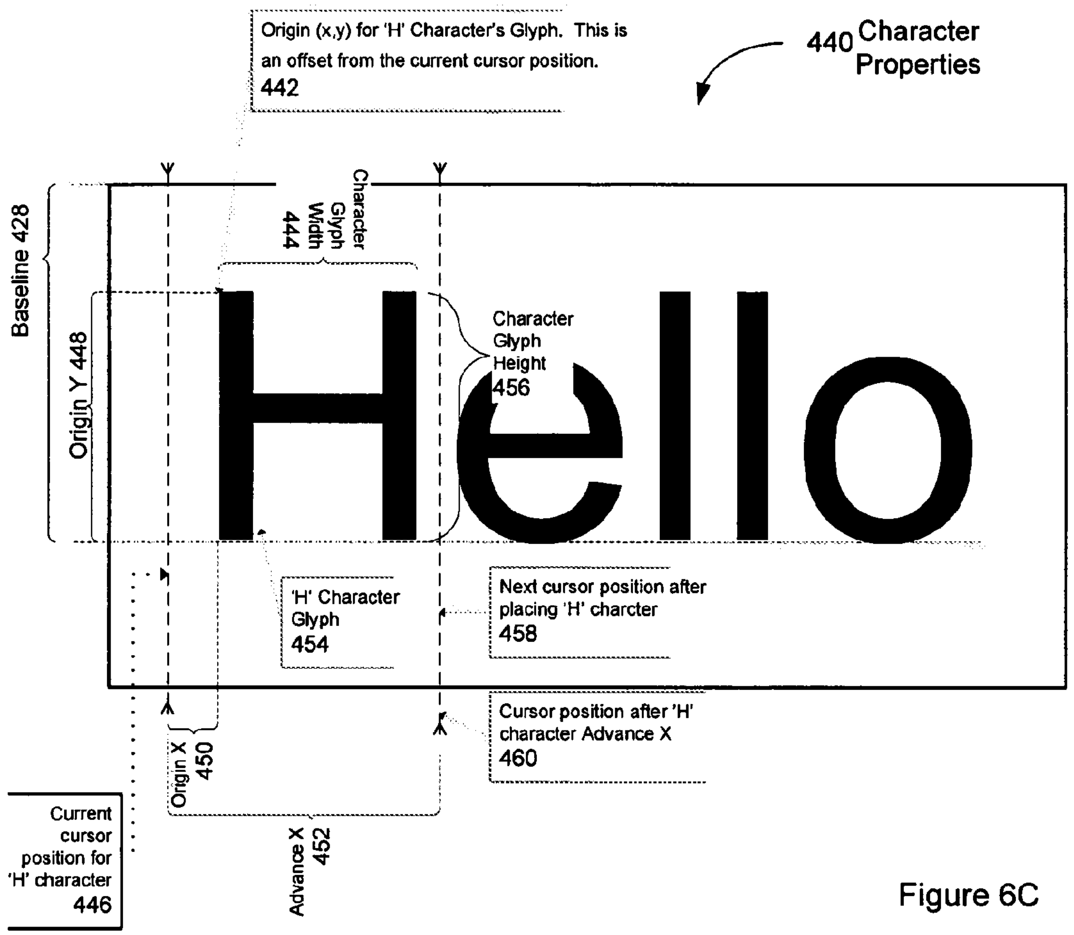
FIG. 6C is a diagram of character properties.
Figure 6D:
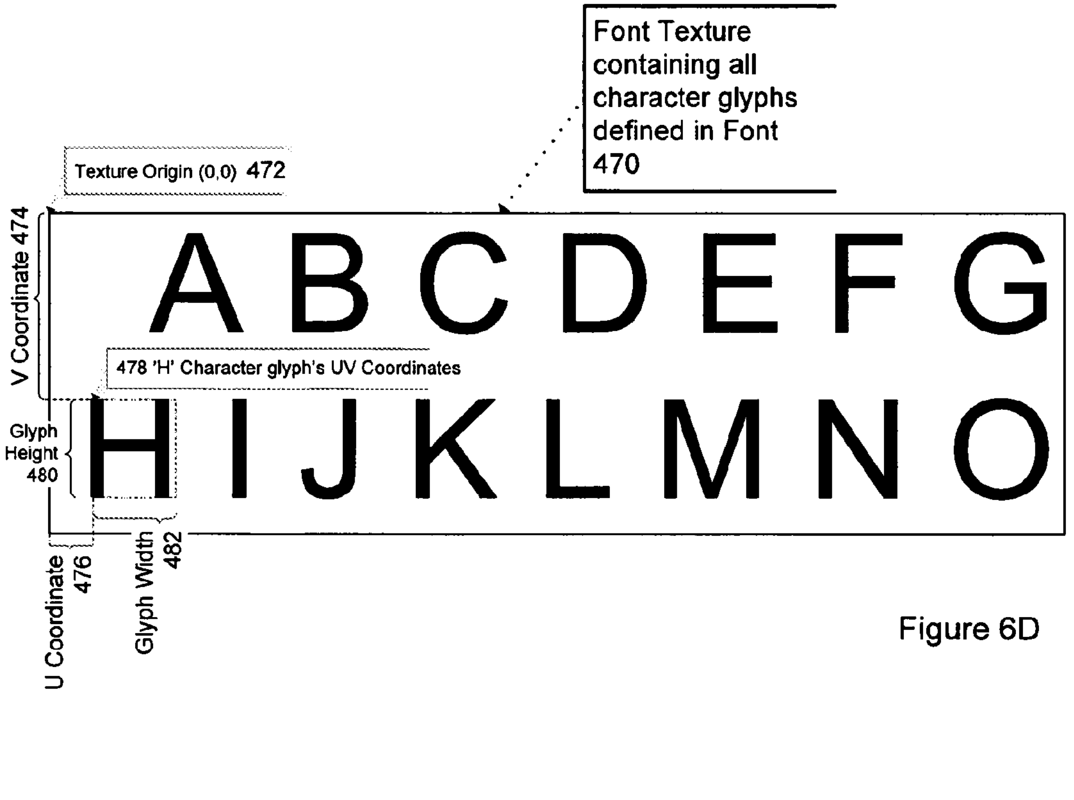
FIG. 6D is a diagram of a font texture.
Figure 7:
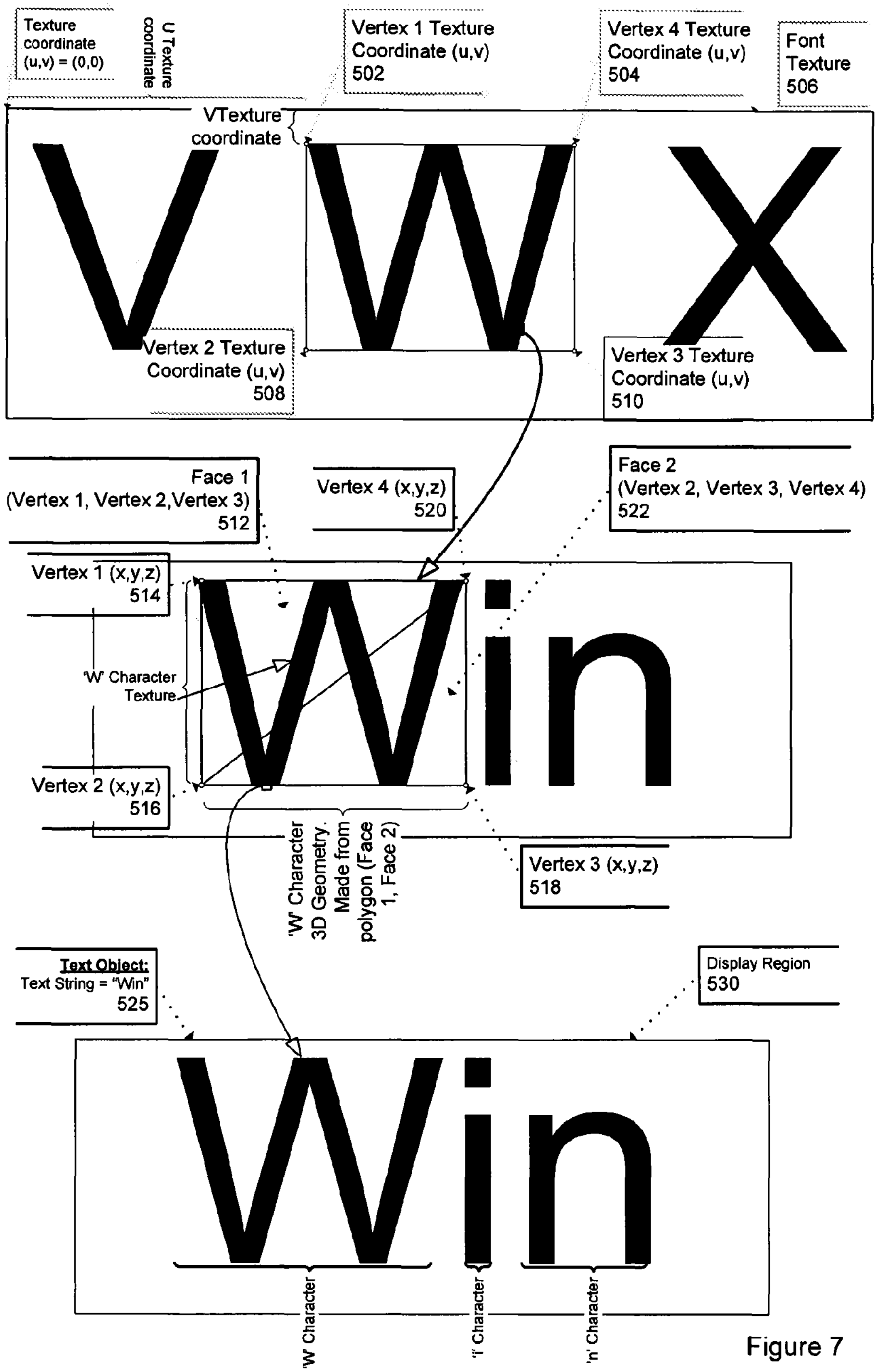
FIG. 7 is a diagram showing the creation of 3-D text characters.
Figure 8A:
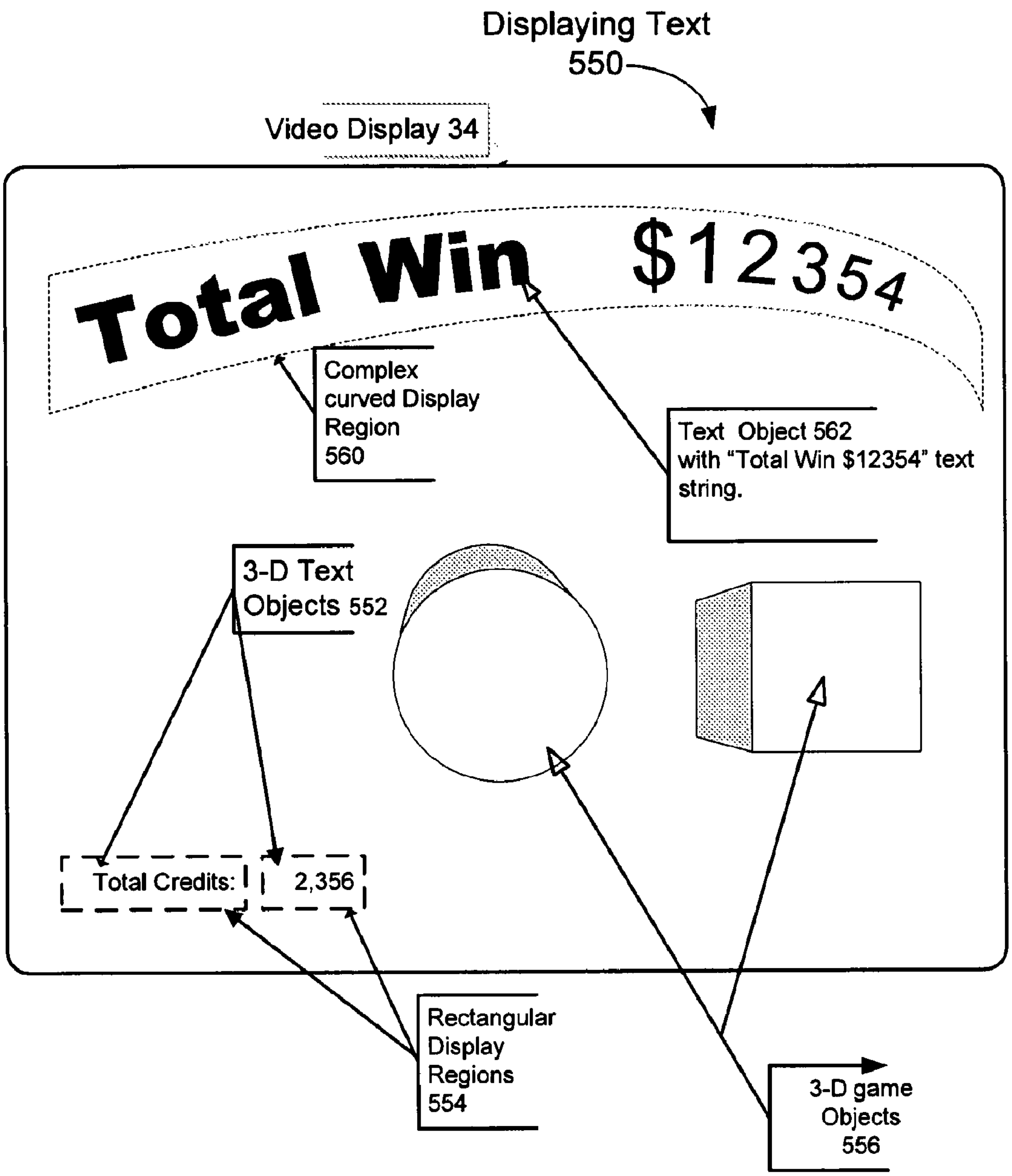
FIG. 8A-8B are diagrams of 3-D text objects displayed using embodiments of the present invention.
Figure 8B:
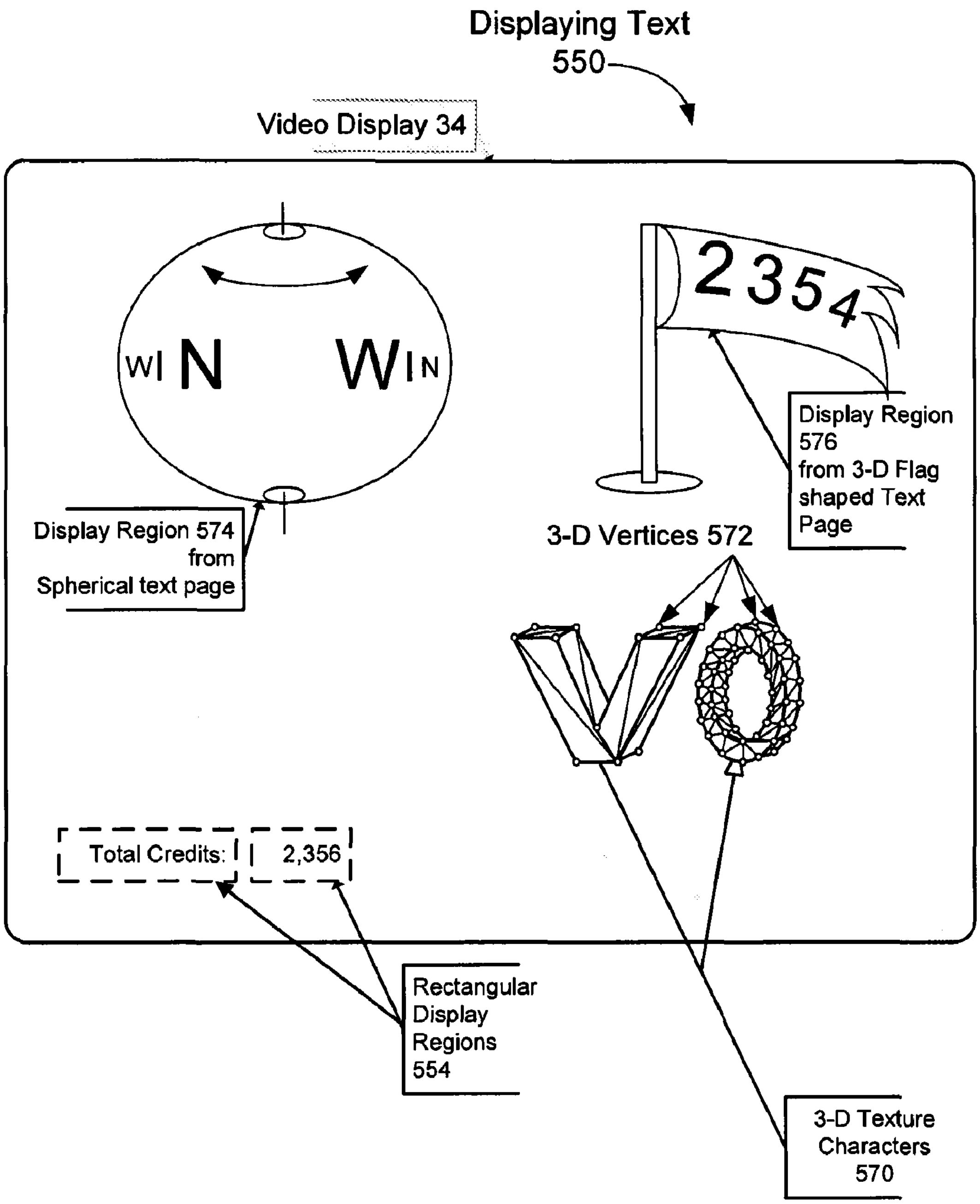
Figure 9:
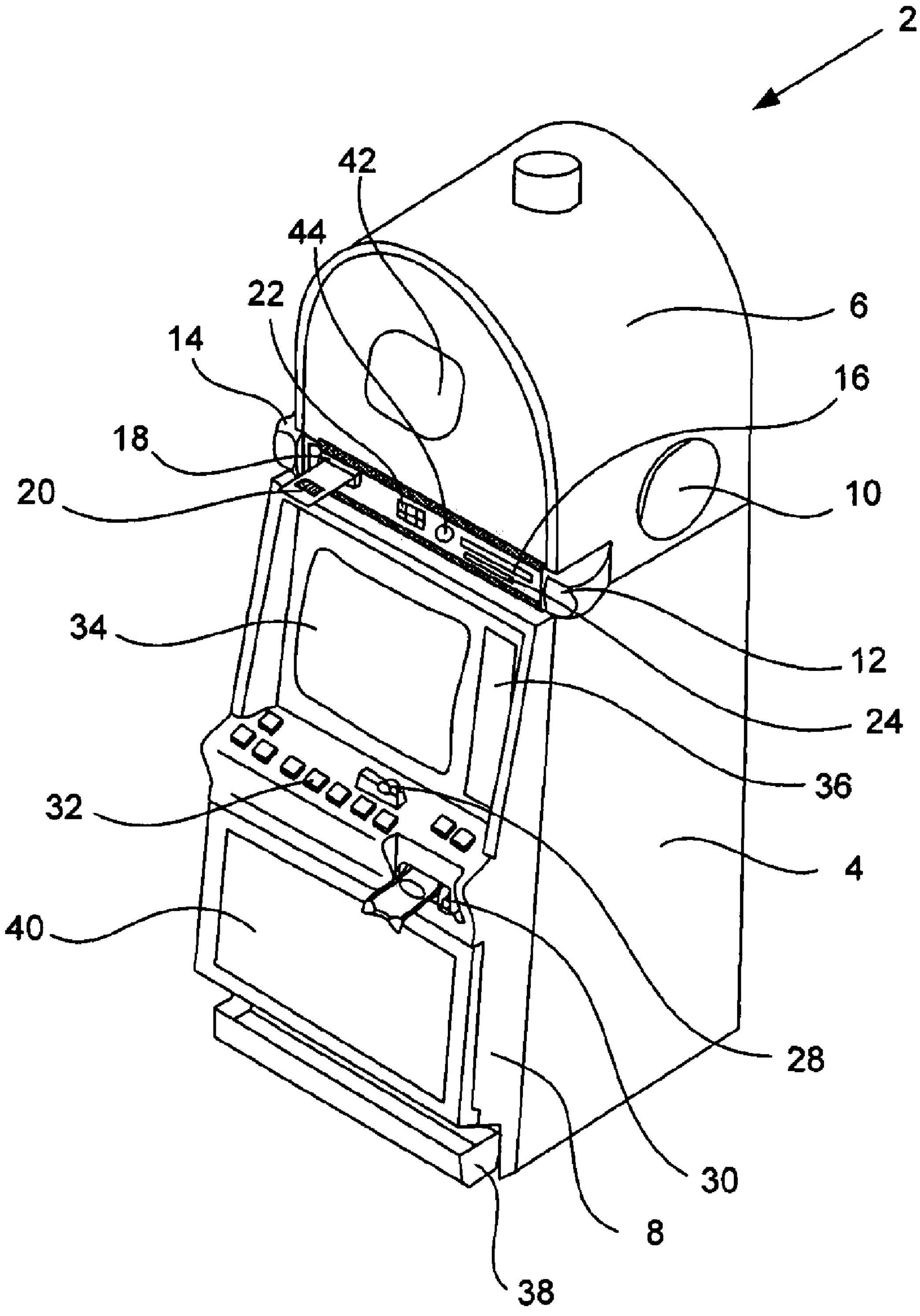
FIG. 9 is a perspective drawing of a gaming machine for one embodiment of the present invention.
Figure 10:
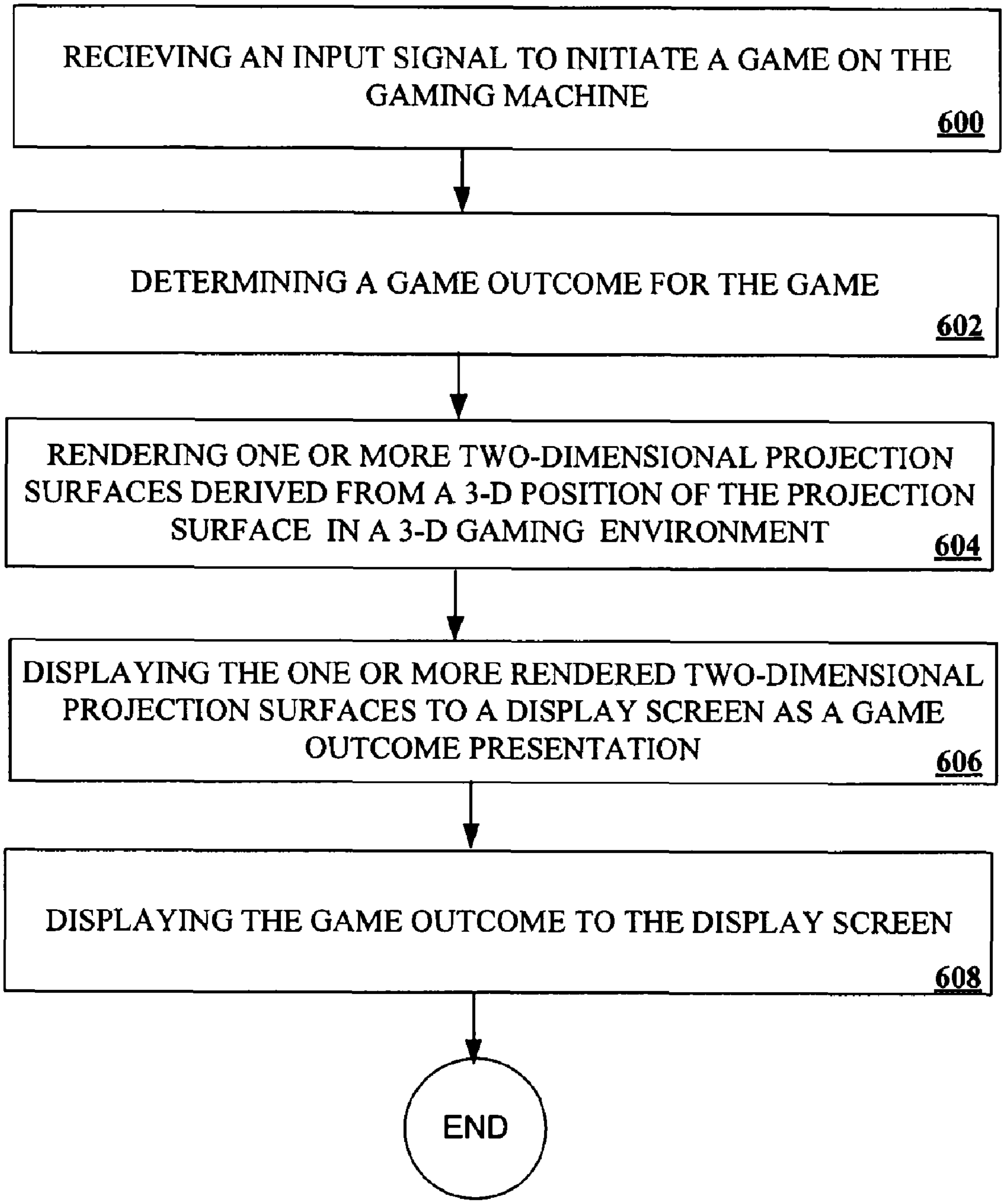
FIG. 10 is a flow chart depicting a method for generating a game of chance using a virtual gaming environment.
Figure 11:
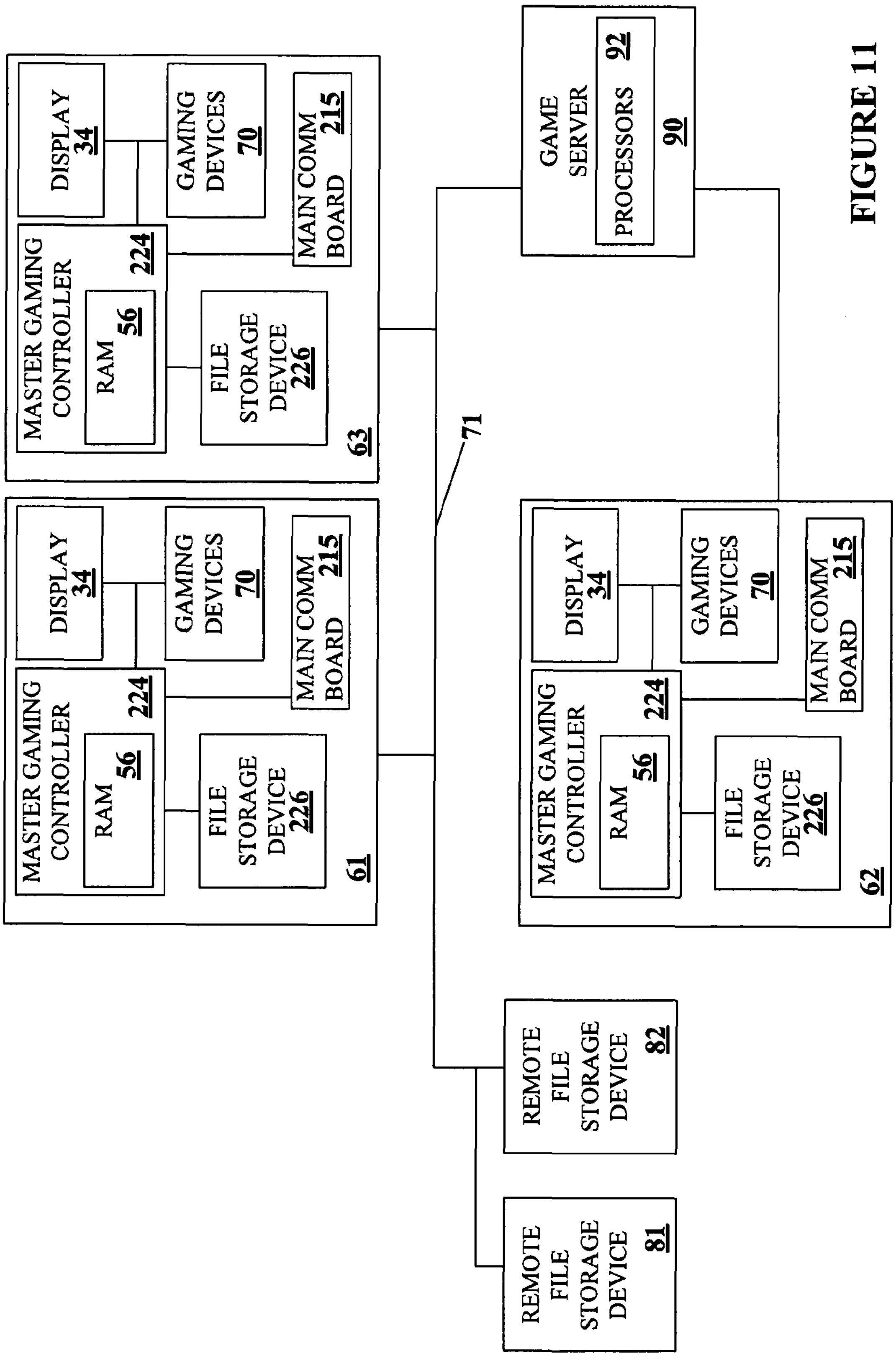
FIG. 11 is a block diagram of gaming machines that utilize distributed gaming software and distributed processors to generate a game of chance for one embodiment of the present invention.

In particular FIGS. 1-11 provide the following information. In FIG. 1, a 3-D gaming environment of the present invention is described. In FIG. 2, 3-D reels in the 3-D gaming environment are described. In FIG. 3, a method of generating a game of chance in a 3-D gaming environment is described. In FIGS. 4A-4D, a few issues relating to text rendering from a 3-D gaming environment are presented. In FIGS. 5A-5B, methods of generating text in a 3-D gaming environment are illustrated. In FIGS. 6A-6D, methods of generating fonts, characters and textures used in a 3-D text rendering for one embodiment of the present invention are described. In FIG. 7, one method of generating a 3-D text object in a 3-D gaming environment is presented. In FIGS. 8A-8B, video displays displaying text objects generated using different methods of the present invention are described. In FIG. 9, one embodiment of a gaming machine of the present invention is described. In FIG. 10, a method of generating a game of chance or bonus game using the 3-D gaming environments of the present invention is presented. In FIG. 11, a gaming network of the present invention is described.

Prior to describing FIG. 1, some general aspects of 3-D virtual gaming environments and their relationship to 2-D environments are discussed. To utilize a virtual 3-D gaming environment for a game presentation or other gaming activities on a gaming machine, a 2-D view of the virtual 3-D gaming environment is rendered. The 2-D view captures some portion of the 3-D surfaces modeled in the virtual 3-D gaming environment. The captured surfaces define a 3-D object in the 3-D gaming environment. The captured surfaces in 2-D view are defined in the 3-dimensional coordinates of the virtual 3-D gaming environment and converted to a 2-dimensional coordinate system during the capturing process. As part of a game presentation, the 2-D view may be presented as a video frame on a display screen on the gaming machine. In some ways, the two-dimensional view is analogous to a photograph of a physical 3-D environment taken by a camera where the photograph captures a portion of the physical 3-D surfaces existing in the physical 3-D environment. However, the photograph from a camera is not strictly analogous to a 2-D view rendered from a virtual 3-D gaming environment because many graphical manipulation techniques may be applied in a virtual 3-D gaming environment that are not available with an actual camera.

In the present invention, the 2-D view is generated from a viewpoint within the virtual 3-D gaming environment. The viewpoint is a main factor in determining what surfaces of the 3-D gaming environment defining a 3-D object are captured in the 2-D view. Since information about the 3-D gaming environment is stored on the gaming machine, the viewpoint may be altered to generate new 2-D views of objects within the 3-D gaming environment. For instance, in one frame, a 2-D view of an object modeled in the 3-D gaming environment, such as a front side of a building (e.g. the viewpoint captures the front side of a building), may be generated using a first viewpoint. In another frame, a 2-D view of the same object may be generated from another viewpoint (e.g. the backside of the building).

A disadvantage of current gaming machines is that the 2-D views used as video frames in game presentations are only rendered from 2-D objects and information about the multidimensional nature of the objects rendered in the 2-D views, such as the viewpoint used to generate the 2-D view, are not stored on the gaming machine. Historically, due to the regulatory environment of the gaming industry, gaming software used to present a game of chance has been designed to "run in place" on an EPROM installed on the gaming machine. Using an EPROM, it was not feasible to store large amounts of game data relating to a complicated 3-D model. Thus, only 2-D object information used to render the 2-D view was stored on the gaming machine.

However, 2-D games rendered on gaming machines have also become more sophisticated and often employ complex animations. When complicated animations are used in a 2-D system, such as playing movies on a 2-D object, a 3-D system can actually save memory because more types of animation can be used with a 3-D system versus a 2-D system without resorting to using movies, which are memory intensive. In a 2-D system without using movies, the animation properties that may be used are simple two-dimensional movement and color cycling using color palettes, which provide a limited visual appeal.

When only 2-D information about a 3-D object is available, it is not possible to generate new 2-D views from different viewpoints of the 3-D object. For instance, when a picture of a playing card is rendered on current gaming machines, 3-D information, such as the thickness of the card is not stored. Thus, it is not possible to generate a 2-D view of the playing card from an edge-on viewpoint, because the thickness of the card is not known. As another example, frames from a movie may be used as part of a game presentation on a gaming machine. Each frame of the movie represents a 2-D view from a viewpoint of a camera used to film each frame. If the frame included a picture of a building viewed from the front (e.g., the viewpoint captures the front of the building), it is not possible to generate a new 2-D view of the back of the building using because information regarding the back of the building is not known.

One advantage of the present invention is the potential game playing area used to present a game of chance modeled in a 3-D gaming environment is greater than the potential game playing area of a 2-D gaming environment. For instance, a game of chance may be presented on each of the six sides of a cube modeled in a virtual gaming environment. To play the game chance, 2-D views of the cube from different viewpoints in the 3-D gaming environment may be rendered in real-time and presented to the player. As described below, in some embodiments, the player may even select the viewpoint in the 3-D gaming environment used to generate the 2-D view.

On current gaming machines, the cube would be rendered as a 2-D object generated from the 3-D cube as seen from a particular viewpoint. The particular viewpoint is selected when the game is developed and only 2-D information about the cube as viewed from the selected viewpoint would be stored on an EPROM on the gaming machine. Thus, a game of chance could be presented on the sides of the cube rendered from the 2-D object that was generated from the selected viewpoint of the 3-D cube and stored on the EPROM. However, unless additional 2-D objects were generated from different viewpoints, it is not possible to present a game of chance on the sides of the cube not visible from the selected viewpoint because the 2-D object does not store information regarding the sides of the cube not visible from the selected viewpoint. Further, even if multiple 2-D objects were generated, it is difficult and time consuming to generate enough 2-D objects to allow smooth transitions between viewpoints captured by the 2-D objects. It is also difficult to a scale a 2-D object, either smaller or larger, without introducing distortion effects.

Distortion is also generated when scaling 3-D objects. However, it is easier to deal with using specialized 3-D graphics cards because the card applies a bilinear filtering process to the texels at render time. Without special hardware, such as a 3-D graphics card, it would be difficult to correct for distortion in real-time.

Finally, in a typical 2-D gaming system, due to the limited flexibility of 2D, outcomes for a game of chance rendered in 2D and displayed on a gaming machine have to be quantified and pre-rendered i.e. canned animations. Due to the flexibility of a 3-D gaming system the outcomes can be determined through user input giving an unlimited number of animations in response to the players input. By not having to make a series of pre-canned animations but instead determining the animation in response to the players input saves many bytes in storage space requirements. In following figures, details of methods and apparatus used to present a game of chance generated from a 3-D gaming environment are described.

Returning to FIG. 1, the 3-D gaming environment 100 includes three objects: 1) a rectangular box 101 on top of, 2) a plane 114 and 3) a second box 127. The box 101, box 127 and plane 114 are defined in a 3-dimensional rectangular coordinate space 104. Typically, surfaces of the objects in the gaming environment are defined using a plurality of surface elements. The surface elements may comprise different shapes, such as different types of polygons that are well known in the 3-D graphical arts. For example, the objects in the present information may be defined in a manner to be compatible with one or more graphics standards such as Open Graphics Library (OpenGL). Information on OpenGL may be found at www.opengl.org.

In one embodiment, the objects in the gaming environment 100 may be defined by a plurality of triangular elements. As an example, a plurality of triangular surface elements 125 are used to define a portion of the surface 108 and the surface face 112. In another embodiment, the objects in the gaming environment 100, such as box 101 and box 127, may be defined by a plurality of rectangular elements. In yet another embodiment, a combination of different types of polygons, such as triangles and rectangles may be used to describe the different objects in the gaming environment 100. By using an appropriate number of surface elements, such as triangular elements, objects may be made to look round, spherical, tubular or embody any number of combinations of curved surfaces.

Triangles are by far the most popular polygon used to define 3-D objects because they are the easiest to deal with. In order to represent a solid object, a polygon of at least three sides is required (e.g. triangle). However, OpenGL supports quads, points, lines, triangle strips and quad strips and polygons with any number of points. In addition, 3-D models can be represented by a variety of 3-D curves such as NURBs and Bezier Patches.

Each of the surface elements comprising the 3-D virtual gaming environment may be described in a rectangular coordinate system or another appropriate coordinate system, such as spherical coordinates or polar coordinates, as dictated by the application. The 3-D virtual gaming environments of the present invention are not limited to the shapes and elements shown in FIG. 1 or the coordinate system used in FIG. 1 which are shown for illustrative purposes only. Details of 3-D graphical rendering methods that may be used with the present invention are described in "OpenGL Reference Manual: The Official Reference Document to Open GL, Version 1.2," 3rd edition, by Dave Shreiner (editor), OpenGL Architecture Review Board, Addison-Wesley Publishing, Co., 1999, ISBN: 0201657651 and "OpenGL Program Guide: The Official Guide to Learning OpenGL, Version 1.2," 3rd edition, by Mason Woo, Jackie Neider, Tom Davis, Dave Shreiner, OpenGL Architecture Review Board, Addison-Wesley Publishing, Co., 1999, ISBN: 0201604582, which are incorporated herein in their entirety and for all purposes.

Surface textures may be applied to each of the surface elements, such as elements 125, defining the surfaces in the virtual gaming environment 100. The surface textures may allow the 3-D gaming environment to appear more "real" when it is viewed on a display screen on the gaming machine. As an example, colors, textures and reflectances may be applied to each of the surface elements defining the various objects in the 3-D gaming environment. Millions of different colors may be used to add a realistic "feel" to a given gaming environment. Textures that may be applied include smoothness or surface irregularities such as bumps, craters, lines, bump maps, light maps, reflectance maps and refractance maps or other patterns that may be rendered on each element. The textures may be applied as mathematical models stored as "texture maps" on the gaming machine.

In one embodiment, the "texture map" may be an animated texture. For instance, frames of a movie or another animation may be projected onto a 3-D object in the 3-D gaming environment. These animated textures may be captured in 2-D views presented in video frames on the gaming machine. Multiple animated textures may be used at the same time. Thus, for example, a first movie may be projected onto a first surface in the 3-D gaming environment and a second movie may be projected onto a second surface in the 3-D gaming environment where both movies may be viewed simultaneously.

Material properties of a 3-D surface may describe how the surface reacts to light. These surface properties may include such things as a) a material's ability to absorb different wavelengths of light, b) a material's ability to reflect different wavelengths of light (reflectance), c) a material's ability to emit certain wavelengths of light such as the taillights on a car and d) a material's ability to transmit certain wavelengths of light. As an example, reflectance refers to how much light each element reflects. Depending on the reflectance of a surface element other items in the gaming environment may be reflected fuzzily, sharply or not at all. Combinations of color, texture and reflectance may be used to impart an illusion of a particular quality to an object, such as hard, soft, warm or cold.

Some shading methods that are commonly used with 3-D graphics to add texture that may be applied to the present invention include gourand shading and phong shading. Gourand and phong shading are methods used to hide an object's limited geometry by interpolating between two surfaces with different normals. Further, using Alpha Blending, pixels may be blended together to make an object appear transparent i.e. the object transmits light.

Virtual light sources, such as 102, may be used in the gaming environment to add the appearance of shading and shadows. Shading and shadows are used to add weight and solidity to the rendering of a virtual object. For example, to add solidity to the rectangular box 101, light rays emitted from light source 102 are used to generate a shadow 103 around the rectangular box 101. In one method, ray tracing is used to plot paths of imaginary light rays emitted from an imaginary light source such as 102. These light rays may impact and may reflect off various surfaces affecting the colors assigned to each surface element. In some gaming environments, multiple light sources may be used where the number of lights and the intensity of each light source change with time. Typically, in real time 3D, the light sources do not generate shadows and it is up to the programmer to add shadows manually. As stated earlier, however, the light sources produce shading on objects.

Perspective, which is used to convey the illusion of distance, may be applied to the gaming environment 100 by defining a vanishing point, such as 128. Typically, a single point perspective is used where all of the objects in the scene are rendered to appear as though they will eventually converge at a single point in the distance, e.g. the vanishing point. However, multiple point perspectives may also be employed in 3-D gaming environments of the present invention. Perspective allows objects in the gaming environment appear behind one another. For instance, box 101 and box 127 may be the same size. However, box 127 is made to appear smaller, and hence farther away, to a viewer because it is closer to the vanishing point 128. A 3-D gaming environment may or may not provide perspective correction. Perspective correction is accomplished by transforming points towards the center of the 2-D view screen. The farther away an object is from the viewpoint in 3-D gaming environment, the more it will be transformed into the center of screen.

The present invention is not limited to perspective views or multiple perspective views of the 3-D gaming environment. An orthographic view may be used where 3-D objects rendered in a 2-D view always appear the same size no matter how far away they are in the 3-D gaming environment. The orthographic view is what you would see as a shadow cast from a light source that is infinitely far away (so that the light rays are parallel), while the perspective view comes from a light source that are finitely far away, so that the light rays are diverging. In the present invention, combinations of both perspective and orthographic views may be used. For instance, an orthographic view of a text message may be layered on top of a perspective view of the 3-D gaming environment.

Related to perspective is "depth of field". The depth of field describes an effect where objects that appear closer to a viewer are more in focus and objects that are farther away appear out of focus. Depth of field may be applied renderings of the various objects in the gaming environment 100. Another effect that may be applied to renderings of objects in the gaming environment is "anti-aliasing". Anti-aliasing is used to make lines, which are digitally generated as a number of straight segments, appear smoother when rendered on a display screen on the gaming machine. Because the 2D display only takes finite pixel positions, stair stepping occurs on any limes that are not straight up and down, straight across (left and right) or at 45 degrees on the display screen. Stair stepping produces a visually unappealing effect, thus, pixels are added to stair-stepped lines to make this effect less dramatic.

Objects in the gaming environment 101 may appear to be static or dynamic. For instance, the coordinates of box 127 may change with time while the coordinates of box 101 and plane 114 remain fixed. Thus, when rendered on a display screen on a gaming machine, the box 127 may appear to move in the gaming environment 101 relative to the box 101. Many dynamic effects are possible. For instance, box 127 may appear to rotate while remaining in a fixed position or may rotate while also translating to generate an effect of bouncing or tumbling. Further, in the gaming environment, objects may appear to collide with one another. For instance, box 127 may appear to collide with box 101 altering the trajectory of box 127 in the gaming environment. Many digital rendering effects may be applied to the gaming environment of the present invention. The effects described above have been provided for illustrative purposes only.

Standard alphanumeric text and symbols may be applied to one or more surface elements in the gaming environment 101 to display gaming information to a game player. The alphanumeric text and symbols may be applied to various surfaces in the gaming environment to generate a plurality of game displays that may be used as part of game outcome presentations viewed on the gaming machine. For instance, game displays may be rendered on each of the 6 six surface faces of box 101 or box 127 and a plurality of game displays may also be rendered on planar surface 114. In the present invention, game displays may be rendered across one or more surfaces of any polyhedron or other object defined in the gaming environment.

The rendered text and symbols allow game outcome presentations to be generated for different games of chance. For instance, a card hand for a poker game or black jack game may be rendered on each of the faces of box 101 such as surfaces 108, 110 and 112. As another example, keno numbers or bingo numbers may be rendered on different faces of boxes 101 and 127. Further, slot displays and pachinko displays for slot and pachinko game outcome presentations may be rendered on different faces of boxes 101 and 127.

Many different combinations of games of chance may be rendered in the gaming environment 100. For instance, a slot display may be rendered on face 108 of box 101, a black jack game display may be rendered on face 110, poker game display may be rendered on face 112, a keno game display may be rendered on a face on the box 101 opposite face 108, a pachinko game display may be rendered on a face on the box 101 opposite 110 and a bingo game display may be rendered on a face on the box 101 opposite face 112. A different combination of game displays may be rendered on the surfaces of box 127. Other games of chance that may be used in the present invention include but are not limited to dice games (e.g. craps), baccarat and roulette.

In the present invention, games of chance are used to denote gaming activities where a game player has made a wager on the outcome of the game of chance. Depending on the game outcome for the game of chance initiated by the player, the wager may be multiplied. The game outcome may proceed solely according to chance, i.e. without any input by the game player or the game player may affect the game outcome according to one or more decisions. For instance, in a video poker game, the game outcome may be determined according to cards held or discarded by the game player. While in a slot game, the game outcome, i.e. the final position of the slot reels, is randomly determined by the gaming machine.

The combinations of games described above may be rendered at the same time in the 3-D gaming environment. A player may play one or more games in a sequential manner. For instance, a player may select one or more games, make a wager for the one or more games and then initiate the one or more games and view game outcome presentations for the one or more games. A player may also play one or more games in a parallel manner. For instance, a player may select one or more games, make a wager for the one or more games, and initiate the one or more games. Before the game outcome presentations have been completed for the one or more selected games, the player may select one or more new games, make a wager for the one or more new games and initiate the one or more new games. Details of a parallel game methodology are described in co-pending U.S. application Ser. No. 09/553,437, filed on Apr. 19, 2000, by Brosnan et al. and entitled "Parallel Games on a Gaming Device," which is incorporated in its entirety and for all purposes.

The rendered text and symbols in a game display are not necessarily planar may be rendered in multiple in dimensions in the gaming environment 100. For example, rendered cards may have a finite thickness or raised symbols. The cards may be dealt by hands that are defined as 3 dimensional object models in the 3-D gaming environment 100 and move as the cards are dealt. As another example, a slot display may be rendered as multidimensional reels with symbols (see FIG. 2) that may rotate in the gaming environment 100.

A game display for a game outcome presentation may be rendered on a particular surface and may change with time in response to various player inputs. For example, in a poker game, a player may discard and hold various cards while they are playing the game. Thus, the cards in the hand change as the game outcome is rendered in the 3-D gaming environment and some cards (e.g. discarded cards) may appear to leave the gaming environment. As another example, reels on a slot display rendered in the gaming environment may begin to spin in the gaming environment in response to a player pulling a lever or depressing an input button on the physical gaming machine.

Other game features and gaming information may also be rendered in the gaming environment 100. For example, bonus games, promotions, advertising and attraction graphics may also be rendered in the gaming environment. For instance, a casino's logo or a player's face may be rendered in the gaming environment. These additional game features may be integrated into a game outcome presentation on the gaming machine or other operational modes of the gaming machine such as an attract mode.

In another embodiment of the present invention, a virtual person, e.g. a 3-D dimensional model of a portion (e.g., face, hands, face, head and torso, etc.) or all of a human being may be rendered in the 3-D gaming environment. The virtual person may be animated. For the instance, by adjusting parameters of the 3-D dimensional model of the virtual person in a sequence, the virtual person may appear to speak or gesture. The virtual person may be used to explain gaming instructions to a game player or may be used as a component in a game presentation. The virtual person may appear to respond or interact with a user according to inputs into the gaming machine made by the user. For instance, a player may ask the virtual person a particular question via an input mechanism on the gaming machine such as microphone on a gaming machine equipped with voice recognition software. Next, the virtual person may appear to speak a response to the question input by the user. Animated 3-D models for other objects, such as animals or fictional characters, may also be used in the 3-D gaming environment.

After the gaming environment is defined in 3-dimensions, to display a portion of the 3-D gaming environment on a display screen on the gaming machine, a "photograph" of a portion of the gaming environment is generated. The photograph is a 2-dimensional rendering of a portion of the 3-dimensional gaming environment. Transformations between 3-D coordinate systems and 2-D coordinate systems are well known in the graphical arts. The photograph may be taken from a virtual "camera" positioned at a location inside the gaming environment 100. A sequence of photographs taken by the virtual camera in the gaming environment may be considered analogous to filming a movie.

A "photograph" displayed on the display screen of a gaming machine may also be a composite of many different photographs. For instance, a composite photograph may be generated from portions of a first photograph generated using an orthographic view and portions of a second photograph generated using a perspective view. The portions of the photographs comprising the composite photograph may be placed on top of one another to provide "layered" effects, may be displayed in a side-by-side manner to produce a "collage" or combinations thereof.

In another embodiment of the present invention, a photograph may be a blended combination of two different photographs. Using an interpolation scheme of some type, two photographs may be blended in a sequence of photographs to provide a morphing effect where the first photograph appears to morph into a second photograph. For instance, a slot game may appear to morph into a poker game.

Operating parameters of the virtual camera, such as its position at a particular time, are used to define a 3-D surface in the gaming environment, which is projected on to a 2-D surface to produce the photograph. The 3-D surface may comprise portions a number of 3-D objects in the 3-D gaming environment. The 3-D surface may also be considered a 3-D object. Thus, a photograph is a 2-D image derived from 3-D coordinates of objects in the 3-D gaming environment. The virtual camera may represent gaming logic stored on the gaming machine necessary to render a portion of the 3-D gaming environment 100 to a 2-D image displayed on the gaming machine. The photograph is converted into a video frame, comprising a number of pixels, which may be viewed on a display screen on the gaming machine.

The transformation performed by the virtual camera allowing a portion of the virtual gaming environment to be viewed one or more display screens on the gaming machine may be a function of a number of variables. The size of lens in the virtual gaming environment, the position of the lens, a virtual distance between the lens and the photograph, the size of the photograph, the perspective and a depth variable assigned to each object are some of the variables that may be incorporated into a transformation by the virtual camera that renders a photograph of the virtual gaming environment. The resolution of the display screen on the gaming machine may govern the size of a photograph in the virtual camera. A typical display screen may allow a resolution of 800 by 600 color pixels although higher or lower resolution screens may be used. A "lens size" on the virtual camera defines a window into the virtual gaming environment. The window is sometimes referred to as a viewport. The size and position of the lens determines what portion of the virtual gaming environment 100 the virtual camera views.

After the photograph of the virtual gaming environment has been generated, other effects, such as static and dynamic anti-aliasing, may be applied to the photograph to generate a frame displayed on one or more displays located on the gaming machine. Typically, the mathematical and logical operations, which are encoded in gaming software logic, necessary to perform a particular transformation and generate a video frame may be executed by video cards and graphics cards located on the gaming machine and specifically designed to perform these operations. The graphics cards usually include graphical processing units (GPUs). However, the transformation operations may also be performed by one or more general purpose CPUs located on the gaming machine or combinations of GPUs and CPUs.

In general, the 2D/3D video graphics accelerators or coprocessors often referred to as graphics processing units (GPUs), are located on or connected to the master gaming controller and are used to perform graphical operations. The solutions described are most commonly found as video cards. The graphical electronics may be incorporated directly onto the processor board (e.g. the master gaming controller) of the gaming machine, and even tightly integrated within other very large-scale integrated chip solutions. The integration methods are often cost saving measures commonly used to reduce the costs associated with mass production. For instance, video cards, such as the Vivid!XS from VideoLogic Systems (VideoLogic Systems is a division of Imagination Technologies Group plc, England) may used to perform the graphical operations described in the present invention. As another example, video cards from Nvidia Corporation (Santa Clara, Calif.) may be employed. In one embodiment, the video card may be a multi-headed 3-D video card, such as a Matrox G450 (Matrox Graphics Inc., Dorval, Quebec, Canada). Multi-headed video cards let a single graphics card power two displays simultaneously or render two images simultaneously on the same display.

When displaying photographs from a virtual camera in a 3-D gaming environment, a single image from the camera may be divided among a plurality of display devices. For instance, four display screens may be used to display one quarter of a single image. The video feeds for each of the plurality of display devices may be provided from a single video card. Multi-headed video cards let a single graphics card (or graphics subsystem) display output on two or more displays simultaneously. This may be multiple output rendering for each display or one rendering over multiple displays, or variation of both. For example, when a multi-headed video card is used, a first head on the multi-headed video card may be used to render an image from a first virtual camera in a 3-D gaming environment and a second head on the multi-head video card may be used to render a second image from a second virtual camera in a 3-D gaming environment. The rendered first and second images from the first head and the second head may be displayed simultaneously on the same display or the first image may be displayed on a first display and the second image may be displayed on a second display.

Returning to FIG. 1, three lenses, 105, 106 and 107 used in a virtual camera are shown positioned at three locations in the virtual gaming environment. Each lens views a different portion of the gaming environment. The size and shape of the lens may vary which changes a portion of the virtual gaming environment captured by the lens. For instance, lenses 105 and 106 are rectangular shaped while lens 107 is ovular shaped.

Lens 106 is positioned to view the "game display" for a game outcome presentation rendered on surface 108. The portion of the gaming environment captured by lens 106 is a six-sided shape 120. As described above, the game display may contain the presentation of a particular game played on the gaming machine, such as a hand of cards for a poker game. After applying an appropriate transformation, a photograph 124 of the portion of the virtual gaming environment 100 in volume 120 is generated by the virtual camera with lens 106.

Using differing terminology that is common within the 3D graphics community, the lenses 105, 106 and 107 may be described as a camera. Each camera has the ability to have different settings. A scene in the 3-D gaming environment is shot from the camera's viewpoint. A different scene is captured from each camera. Thus, the scene is rendered from the camera to produce and image.

The photograph 124 generated from the virtual camera with lens 106 may be viewed on one or more display screens on the gaming machine. For instance, photograph 124 may be viewed on a main display on the gaming machine and a secondary display on the gaming machine. In another embodiment, a portion of photograph 124 may be displayed on the main display and a portion of the photograph may be displayed simultaneously on a secondary display. In yet another embodiment, a portion of photograph 124 may be displayed on a first gaming machine while a portion of photograph 124 may be displayed simultaneously on a second gaming machine.

Lens 105 of a virtual camera is positioned to view volume 121 in the virtual gaming environment 100. The volume 121 intersects three faces, 108, 110 and 112, of box 101. After applying an appropriate transformation, a photograph 125 of the portion of the virtual gaming environment 101 in volume 121 is rendered by the virtual camera with lens 105 which may be displayed on one of the display screens on a gaming machine.

Lens 107 of a virtual camera is positioned to view volume 122 in the virtual gaming environment 100. The ovular shape of the lens produces a rounded volume 122 similar to a light from a flashlight. The volume 122 intersects a portion of face 110 and a portion of plane 114 including a portion of the shadow 103. After applying an appropriate transformation, a photograph 126 of the portion of the virtual gaming environment 101 in volume 122 is rendered by the virtual camera with lens 107 which may be displayed on one or more of the display screens on a gaming machine. For instance, a gaming machine may include a main display, a secondary display, a display for a player tracking unit and a remote display screen in communication with the gaming machine via a network of some type. Any of these display screens may display photographs rendered from the 3-D gaming environment.

A sequence of photographs generated from one or more virtual cameras in the gaming environment 101 may be used to present a game outcome presentation on the gaming machine or present other gaming machine features. The sequence of photographs may appear akin to movie or film when viewed by the player. For instance, a 3-D model of a virtual person may appear to speak. Typically, a refresh rate for a display screen on a gaming machine is on the order of 60 HZ or higher and new photographs from virtual cameras in the gaming environment may be generated as the game is played to match the refresh rate.

The sequence of photographs from the one or more virtual cameras in the gaming environment may be generated from at least one virtual camera with a position and lens angle that varies with time. For instance, lens 106 may represent the position of a virtual camera at time, $t_1$, lens 105 may represent the position of the virtual camera at time, $t_2$, and lens 107 may represent the position of the virtual camera at time $t_3$. Photographs generated at these three positions by the virtual camera may be incorporated into a sequence of photographs displayed on a display screen.

The position of the virtual camera may change continuously between the positions at times $t_1$, $t_2$, $t_3$ generating a sequence of photographs that appears to pan through the virtual gaming environment. Between the positions at times $t_1$, $t_2$, $t_3$, the rate the virtual camera is moved may be increased or decreased. Further, the virtual camera may move non-continuously. For instance, a first photograph in a sequence of photographs displayed on a display screen may be generated from the virtual camera using the position of lens 106. The next photograph in the sequence of photographs may be generated from the virtual camera using the position of lens 105. A third photograph in the sequence of photographs may be generated from the virtual camera using the position of lens 107. In general, the virtual camera in the gaming environment 101 may move continuously, non-continuously and combinations thereof.

In a game presentation, a plurality of virtual cameras, with time varying positions, in a plurality of virtual gaming environments may be used. The camera and environment information as a function of time may be stored on the gaming machine and may be accessed when a particular scene for a game event in a game outcome presentation is needed such that the scene may be rendered in "real-time". A scene may be defined by the positions of one or more virtual cameras in one or more gaming environments as a function of time. The scenes may be modularized, i.e. a library of scenes may be generated, so that they may be incorporated into different games. For instance, a scene of a button being depressed may be incorporated into any game using this type of sequence.

A sequence of photographs generated from a first virtual camera in a first virtual gaming environment may be displayed simultaneously with a sequence of photographs generated from a second virtual camera in a second virtual gaming environment. For instance, the first sequence of photographs and second sequence and second sequence of photographs may be displayed on a split screen or may be displayed on different screens. In addition, the first virtual camera in a first virtual gaming environment and the second virtual camera may be located in a second virtual gaming environment different from the first virtual gaming environment. Also, the first virtual gaming environment and the second virtual gaming environment may be in the same gaming environment. Further, a single virtual camera may jump between different gaming environments, such as between a game play environment to a bonus game environment. The transition between the gaming environments may also appear to be smooth (e.g. the camera may pan from one environment in a continuous manner).

In some embodiments, a player may be to select one or more virtual gaming environments used in a game play on a gaming machine. For instance, a first gaming environment may involve a cityscape, such as New York, while a second gaming environment may involve a cityscape, such as Paris. During a game play on a gaming machine, a player may be able to select New York or Paris as a cityscape for the virtual gaming environment used during game play. The different game environments and different scenes generated from the environments may be stored in a memory on the gaming machine as a library of some type.

In particular embodiments, while using the gaming machine, a player may be able to control the position of the virtual camera using an input mechanism on the gaming machine (see FIG. 9). For instance, a player may be able to move the position of lens 106 closer to the surface 108 in the gaming environment 108 which generates the appearance of zooming or the object may be moved closer to the camera. For multiple hand card games, a player may be able to zoom-in on a particular hand to "expand on demand" the hand increasing the visibility of the hand. For instance, a player may use an input mechanism to "scroll" the camera and view larger portions. As another example, the player may be able maneuver a virtual camera through the gaming environment or select a scene in the gaming environment. An opportunity to move the virtual camera may be triggered by certain game events such as a bonus game event on the gaming machine or the movement of the camera may be scripted (e.g. pre-determined) as part of the game playing sequence. For example, as part of the play of a bonus game event, a player may be able to choose from a number of doors leading to different rooms with treasure chests. When the player enters of one of the rooms, the chest is opened their bonus award is revealed.

With the present invention, some advantages of generating a 3-D gaming environment that may be rendered in real-time to a display screen are as follows. First, it allows a player to be presented and possibly control a complex game outcome presentation in real-time. Thus, the game outcome presentation may be varied from game to game in a manner determined by the player. Traditional game outcome presentations have been modeled in 2-D and little control has been given to the player. Thus, traditional game outcome presentations do not vary much from game to game. Second, screen resolution issues associated with presenting a large number of games simultaneously on a single screen may be avoided by modeling the games in 3-D gaming environment.

At any given time during a game presentation viewed on a display screen on the gaming machine, only a portion of the plurality of the games modeled in the 3-D gaming environment may be visible to the player. Thus, a game playing are in a 3-D gaming environment is greater than a 2-D gaming environment because a game of chance may be presented on surfaces modeled in the 3-D gaming environment that may be hidden from view. In a 2-D gaming environment, there are not any hidden surfaces i.e. "what you see" is "what you get." Since the viewpoint in the 3-D model may be varied, the player or gaming machine may zoom-in on one or more games of interest, some of which may be hidden in a current 2-D view, and select a desirable resolution level. Thus, all of the games or game components do not have to be rendered on a single screen simultaneously.

FIG. 2 is a is a perspective drawing of three virtual slot reels, 202, 204 and 206 in a 3-D virtual gaming environment 200 implemented on a gaming machine for one embodiment of this invention. The three slot reels are modeled as cylinder portions in coordinate space 201. The reels appear to be hanging in space. Different symbols are rendered on each reel including a triangle 210, a triple bar 212, a "seven" 214, double bar 216 and an oval 218. Other symbols (not shown) may be rendered on the backs of the reels. In a virtual 3-D slot gaming environment, such as 200, a size of the reels, a number of reels, a number of symbols on the reels and types of symbols on the reels may be varied. Also, background scenery (not shown) may be also varied in the environment.

A window 208 is rendered over the reels, 202, 204 and 206, to illustrate a number of symbols that may be visible on a mechanical slot display. At most, nine symbols, e.g. the three double bars, three sevens and three triple bars may be viewed on the mechanical slot display. When the player views multiple symbols, the multiple symbols may be used to generate multiple paylines that may be wagered on during game play.

When reels on a gaming machine stop after a wager has been received and a game has been initiated, a combination of symbols along a payline may be compared to winning combinations of symbols to determine an award for the game. For instance, three paylines 228, 229 and 230 are shown. Three "sevens" symbols are along payline 229. A triple bar, a seven and a double bar are shown along paylines 228 and 230. Often triple seven combination is used as a winning combination on slot games. The number of paylines increases the betting opportunities for a given game and some players desire multiple payline games. In some slot games, only a single line of symbols may be viewed, such as the three sevens, and a player may bet on only a single payline.

For a game outcome presentation, the slot reels 202, 204 and 206 may each begin to rotate and move in the virtual gaming environment. In the virtual space 200, the reels may rotate in different directions, translate, rotate around different axis, shrink in size or grow in size, as the reels are not limited by the constraints of actual mechanical slot reels. During the game outcome presentation, a virtual camera, which may vary its position as a function of time, may film a sequence (e.g., generate a number of photographs in a sequence) that are displayed on a display screen on the gaming machine and that capture the motion of the reels.

A number of virtual cameras may be positioned in the virtual gaming environment 200 to capture one or more symbols on the slot reels. For instance, lens 220 of a virtual camera captures the "7" symbol on reel 202 in volume 221 of the virtual gaming environment 200. Lens 222 of a virtual camera captures the "triangle" symbol on reel 204 in volume 223 of the virtual gaming environment. Lens 224 of a virtual camera captures a "triple bar" symbol (not shown) on reel 204 of the virtual gaming environment. Finally, Lens 226 of a virtual camera captures the "oval" symbol on reel 206 in volume 226 of the virtual gaming environment. However, a single virtual camera may also by used to capture multiple symbols such as a line of symbols across multiple reels.

The symbols captured from the virtual cameras using lens 220, 222, 224 and 226 may be used to create various paylines that may be used for wagering. For example, the symbols captured from lens 220, 222 and 226 are used to generate a first combination of symbols 232 which may wagered on during game play. The symbols captured from lens 220, 224 and 226 are used to generate a second combination of symbols 234 which may be wagered on during game play. Finally, virtual cameras may be positioned along payline 230 to capture the combination of symbols 236.

In the present invention, the number of paylines that may be implemented is quite large. For instance, for three virtual reels with 25 symbols on each reel, 253 paylines may be utilized. In one embodiment, to aid in the display of a large amount of gaming information generated in one virtual gaming environment, gaming information generated in a first gaming environment may be transferred to a second gaming environment. For example, gaming information regarding combinations of symbols along a plurality of paylines generated in gaming environment 200 may be transferred to a second gaming environment with virtual cameras for rendering it to a display viewed by a player.

In another embodiment, the slot reels 202, 204, 206 may appear translucent such that symbols on the back of the reel may be visible from the front. Paylines, that may be wagered on by a player, may be rendered in "virtual space" to connect symbols on the front of a reel to a symbol on the back of the reel. For instance, a payline may be rendered from the front of reel 202 to the back of reel 204 and to the front of reel 206.

Next, other embodiments for displaying symbols that may be used in games of chance and bonus games of present invention are described and contrasted with a traditional mechanical slot machine. In a mechanical slot game, a reel strip is mounted to a reel that is rotated by a motor. The reel strip may be a rectangular strip of a printable media with a number of different symbols printed on it. The symbols are arranged in a particular sequence. A typical mechanical slot game may employ a plurality of reels, such as three reels, to present a game of chance.

The mechanical slot machine may include one or more paytables that define a probability of each position occurring for a single reel/wheel or a probability of each combination of positions occurring for a plurality of reels. For example, some mechanical slot machines include a bonus wheel and 3 reels. The probability of each position or combinations of positions may be proportional to a payout for a game of chance played on the slot machine. After a wager has been made and the game has been initiated, to determine an outcome for the game of chance, a random number may be generated and compared with entries in the paytable stored on the gaming machine.

Using the paytable and the random number, a position of each of the one or more reels and or wheels and a payout for the game may be determined. The slot machine may then rotate the reels based upon an algorithm stored in the gaming machine and stop them at the predetermined position. The position on each reel is usually marked with a symbol printed on the reel strip at the position or a blank space. Usually, only a portion of the symbols on each reel strip is visible to a player at any one time. Thus, as the one or more reels spin, the player views different portions of each reel strip. The final position of the one or more reels indicates a symbol or a combination of symbols. The combination of symbols displayed on the mechanical reels, as defined by a payline, may be used by the player to determine whether the combination is a winning combination.

FIG. 3 is a flow chart depicting a method for generating a game using a 3-D virtual gaming environment. In 700, game events that comprise a game of chance played on the gaming machine and are represented visually are selected. In 705, a 3-D visual storyboard describing a scene in one or more virtual gaming environments is generated for each game event. The scene information may include virtual camera positions as a function of time in one or more gaming environments. For instance, a storyboard for cards being dealt in a card game may describe a pair of 3-D hands dealing the card over a gaming table with a virtual camera positioned directly above the gaming table looking down at the hands. The scene information may also include gaming information generated in a textual format, which is rendered in the 3-D gaming environment using 3-D text objects of the present invention (see FIGS. 4A-8B). In 710, a scene corresponding to the 3-D visual storyboard for each game event is generated in one or more 3-D virtual gaming environments. In 715, a scene corresponding to the visual storyboard for each game event is "filmed" in the one or more 3-D gaming environment. Filming each game event in the 3-D gaming environment comprises selecting a sequence of virtual camera positions and angles in the one or more 3-D gaming environments. In some embodiments, a player may control the position of the virtual camera in some manner. In 720, a sequence of 2-D projection surfaces (e.g. virtual camera images) derived from three-dimensional coordinates of surfaces in the 3-D gaming environment is rendered to a display screen on the gaming machine.

In FIGS. 4A-8B, issues and details related to rendering 3-D text in a 3-D gaming environment of the present invention are described. In the present invention, as described with respect to FIG. 1, 3-D text objects for the display of gaming information in a textual format may be generated at run-time by the gaming machine, i.e., the text is not in a pre-rendered display format. Using the present invention, a designer may be able to specify and easily adjust the format and look of graphical text that is rendered from a 3-D gaming environment and displayed to a display screen of the gaming machine. The designer may be able to specify the visually formatting of a text string using function calls that are stored in a script file on the gaming machine. Using these function calls, the master gaming controller on the gaming machine may render the text in the manner specified by the designer. High-level issues and methods related to 3-D text rendering in a 3-D gaming environment are described with respect to FIGS. 4A-5B. Next, the details of generating a specific font in the 3-D gaming environment are described.

The first step in generating formatted text displays using 3-D text objects of the present invention on the gaming machine may be the creation of a font (see FIGS. 6A-6D). A font may be a collection of data that represents the visual aspect and placement of characters, which can then be used to form words, sentences and paragraphs. The collection of data may be stored in a font file.

The font file may be then loaded on the gaming machine, which can use the font information to produce formatted text output used in a 3-D gaming environment at run-time (see FIGS. 7 and 8A-8B). The formatted text output may be generated as a 3-D text object and rendered in the 3-D gaming environment as a bitmap frame used in a game outcome presentation displayed on the gaming machine. In particular, in one embodiment, the fonts may include bitmaps of alphanumeric characters, which are mapped to polygons. The bitmaps provide a texture for the polygons. The resulting polygons with their associated textures may be used to represent a text string and are referred to as a 3-D text object. In another embodiment, the font may include descriptions of 3-D vertices of shapes used as 3-D alphanumeric characters. The shapes may be assembled in the 3-D gaming environment with an appropriate texture to generate a 3-D text object of a text string. The locations of a plurality of characters (polygons with texture maps) in the 3-D gaming environment relative to one another may be determined using various typesetting rules. The typesetting rules, such as character spacing or line width, may be implemented for the purpose of increasing the quality of the text when it is displayed on a visual display of the gaming machine.

The 3-D text object, which generally comprises a plurality of characters in a text string, may be captured by a virtual camera in the 3-D gaming environment and used as part of game outcome presentation or bonus game presentation on the gaming machine. Details of the gaming software architecture and gaming operating system that may be used with the present invention are described in co-pending U.S. application Ser. No. 10/040,329, filed on Jan. 3, 2002, by LeMay, et al., entitled, "Game Development Architecture That Decouples The Game Logic From The Graphics Logic," and U.S. application Ser. No. 10/041,212, filed Jan. 7, 2002, by Breckner, et al, entitled "Decoupling Of The Graphical Presentation Of A Game From The Presentation Logic," each of which is incorporated herein by reference in their entirety and for all purposes.

Typesetting, i.e., the generation of printed text, has a long history, dating back hundreds of years. In recent years, mechanical processes for typesetting have been adapted to the computer via word processors. Word processors allow a user to arrange alphanumeric characters on a virtual paper on a computer display screen and print the characters via a printer to a piece of paper. The word processors employ rules, many originally developed with respect to mechanical typesetting, that specify how to arrange the characters relative to one another and the properties of the characters for maximum readability after printing. Producing highly readable text is important in the gaming industry because displaying of text of a low readability may be associated with an inferior quality of the product to which the text is associated.

Although many mechanical typesetting rules that increase readability can be directly applied to computer word processors, other rules have been specifically developed and/or have had to be adapted for issues particularly related to the computer media. For instance, scaling of pixilated characters is one example where typesetting rules have been developed specifically for the computer media. A few scaling issues related to computer rendering of text are described with respect to FIGS. 4A and 4B. This scaling of characters is provided to illustrate that when a new method/apparatus for generating text is introduced in a new environment, e.g., 3-D gaming environments of the present invention, new typesetting methods may be required to suit the requirements new methods/apparatus. Further, scaling issues are also important when rendering text in a 3-D gaming environment.

In a mechanical printer, such as typewriter, a character is formed on the paper when a mechanical key with an alphanumeric character strikes an ink ribbon to transfer a pattern of the character on the key to the paper. In a computer word processor, a bit map of an alphanumeric character, which comprises a series of colored bits, may be used to generate text on a screen or a printer. On the computer, a bitmap can be scaled to make the character appear bigger or smaller, i.e., to increase the font size when it is printed to a monitor or a display screen. Computer scaling is much easier than in a mechanical environment and is an advantage of a computer word processor.

Figure 4A:
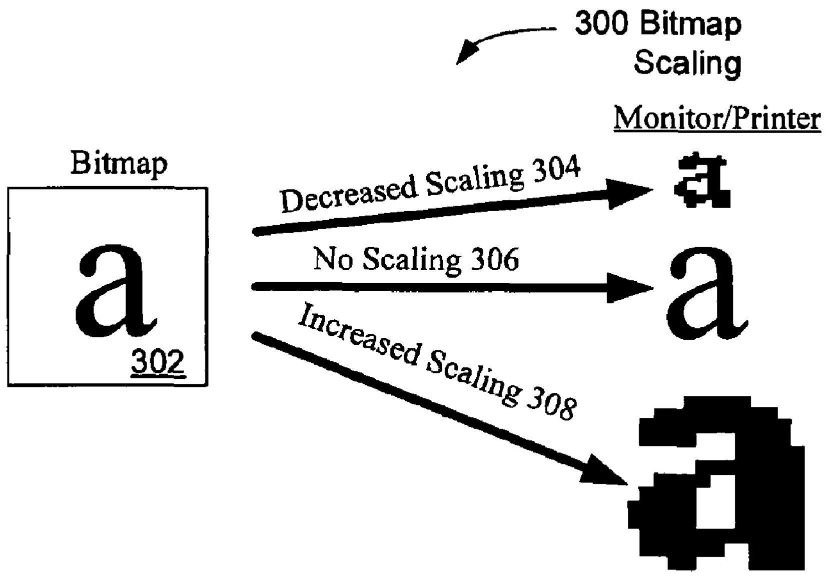
FIGS. 4A-4D are block diagrams describing a few rendering issues in a 3-D gaming environment.

In FIG. 4A, a bitmap scaling 300 of a character "a" bitmap 302 is shown. The bitmap 302 consists of a number of black or white bits in an array in a pattern of the character "a." The bits may provide information to a display device to turn on or turn off certain pixels or may provide information to a printer as to where ink drops should be located. When the bit-map is printed without scaling 306 on a screen or printer with sufficient resolution to display the bitmap, the character pattern appears as it does in the bitmap. However, when the character is increased in scale 308, decreased in scale 304 or printed to a screen with insufficient resolution, pixels may have to be added or subtracted to display the "a" character.

The adding or subtracting of bits in the bitmap may alter the displayed bitmap pattern, as shown in FIG. 4A, such that the readability of the text is degraded. The bitmap pattern is degraded because information the bitmap does not contain information regarding the relation of the bits to one another in regards to the pattern generated by the bits. This issue of pattern degradation of a bitmaps when scaling is unique to pixilated computer displays and is not an issue when using mechanical typesetting to print to paper.

Figure 4B:
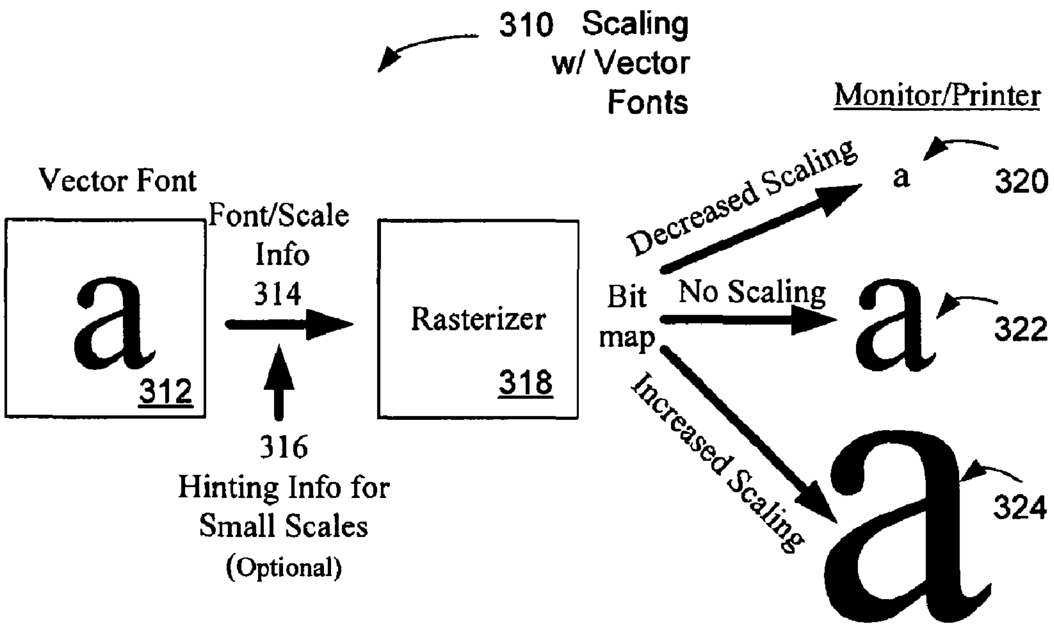

In FIG. 4B, scaling with vector fonts 310, which is one solution to the scaling problem, is shown. In a vector font 312, information regarding the pattern of the character is included in the font information. When generating a vector font, font and scale information 314 is sent to a rasterizer 318 on the computer device. The rasterizer is a piece of software that is embedded in the operating system. It gathers information on the size, color, orientation and location of the vector font and converts the information into a bitmap that can be understood by the graphics card and the monitor or a printer. Thus, with a vector font, such as a TrueType font, when decreased scaling 320, non-scaling 322 or increased scaling 324 is used, the quality of the generated character can be maintained.

The font and scale information may also include hinting information for arranging bits when the scale of the font is quite small. Hinting is a process that makes a font that has been scaled down to a small size look its best. Instead of simply using the vector outline to determine pixel locations, the hinting codes ensure that the characters line up well with the pixels so the font looks as smooth and legible as possible. Hinting and vector methods, as well as other methods known in the word processing arts, may be used with the fonts and 3-D text generation of the present invention. However, as in the example of bitmap scaling described with respect to FIGS. 4A and 4B, these methods may not be directly translatable to 3-D graphical rendering and may have to be adapted for the unique requirements of a 3-D graphical rendering system. Some details of 3-D graphical rendering have been described with respect to FIG. 1. Additional details of 3-D graphical rendering in the context of text generation are described with respect to FIGS. 4C and 4D.

Figure 4C:
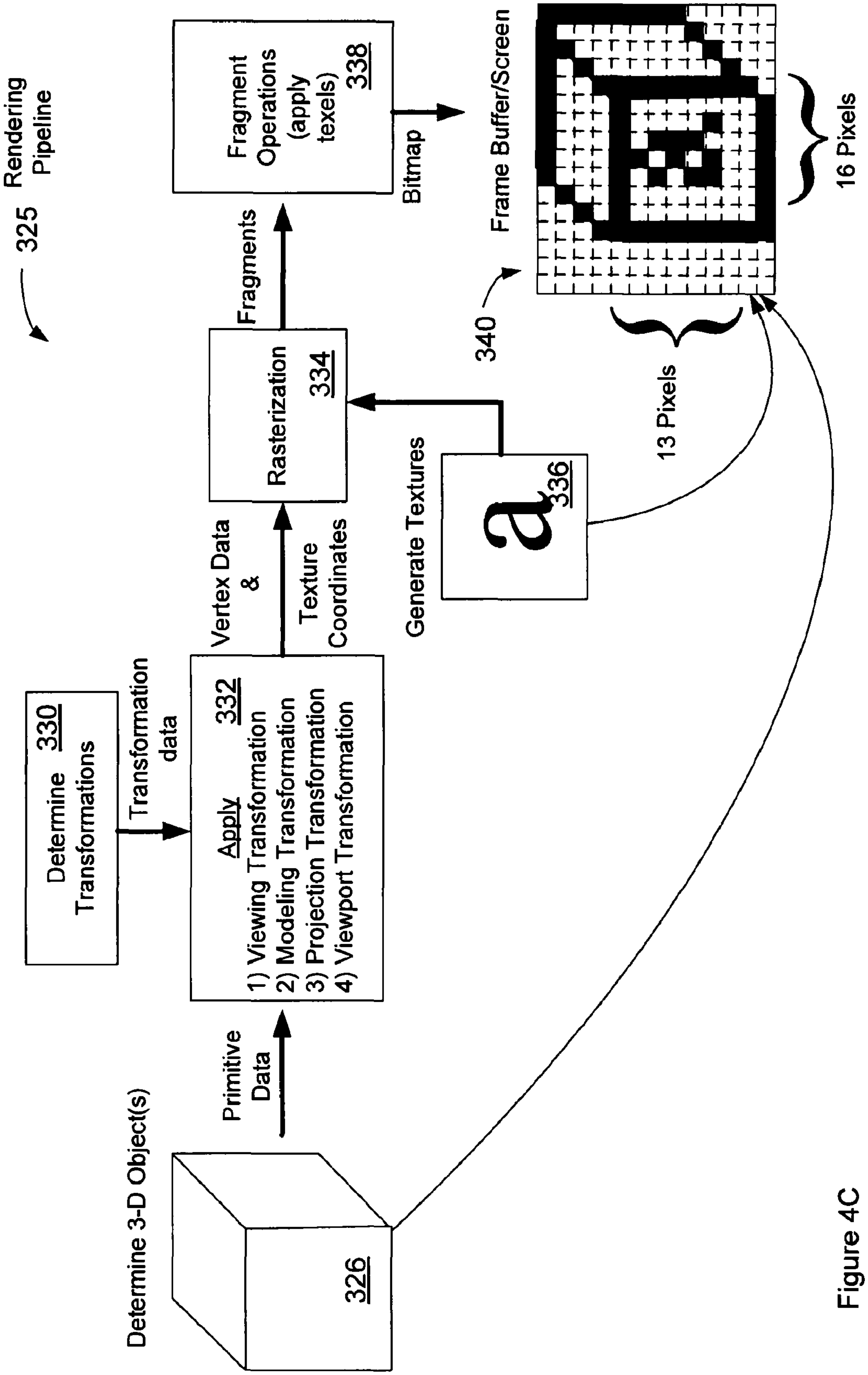

In FIG. 4C, the 3-D graphical rendering pipeline 325 for one embodiment of the present invention is described. In the 3-D graphical rendering pipeline 325, one input to the pipeline may be vertices for a plurality of shapes, i.e., 3-D objects 326. As described with respect to FIG. 1, the shapes may be discretized as a number of triangular polygons defined by the vertices. The vertex data is referred to as primitive data. The output from the pipeline may be a bitmap array 340 that can be drawn to a display screen.

The primitive data may be operated upon by a number of transformations 332. These transformations include a viewing transformation, a modeling transformation, a projection transformation and a viewport transformation. The viewing transformation positions the virtual camera in the 3-D gaming environment. The viewing transformation defines a volume of space in the 3-D gaming environment that is captured by the virtual camera. Vertices outside this volume of space may be clipped when a photograph of the 3-D gaming environment is rendered.

The modeling transformation positions the 3-D objects 326 in the 3-D game environment including rotations, translations and scaling of the objects. The 3-D text objects of the present invention are a type of 3-D object and may be manipulated using the modeling transformation. The projection transformation is analogous to selecting a lens for the virtual camera. It affects field-of-view (size of the viewing volume) as well as how objects are projected onto the screen. For instance, the projection transformation may result in the clipping of objects not in the viewing volume defined by the projection transformation. The viewport transformation specifies the screen size that is available for display of a photograph taken in the 3-D game environment. Using the viewport transformation, the photograph may be enlarged, shrunk or stretched. The projection and the viewport transformations determine how a scene gets mapped to the display screen. The user 330 may define these transformations as a function of time.

As a result of the viewing and modeling transformations, new vertex data is generated for the triangular polygonal surfaces. In addition, texture coordinates are generated for each of the polygonal surfaces. Various color patterns, called textures, may be mapped to the triangular polygonal surfaces. The texture may be a represented as an array of color values for each position in the array. The positions in the array with their associated color values are often called texels.

In one embodiment of the present invention, textures representing various characters in a font may be mapped to one or more polygonal surfaces to generate a pattern of a specified text string on the polygonal surface 336 (see FIGS. 7 and 8A). The texture coordinates are used to map the textures to polygonal surfaces. In another embodiment, fonts may be defined as 3-D objects in the 3-D game environment using a number of vertices. In this case, since the font is modeled in 3-D, the textures mapped to the font may be simpler, such as a solid color, rather than a pattern of a font.

In rasterization 334, geometric and pixel data may be converted to fragments. Each fragment may correspond to a pixel in the frame buffer. Line and polygon stipples, line width, point size, shading model, and coverage calculations to support antialiasing are taken into consideration as vertices are connected into lines or the interior pixels are calculated for a filled polygon. Color and depth values are assigned for each fragment square. For each fragment, additional operations, such as generating a texel element 338, determined by the texture maps, may be performed for each fragment.

Figure 4D:
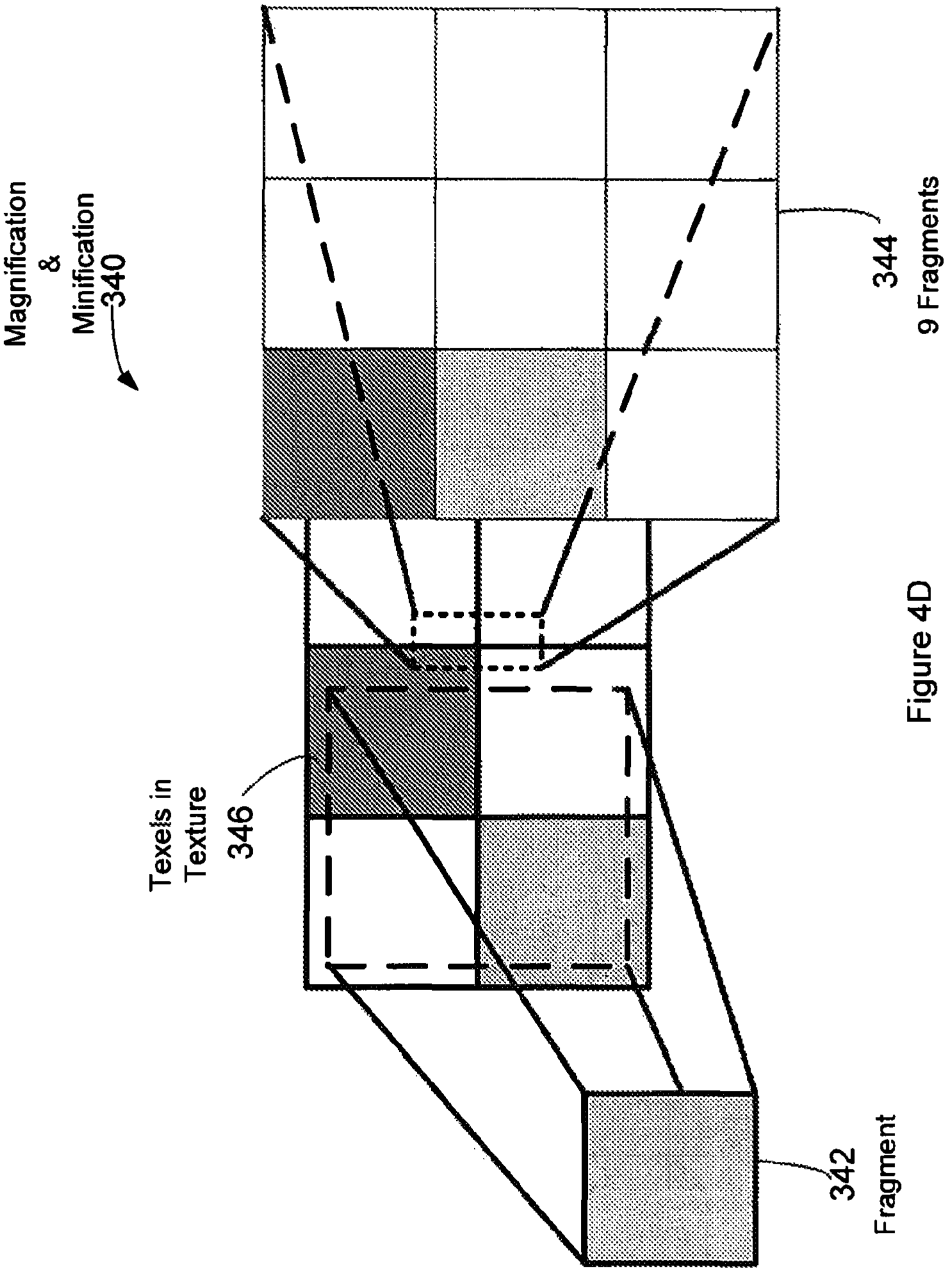

As described with respect to FIG. 4D, the texel map may not be aligned with the fragments generated after rasterization. In this case, texels may be magnified or minimized creating distortions. In addition, other operations, such as blending and dithering, may be performed on each fragment, which may also introduce distortions. These distortions can affect rendered text quality.

After processing of the fragment, the remaining pixel may be displayed to the display screen 340. For instance, a 13×16 array of pixels is shown where a cube 326 is mapped with a texture of a character 'a' 336. The low resolution of the 13×16 viewport results in a relatively crude cube and outline of the 'a' character.

Typically, 3-D graphical rendering hardware/software does not provide utilities for generating text, such as a word processor and commercial word processors are not compatible with 3-D graphical rendering systems. All text in the 3-D gaming environment is generated in the context of defining 3-D objects, operating on the vertices of these objects through various transformations and applying textures to the objects that are enabled by the 3-D graphical rendering system. The 3-D graphical rendering hardware/software may process all of polygons and their associated textures in a similar manner that is independent of whether the polygons and textures are used to display text or not. The 3-D graphical rendering system is not concerned as to whether rendered text is readable or not. It is up to the user to supply methods, such as 3-D typesetting rules, that are compatible with a particular 3-D graphical rendering system and that produce readable text.

In the present invention, methods for rendering readable text in a 3-D graphical rendering environment are provided. Issues, such as minimizing the number of vertices processed, which is important in regards to rendering times, and minimizing distortions resulting from scaling texture maps and transformations (i.e., the viewing, modeling, projection and viewport transformations) are considered. In addition, methods for taking advantage of unique attributes of the 3-D graphical rendering environment, such as an ability to write text to non-rectangular, time varying, 3-D text page are considered. In a typical word processor, text is always written to a 2-D rectangular page where the shape of the page does not vary with time.

As described with respect to 4A-4C, there are many typesetting functions that have to be adapted to the unique requirements of a 3-D graphical rendering system to produce high quality text output. In one embodiment of the present invention, textures with font patterns may be mapped to polygons to generate text strings. The mapping of the textures to the polygons is affected by the methods used in the 3-D graphical rendering system. The textures may be used to fill in a color or a color pattern on a polygon face defined in 3-D by a number of vertices.

In one embodiment of the present, font textures are defined as an array of texels. The texels are defined in non-dimensional parametric coordinates that are mapped to polygons in the 3-D gaming environment using the texture coordinates of vertices. After various transformations are applied to the primitives (vertices of the objects defined in the 3-D gaming environment), the texture coordinates may be generated. Then, an initial photograph of the 3-D gaming environment may be rasterized into fragments (See FIG. 4C). After various operations are performed on the fragments, such as applying textures, the fragments may be converted to pixels in the frame buffer for display to the display screen.

As is illustrated in FIG. 4D, the mapping of texels to fragments may not occur in a one to one manner. In the process of applying the texels in a texture to the fragments in the 3-D graphical rendering system, a number of texels in the texture may be mapped to a single fragment or a single texel may be mapped to a number fragments. These processes are respectively called minification and magnification.

As an example of minification, in FIG. 4D, four texels in the texture 346 are mapped to a single fragment 342. The information from the four texels is interpolated in some manner to provide the texture information for the fragment 342. In the case of a texture displaying character patterns. The interpolation may result in the loss of information and a degradation of the readability of text rendered using the texels.

As an example of magnification, in FIG. 4D, information from small portions of four texels in the texture 346 is magnified to nine fragments. The information from the four texels is interpolated in some manner to provide texture information for the nine fragments 344. The interpolation may add information that degrades the readability of displayed text. In the present invention, methods are described that attempt to minimize the degradation in the readability of text resulting from the interpolation of font textures to the surfaces of 3-D objects in the 3-D gaming environment. These methods are described with respect to FIGS. 5A-8B.

Prior to providing details of the text rendering methods of the present invention, the text rendering methods are described at a higher level in the context of 3-D rendering in a 3-D graphical rendering system using the flow charts of FIGS. 5A and 5B. FIG. 5A is a block diagram describing a method of generating a 3-D gaming environment with 3-D text objects. 3-D text objects refer to 3-D objects in the 3-D gaming environment used to generate a text string when rendered to the display screen. The 3-D text objects may include but are not to limited to 3-D objects textured with patterns representing fonts, 3-D objects in the shape of letters or combinations thereof.

In 150, for a presentation state, a configuration of a 3-D gaming environment is determined for the state. The configuration may depend on the visual/audio storyboard developed for the state (See FIG. 3). The presentation state may comprise a sequence of photographs that are rendered to the display screen from the 3-D gaming environment. In general, the information conveyed in the presentation state will depend on the purpose of the presentation state (e.g., game outcome presentation, bonus game presentation, game history review, maintenance, etc). The presentation state may be in response to particular event(s) occurring on the gaming machine, such as a player initiating a game of chance.

In 152, for the determined 3-D gaming environment, the types and initial locations/orientation of 3-D objects including textures are specified as a function of time. The 3-D objects may comprise 3-D text objects that are adapted for conveying textual information on the display screen during the presentation state. During the presentation state, the types and numbers of objects may vary as a function of time in the 3-D gaming environment. In 154, the viewing, modeling, projection and viewport transformations for the presentation state are specified as a function of time. These transformations, as described with respect to FIG. 4C, affect the output of the rendering process.

In 158, the specified 3-D object types and textures are assembled. In 160, for each specified texture or object, when the 3-D object or texture is available in memory it may be loaded in 164. In 160, when the 3-D object or texture is unavailable it may be generated in 162. For instance, parametric models of 3-D objects or textures may be stored in memory allowing the parameterized 3-D objects or textures to be generated as needed. In 168, for the presentation state, a sequence of photographs is rendered. The rendering process, as described with respect to FIG. 4C, may involve applying the viewing, modeling, projection and viewport transformations on the assembled objects and adding the specified textures to the objects.

In FIG. 5B, a flow chart with further details of the rendering of 3-D text is provided. In 176, font geometries and font textures available for use in the generation of 3-D text objects are loaded to the gaming machine. The geometries and textures may comprise parameters that allow the geometries and textures to be generated on the fly or data that actually specifies the font geometry or the font textures. Font texture generation for one embodiment of the present invention is described in more detail with respect to FIGS. 6A-D.

In 178, the text strings, text pages and typesetting commands for 3-D text objects are specified. The text string may be a string of characters that is to be rendered in the 3-D gaming environment using font textures, font geometries or combinations of both. The text page may be a 3-D curved surface used to guide the placement of text in the 3-D gaming environment. The boundaries, shape, color and position of the text page may vary as function time. The typesetting commands may be used specify operations to be performed on the fonts, such as scaling, line spacing, character spacing, justification and centering of the characters in the text string on the 3-D text page, or operations to be performed on the 3-D text page, such as to change the position and the shape of the 3-D text page as a function of time.

The typesetting commands may also include applying typesetting rules that are not controlled by the user. These typesetting rules may be applied to improve the quality of the text rendered from the 3-D game objects. Examples of these type setting rules may include but are not limited to: 1) applying hinting to small scale characters, 2) improving the "color" of text to be rendered which may involve contrasts between thick and thin stem weights, the size of the character's internal spacing, the amounts of interlinear and intercharacter spacing, the jaggedness of diagonal strokes and overall thickness of a stroke, 3) insuring that each glyph is readable, 4) determining the spacing of characters and words to maximize spacing regularity, 5) adjusting the weight of the "strokes" used to draw the glyphs and 6) adjusting the vertical and horizontal alignments of characters in a text string. The typesetting functions may be affected by the characteristics of the text page defined in 178.

In 180, the user specified or automatic typesetting functions are performed. In 182, the 3-D text object is generated in the 3-D gaming environment. In 184, photographs of the 3-D text object are generated, which may be displayed to the display screen.

Font textures and font geometries used to generate 3-D text objects may be generated and loaded onto the gaming machine as part of a font geometry and texture library stored on a memory device on the gaming machine. In FIGS. 6A-6D, the generation of font textures, including the specification of font information used for typesetting in one embodiment of the present invention, is described. The font textures may be used to generate, typeset and render 3-D text objects, which is described with respect to FIGS. 7 and 8A.

In FIG. 6A, the generation 400 of a font file and the simulation of rendered text string in a 3-D graphics system are described. The font file may comprise textures used to represent text in the 3-D gaming environment and font/character information that is used for typesetting operations. The font files may be created using a font interface application 408.

Fonts in the font file 410 may be loaded, viewed, edited and saved using the font interface application 408. Using an appropriate font generation program with the interface application, an artist may be able to import character images called Glyphs from different sources. Information about the font and individual characters may be entered and then saved as a font file 410 to be used by the gaming machine. The font file may be formatted to allow the gaming machine to generate a 3-D text object at run-time that uses the particular font represented in the font file 410.

Font generation data 402 input into the interface application 408 may be used to generate a font file 410. The font generation data may include initial font data 404, such as bitmaps of fonts. For instance, the initial font data may include but is not limited to glyphs, glyph strips and true type fonts in a targa image format or a true-type font format. The font designer may modify the initial font data 404 by adjusting the font and character setting for each font 406. The designer may adjust these font and character setting 406 to improve the quality of the rendered text.

In one embodiment of the present invention, the font interface application 408 may be coupled to a 3-D text simulator 422. A font designer may use the 3-D text simulator 422 to simulate 3-D text using a generated font file and adjust the properties of the font file based upon the display qualities of text rendered from a selected font.

The 3-D text simulator 422 may comprise a 3-D text object generator 412 that generates 3-D text objects using one or more available fonts. The designer may control properties of the simulation by specifying a text string, a 3-D text page and typesetting commands. The 3-D text object may be rendered using a 3-D rendering simulator that simulates the rendering of text on a target gaming device, such as a particular type of gaming machine.

The 3-D text object may be rendered by itself or in the context of other 3-D objects 418. For example, if the 3-D text object is part of a game outcome presentation, then other 3-D objects used in the game outcome presentation may also be rendered with the 3-D text objects. The rendered text 420 may be output to a frame buffer for display to a display screen.

In FIGS. 6B and 6C, types of information that may be store stored in the font file are described in more detail. Two data categories, font properties 425 (see FIG. 6B) and character properties 440 (see FIG. 6C) are discussed. In FIG. 6D, properties of a font texture containing character glyphs defined in a font 470 are described.

Font data or font properties 425 may be used to describe the entire character set and are usually applied across all characters in a font. Font properties may comprise but are not limited to the following properties. The font name may be an ANSI string that can be used to give the font file an extended description. It can be anything the developer wants, but typically it is used to store the font's complete name like "Arial Bold 24 pt". The Arial refers to a font style, bold refers a thickness of the lines on the characters and 24 pt is size of the font. Many different styles of fonts that are well known in the word processing and document preparations arts may be used with the present invention and the present invention is not limited to Arial. More details of font types and their associated information are described as follows.

Typeface refers to specific graphical attributes of characters and symbols in the font. A font's typeface name may be used to describe the artistic theme or width of the thick and thin strokes that are used for the characters. The use of serifs in a font could also be factor in a typeface name. A serif is the short horizontal line at the ends of an unconnected stroke in character. Style may be used to define the weight and slant of a font. Using different weights and slant values can radically change the look of character in a font. A font's weight depicts the stroke width used in all characters and symbols. The following list shows a variety or names, arranged from lightest to heaviest, that may be used use to describe a font.

| Weight Name | Description |
|---|---|
| Thin | lightest; hair line |
| Extra Light | |
| Light | |
| Normal | |
| Medium | |
| Semi bold | |
| Bold | |
| Extra Bold | |
| Heavy | heaviest; very thick |

The slant attribute refers to the upright appearance of characters in the font. Terms such as roman, oblique and italic are used to categorize the different ways slanting can be achieved. Roman fonts are upright with no slant, while oblique characters are slanted by applying a shear transformation to them. Originally, characters assigned an italic font are slanted and appear as though they were created.

The font's baseline provides the position of where the bottom of a character is placed inside of the font's cell. With this value, a string of characters or symbols with different heights and different font sizes can be vertical aligned. The ascent is a measurement of how far the character extends above the font's baseline. This value also includes any accents marks of a character. The decent is a measurement of how far the character falls below the font's baseline. This value may not include the external leading value, which is the amount of space the artist designed to be added between rows of character strings.

The size attribute may be used to define the maximum width and height necessary to contain the largest character in the font. This value does not specify a size that corresponds with any specific character or symbol in the font, but rather a region that any character in the font could fit in. This region, or virtual frame, is also referred to as the character cell or symbol cell. The character placement inside the cell may also include how the character rests on the fonts baseline. This may be important because the overall height of the font is determined not just by a character's height, but also its ascent and descent from the baseline. The font's width is determined by the widest character or symbol. Therefore, the font's size is defined by the character cell's width and height.

The font type may be used to indicate the type of font stored in the file. A few examples of font types are 2D Textured, 3D Textured and Vector. In 2D textured font, the characters of this font may be planar rectangles textured with a 2D bitmap containing the character's glyph. In a 3D textured font, the characters of this font may be made from many 3-D polygons and may be textured to provide color and visual effects. In a vector font, characters in this font may be generated from Bezier curves or B-splines or other types of mathematical equations. Textures may then be applied to give color and visual effects to the Font. Combinations of these fonts may be used with the current invention.

Width is a font property. It may be a value that holds the font's maximum character width. This value is used to create non-proportion character spacing at run time. If the characters have different widths and spacing it is referred to as having proportional spacing. A font may be considered to be non-proportional if all of its characters have the same width and spacing. The gaming machine may have the capability to convert a proportional font into a non-proportional at run time using this value and other information provide by the developer.

Height 426 is a font property. The value of height may be used to describe the height of the font. The value of the height property may be larger than the tallest character in the font. All characters in the font are equal to or shorter that the font's height. In one embodiment of the typesetting rules with the present invention, all characters must fit inside the font's height property after character placement. Thus, even though the character glyph, such as 430, may have a shorter height than the font's height, such as 432, the character's total height may not exceed the font's height. The height of the character may include its vertical placement on the baseline 428. The height property 426 may also be used in text justification and multi-line calculations.

Baseline 428 is a font property. The baseline may be a vertical reference point that is used to place each character. Most characters usually rest on the baseline and a few extend below the baseline like the 'g' or 'y' characters. The line spacing is a font property 434. The value of the line spacing may be used to create space between multiple lines of text for 3-D text objects with multiple lines. For instance, line spacing 434 is the distance between the text line starting with the character "M" and the second line containing the text string, "Hello" 436.

"First Symbol" is a font property. Characters in the font may also be referred to as symbols. The first symbol property defines the ANSI code for the first character in the font. "Last Symbol" is a font property that defines the ANSI code for the last character in the font. "Symbol Count" is a font property. The symbol count is a number of characters defined in the font, such as 255.

Texture may be font property (see FIG. 6D). The texture property may be an array of pixel data (or a 2D bitmap) that contains all character glyphs or visual data that may be applied to the characters in the font. Information about the texture's width and height in pixels and the pixel format of the texture may also be stored in this property. Multiple textures may exist in a font and each texture contains all character glyphs. If the font has mip mapping capabilities then all mip maps are also stored in the texture property. All animated character glyph data may also be stored in the texture property. MIP Mapping is a texturing technique that is typically used for 3-D animation in games and CAD walkthroughs. To create scenery that contains acutely angled polygons that disappear into the distance, MIP mapping mixes high and low resolution versions of the same texture to reduce the jagged effect that would otherwise appear.

The second set of properties stored in the font file may be directed at the individual characters that make up the font. Each character may have a unique set of properties that describe the visual look and placement of the character. Character properties are described with respect to FIG. 6C. The width 444 may be a character property. The width 444 may be value that is the width of the character's glyph or the maximum horizontal space of the visual aspect of the character. This value may also be the width of the character's 3D geometry or curve data depending on the font type property.

The height may be a character property. The height 448 may be a value that is the height of the character's glyph or the maximum vertical space of the visual aspect of the character. This value may also be the height of the character's 3D geometry or curve data depending on the font type property.

The Origin X and Origin Y 442 may also be a character property. The x origin 450 and y origin 448 may specify the horizontal and vertical starting position of a character relative from the cursor's position. The cursor 446 may be a reference point used to calculate where the next character is to be placed using typesetting rules utilized by the gaming machine. As characters are placed along the baseline 428, the cursor may be advanced to indicate the next character position.

Advance X 452 and Advance Y (not shown) may be a character property. The x and y advance may specify the amount of horizontal and vertical displacement of the cursor from its current location. In essence, these values may be added to the current cursor position to move it to the end of the current character. Applying this property may reposition the cursor for the next character placement and ensure that the next character will not obstruct the current character Texture U and V Coordinates, illustrated in FIG. 6D, may be a character property. The texture U and V property may be used to locate the character glyph from within the font's texture property 470. Since the texture property may contain all character glyph data in one texture, each character glyph may be located at a different position inside the texture bitmap. Along with the character width and height properties, the character's glyph data may be located and extracted from the texture. In one embodiment, the U and V coordinates for a texture vary from 0 to 1 for and 0 to 1 for V.

The texture UV coordinates may specify a texture origin (0,0), a UV texture origin, such as 478, for each glyph in U and V coordinates, such as 474 and 476. The texture UV coordinates may also comprise a glyph width 482 and a glyph height 480 in U and V coordinates. With these coordinates, a rectangle in U and V coordinates containing each character in the texture is defined.

3D Geometry may be a character property. This property may include data for vertices, faces and norms that make up the character's 3D geometry. All animated geometry data may also be stored in this property. Curves may be a character property. This property may include all curve data, which describes the character shape. All animated curved data may also be stored in this property. Curves are typically Bezier or B-spline but can consist of other types of mathematical equations that represent the character. Next, the generation of 3-D text characters is described using the font and character properties described with respect to FIGS. 6A-6D.

In FIG. 7, the generation of 3D Text Characters using triangular polygons is shown. The present invention is not limited to the method described with respect to FIG. 7, which is provided for illustrative purposes only. There are two parts that may be used to generate a character. The first part is defining a rectangular polygon that represents a visible area of the character or the solid surface that can be seen. The second part assigns a texture image of the character to the polygon. The texture image contains the actual detailed pixel image of the character or the shape of the character. Each character in the text string may be comprised its own set of vertices, faces and texture coordinates.

In the example shown in FIG. 7, a 3-D text object is shown with the text string of "Win" 525 and its display region 530. The display region results from rendering the text page to which the 3-D text characters are drawn. A rectangular text page is used in FIG. 7. More complex text pages are described with respect to FIGS. 8A and 8B. In the present invention, a software module called, "Actor string," which may be a part of a software module called "ActorText" may implement methods used to generate 3-D text strings.

To generate the text string "Win" 525, the master gaming controller may retrieve the first character in the string and look up its corresponding information stored in the font file. For example, the U and V texture coordinates, 502, 504, 506 and 508 may be retrieved from the font texture 506. Next, a polygon may be created for the 'W' character. Using the W character's width and height, the polygon may be defined by the four vertices labeled Vertex 1—Vertex 4, 514, 516, 518 and 520, respectively. The four vertices are defined in the coordinates of the 3-D gaming environment. The polygon may be comprised of two triangular faces or surfaces. Face 1 is defined from Vertex 1, Vertex 2 and Vertex 4 and Face 2 from Vertex 2, Vertex 3 and Vertex 4. The vertices that make up each character also have corresponding texture coordinates (e.g., 502, 504, 508 and 510).

The texture coordinates may be used to link a location in a texture image (bitmap) with vertices in a polygon, essentially mapping a piece of the texture image to the polygon. Texture coordinates are specified in (u, v) where (0,0) references the upper left of the texture image. The u is the horizontal position and the v is the vertical position within the texture image. The vertices texture coordinates can be calculated by using the character's texture coordinates, such as the width and the height of the character stored in the font file (see FIG. 6D). Using this information, a 3-D text object for the single character 'W' may be assembled in the 3-D gaming environment and rendered to the display screen. The rendering process may be repeated for each character defined in the text string property. To determine the location of the next character in the text string in the 3-D text object, the advance x and advance y from the character properties of the previous character, i.e., the 'W' character in this example, are used.

One advantage of using the character information from the font texture file to define the dimensions of the polygon to receive the character texture is to minimize magnification or minification of the texels in the texture during rendering. As described with respect to FIG. 4D, magnification or minification may result in interpolations that degrade the quality of the pattern on the texture when rendered. In this embodiment, the initial size of the polygon used for the texture is selected to fit the character texture, which minimizes interpolation errors during rendering. Further, from their initial optimal sizes, the polygons for the characters may be stretched, shrunk or manipulated to some degree without too much degradation of the rendered text quality.

In this embodiment, if the polygons are scaled too much from their initial size rendered text quality may degrade. In this case, it may be desirable to use a font texture that is closer in size to the size of the font after scaling or to apply a technique such a MIP mapping. The gaming machine may be adapted to select a font texture of a particular size to match a desired font size and minimize scaling any errors. Thus, a font library of the present invention may include font textures for the same type of font at different sizes. With 3-D texture type fonts, the geometry information included with the font may be used for scaling and it may not be necessary to select a font texture of a particular size when scaling.

To reiterate, when using a 2D Texture type font, polygon geometry is not created to define the shape of a character, but instead 3D visible surface that a texture image can be applied to is created. The texture image may include the actual shape and look of the character. If a 3D Texture type font is used, then the font may contain the polygon information, which would define the 3D physical shape of the character (see FIG. 8B for example of a 3D texture type font). The texture image may be used to enhance it appearance. But, the polygon information may be used to define the character shape. Curve type fonts maybe treated the same as 3D Texture fonts except that the 3D physical shape of the character is defined by curves. Polygon may be created using the curve information and then a texture may be applied to the polygons Another advantage of the 2-D texture method approach is that it reduces the number of polygons that need to be processed by the graphics software/hardware. In 3-D graphics systems, the ability to render scenes in real-time is a function of the number of polygons that need to be rendered. When the system has to process too many polygons, the performance of the system can be become degraded to the point where it is too slow to be of use in an operational environment. In the 2-D texture embodiment, the rendering of each character in a text string requires the processing of only two triangular polygons. Therefore, the method reduces the amount of polygons that need to be processed by the system as compared to an approach where a shape of each font in a character is represented by a large number of polygons.

There are numerous properties and features, which may be available through ActorText that may be used to provide text formatting and visual effects in the present invention. These additional features can also affect the generation of the character's 3D geometry. The following list describes some examples of features, which may be accessed by API function calls, scripts and models. However, the present invention is not limited to these examples. The commands are implemented to work in the context of the 3-D graphical rendering system used on the gaming machines or gaming devices of the present invention.

It is noted that commands described in the following paragraphs are high level commands. Each command may comprise a sequence of low-level commands or function calls that enable the high level commands to implemented in the 3-D graphical rendering system.

SetPosition may assign the x, y, and z positional coordinate for the location of a generated 3-D text object. SetScale may set the scaling value to be applied to the entire text string's size. SetRotation may be used to set the rotation values that may be applied to the entire text in the x, y and z-axis. The polygons defining a text character or text string may be manipulated like other 3-D objects defined in the 3-D gaming environment. SetPivotPoint may set the x, y and z positional coordinate for the location of the pivot point. The pivot point may be used as a reference location in the 3-D text object when rotating, scaling and positioning it. SetDisplayRegionSize may be used to set the text page's size (width, height and depth), which is used to contain the text string.

SetJustification may be used to set the type of justification used to position the text string in the text display region defined by the 3-D text page. There are several types of justification each can be combined together to form the desired justification effect. NONE no justification is applied to the text string. LEFT aligns the text string to the left side of the 3-D text page. RIGHT aligns the text string to the right side of the 3-D text page. HORIZONTAL CENTERED centers the text string horizontally in the 3-D text page. TOP aligns the text string to the top edge of the 3-D text page. BOTTOM aligns the text string to the bottom edge of the 3-D text page. VERTICAL CENTERED centers the text string vertically in the 3-D text page.

SetSizing may be used to set the sizing algorithm used on the text string. There are number of types of sizing algorithms that may be applied. NONE no sizing is applied to the text string. GROW TO FIT may size the text string to always fit inside the 3-D text page by shrinking or expanding the string's width and/or height. GROW TO FIT may keep the string's aspect ratio and operate on the string's width and height. GROW WIDTH TO FIT may change the string's width to always fit inside the 3-D text page's width by shrinking or expanding the string's width. GROW WIDTH TO FIT may change the string's aspect ratio and may operate on the string's width (height is not affected). GROW HEIGHT TO FIT may change the string's height to always fit inside the 3-D text page's by height shrinking or expanding the string's height. GROW HEIGHT TO FIT may change the string's aspect ratio and operates on the string's height (width is not affected).

SHRINK TO FIT may shrink the string to fit inside the 3-D text page when the string's width or height exceeds the boundaries of the 3-D text page. SHRINK TO FIT may keep the string's aspect ratio and may operate on the strings width and height. SHRINK WIDTH TO FIT may shrink the string's width to fit inside the 3-D text page's width when the string's width exceeds the 3-D text page's width. SHRINK WIDTH TO FIT may change the string's aspect ratio and operates on its width (height is not affected). SHRINK HEIGHT TO FIT may shrink the string's height to fit inside the 3-D text page's height when the string's height exceeds the 3-D text page's height. This parameter changes the string's aspect ratio and operates on its height (width is not affected). SIZE TO FIT may change the string's width and height to always be the same as the 3-D text page's width and height. SIZE TO FIT may change the string's aspect ration and may operate on its width and height.

GROW HEIGHT SHRINK WIDTH may change the string's height to always fit inside the 3-D text page's height by shrinking or expanding the string's height (aspect ratio not changed). GROW HEIGHT SHRINK WIDTH may also shrink the string's width to fit inside the 3-D text page's width when the string's width exceeds the 3-D text page's width (will change aspect ratio). GROW WIDTH SHRINK HEIGHT may change the string's width to always fit inside the 3-D text page's width shrinking or expanding the string's width (aspect ratio not changed). GROW WIDTH SHRINK HEIGHT may also shrink the string's height to fit inside the 3-D text page's height when the string's height exceeds the 3-D text page's height. GROW WIDTH SHRINK HEIGHT may also change string's aspect ratio and may operate on its width and height (will change aspect ratio).

SetClipping may enable or disable text clipping against the boundaries defined by the text page. When enabled, any portion of a character or characters that may reside outside of the boundaries of the 3-D text page may be removed and may not be displayed. SetName may set the name of the 3-D text object. SetFont may be used to assign a font resource that may be used when creating the text string. SetFontSize may be used to set the font's size by defining its height in an appropriate coordinate system. SetColor may be used to set the string's color information by specifying separate red, green, blue and alpha color values.

SetLineSpacing may be used to set the additional line spacing that is used between lines within the string. SetSize may be used to set the string's width, height and depth. SetString may be used to assign a text string to be drawn. GetRawExtents may be used to calculate the width, height and depth of the text string's 3D geometry using current property settings. SetCharacterScale may be used to assign a scaling value to be applied to each character's size. This can be used to change the character's aspect ratio providing squash and stretch capabilities. SetCharacterSpacing may be used to set the character spacing for the space used to separate each character in the text string. This value is added to the character's width defined in the font resource. SetNonProportionalWidth may be used to adjust the character width for use in non-proportional spacing. This value is added to the Font's default character width to make a new width that is applied to each character when non-proportional spacing is enabled.

SetNonProportionalWidthType may be used to sets the type of calculations used to determine the non-proportional width using the non-proportional width value. There are number of different Width Types that may be used with the present invention. FONT WIDTH PERCENTAGE interprets the Non-Proportional Width property to be a percentage of the font's max character width. The resulting value is the new character width used in non-proportional spacing. VALUE interprets the Non-Proportional Width property to be the actually width value used in non-proportional spacing. FONT WIDTH OFFSET interprets the Non-Proportional Width property to be added to the font's max character width. The resulting sum is the new character width used in non-proportional spacing.

EnableNonProportionalSpacing may be used to indicate that a conversion from a proportional font into a non-proportional font is desired. SetStringPosition may be used to set a string's position in the 3-D text page. When the justification is set to "NONE", this value sets the string's position inside the 3-D text page. Using this feature along with clipping may be used to create a marquee sign where text is scrolled across an area.

Methods in the present invention may be used to manipulate font properties. For instance, GetFont may be invoked to determine the current font resource (font file being applied) being used. SetFont may be used to assign a font resource that will be used when creating a text string. GetFontSize may be used to retrieve a font's size. SetFontSize may be used to set the font's size by defining its height.

Methods in the present invention may also be used to manipulate text string properties. For instance, getColor may be used to retrieve the string's color information separated in red, green, blue and alpha values. SetColor may be used to set the string's color information by specifying separate red, green, blue and alpha color values. GetLineSpacing may be used to retrieves additional line spacing that is added to the font's specified line spacing. The value is used to increase or decrease spacing between each line of the string. SetLineSpacing may be used to set the additional line spacing that is used between lines within the string.

GetScale may used to get the current scaling value being applied to the text string in the 3-D text object. SetScale may be used to set the scaling value to be applied to the text string's size. GetSize may be used to calculate the string's width, height and depth using the current attribute values (i.e. font size, line spacing, etc.). SetSize may be used to set the string's width, height and depth.

GetString may be used to retrieve a pointer to the buffer containing the characters in the string to be drawn. SetString assigns a text string to be drawn. GetRawExtents may be used to set the string's width, height and depth.

The following commands, provided for illustrative purposes, may be used as part of character typesetting operations performed on the gaming machine. GetCharacterScale may be used to retrieve the current scaling value being applied to each character's size in the string. SetCharacterScale may be used to assign a scaling value to be applied to each character's size. GetCharacterSpacing may be used to retrieve the character spacing. It may be used to separate each character in the string. SetCharacterSpacing may be used to set the character spacing for the space used to separate each character in the string. This value may be added to the character's width defined in the font resource.

GetCharacterWidth may be used to retrieve the character width used in non-proportional spacing. This value is added to the Font's default character width to modify the width applied to each character. SetCharacterWidth may used to adjust the character width for use in non-proportional spacing. This value is added to the Font's default character width to make a new width that is applied to each character when non-proportional spacing is enabled. GetProportionalSpacing may be used to get the current character proportional spacing method. SetProportionalSpacing may be used to enable or disable the character proportional spacing method. Next some examples of 3-D text rendering using the methods described with respect to FIGS. 4A-7 are discussed.

FIGS. 8A and 8B are diagrams of 3-D text objects rendered to a display screen of a gaming machine. As described above, displaying text in the gaming machine may require the developer to create a 3-D text object and specify text properties for that object. These properties can be assigned through several different mechanisms: API functions, scripts and models. Any combination of these mechanisms may be used at any time to create, control and specify text properties for the 3-D text object. The 3-D text object may be used in game outcome presentations, bonus game presentations, maintenance and set-up menus as well as any other function of the gaming machine that requires text to be displayed to one of the display screens on the gaming machine.

To display text on the gaming machine, a 3-D text object, such as 562 or 552, may be created. A logical unit, referred as ActorText, may be used to create the 3-D text object. ActorText may be used for creating formatted text in real time on the gaming machine using the 3-D graphical rendering system of the gaming machine or gaming device in which is executed. It may have the capability to generate the information needed to display text by using font, specified developer properties and type settings rules. The information displayed using ActorText may be in the context of an activity presented on the gaming machine, such as a game of chance. Thus, other 3-D objects, such as 556, presented as part of a specific activity may also be rendered to the video display 34 with the rendered text.

In one embodiment, the developer may have to specify at least three properties before gaming information, defined by a 3-D text object, may be displayed. The first property that is specified may be the text page that results in a display region, such as 554 or 560. When the text page is rendered in the 3-D graphical system, a 2-D display region, such as 554, 560, 574 or 576, corresponding to the text page is displayed on the video display 34. The text page may specify the size and shape of a 3-D surface that is to be filled in with text or used as a guide for text. In the case of 3-D fonts, the surface of the text page may act as a guide for the base of the fonts. As examples, the text page may be a simple planar rectangle, a planar complex polygon or a 3-D surface. The edges of the text page can be curves defined by B-splines, Bezier curves or multiple line segments.

The position or shape of the text page can change as a function of time. For instance, the text page may be modeled as a flag that is flapping in the breeze, 576, with text written on the surface of the flag. As another example, the text page may be a globe 574 that is rotating 578 with text written on the surface of the globe. In yet another example, the text page may be modeled as the surface of a pond with ripples.

In the present invention, a designer may be able add textures to the text page as a background. For instance, a flame texture that changes as a function of time may be added to the text page corresponding to the rectangular display region 554. The flame texture may provide an appearance that the "Total Credit" and "2, 356" text strings are located in flames. Thus, the textures of the present invention may overlay one another with the texture the text string overlaying the texture applied to the text page, such as the flames.

With the text page specified, ActorText may have the capability to warp the text characters to follow and fit to the shape of the text page. For example, the characters in text object 562 in FIG. 8A follow the boundaries of the text page rendered as display region 560. The text page may be compared to as a sheet of paper similar to that of most word processors in that it is an area that text characters are typeset using formatting rules. However, unlike a word processor, the text page of the present invention can be a complex 3-D shape, for example a bent and twisted piece of paper. Further, the position and orientation of the text page may be manipulated in the 3-D gaming environment to change the shape of the display region that is rendered to the display screen.

It is noted that the word processor is used for explanation purposes only in that it provides a convenient analogy. Although the present invention performs functions that are similar to a word processor, the present invention is not limited to the capabilities of a word process. For instance, the present invention has the ability to generate and manipulate decorative fonts in manners that are very limited or not possible with a conventional word processor.

The shape of the text page may change as a function of time. ActorText may have the capability to warp the text characters to follow and fit to the shape of the text page as it changes as a function of time. Also, other character properties such as a color or texture of the characters in the display region may change as a function of time, which may be accounted for in 3-D text objects generated using ActorText.

The next property that may be specified for ActorText is the Font property. The Font property may be the file name and path of the font file that is used to generate the text in the 3-D text page. With the Font, ActorText can get the necessary information to place text characters inside the display region using type setting rules. The font file may include information on the placement and look of each character in the font as described with respect to FIGS. 6A-7.

Finally, the Text property may be assigned to ActorText. This property is a text string consisting of characters that are to be displayed. ActorText may take each character in the text string and generate the necessary 3-D information (vertices, faces, normals, texture UV coordinates) that describe the 3-D text object that is rendered in the 3-D gaming environment. The text string may be seen one of the displays of the gaming machine when it is rendered from a 3-D gaming environment containing the 3-D text object.

This section describes one embodiment that allows ActorText to generate 3D geometry for text characters using a 2D Textured font. It is also possible to use 3-D textured fonts with the present invention. Two examples of 3-D textured fonts 570 for the characters 'V' and 'O' are shown in FIG. 8B. The 3-D textured fonts in this example are defined by a number of triangles. These 3-D fonts may be manipulated in the same manner that any 3-D object is manipulated in the 3-D gaming environment. Once the 3D geometry is created, ActorText may submit this information to the gaming machine operating system where it is drawn on the video display 34.

Turning to FIG. 9, a video gaming machine 2 of the present invention is shown. Machine 2 includes a main cabinet 4, which generally surrounds the machine interior (not shown) and is viewable by users. The main cabinet includes a main door 8 on the front of the machine, which opens to provide access to the interior of the machine. Attached to the main door are player-input switches or buttons 32, a coin acceptor 28, and a bill validator 30, a coin tray 38, and a belly glass 40. Viewable through the main door is a video display monitor 34 and an information panel 36. The main display monitor 34 will typically be a cathode ray tube, high resolution flat-panel LCD, plasma/LED display or other conventional electronically controlled video monitor. The gaming machine 2 includes a top box 6, which sits on top of the main cabinet 4. A second display monitor 42 may be provided in the top box. The second display monitor may also be a cathode ray tube, high resolution flat-panel LCD or other conventional electronically controlled video monitor.

Typically, after a player has initiated a game on the gaming machine, the main display monitor 34 and the second display monitor 42 visually display a game presentation, including one or more bonus games, controlled by a master gaming controller (not shown). The bonus game may be included as a supplement to the primary game outcome presentation on the gaming machine 2. The video component of the game presentation consists of a sequence of frames refreshed at a sufficient rate on at least one of the displays, 34 and 42, such that it appears as a continuous presentation to the player playing the game on the gaming machine. Each frame rendered in 2-D on display 34 and/or 42 may correspond to a virtual camera view in a 3-D virtual gaming environment stored in a memory device on gaming machine 2.

One or more video frames of the sequence of frames used in the game presentation may be captured and stored in a memory device located on the gaming machine. The one or more frames may be used to provide a game history of activities that have occurred on the gaming machine 2. Details of frame capture for game history applications are provided co-pending U.S. application Ser. No. 09/689,498, filed on Oct. 11, 2000 by LeMay, et al., entitled, "Frame Buffer Capture of Actual Game Play," which is incorporated herein in its entirety and for all purposes.

Returning to the gaming machine in FIG. 9, the information panel 36 may be a back-lit, silk screened glass panel with lettering to indicate general game information including, for example, the denomination of bills accepted by the gaming machine (e.g. $1, $20, and $100). The bill validator 30, player-input switches 32, video display monitor 34, and information panel are devices used to play a game on the game machine 2. The devices are controlled by the master gaming controller (not shown), which is located inside the main cabinet 4 of the machine 2.

In the example, shown in FIG. 9, the top box 6 houses a number of devices, which may be used to input player tracking information or other player identification information into the gaming machine 2, including the bill validator 30 which may read bar-coded tickets 20, a key pad 22, a florescent display 16, and a camera 44, and a card reader 24 for entering a magnetic striped cards or smart cards. The camera 44 may be used to generate player images that are integrated into a virtual gaming environment implemented on the gaming machine. The keypad 22, the florescent display 16 and the card reader 24 may be used to enter and display player-tracking information. In addition, other input devices besides those described above may be used to enter player identification information including a finger print recording device or a retina scanner. Methods and apparatus for capturing a player's image to a video frame is described in co-pending U.S. patent application Ser. No. 09/689,498, by LeMay et al. filed on Oct. 11, 2000 and titled "Frame Buffer Capture of Actual Game Play" is incorporated herein in its entirety and for all purposes.

In addition to the devices described above, the top box 6 may contain different or additional devices than those shown in the FIG. 9. For example, the top box may contain a bonus wheel or a backlit silk-screened panel, which may be used to add bonus features to the game being played on the gaming machine. During a game, these devices are controlled and powered, in part, by the master gaming controller circuitry (not shown) housed within the main cabinet 4 of the machine 2.

Understand that gaming machine 2 is but one example from a wide range of gaming machine designs on which the present invention may be implemented. For example, not all suitable gaming machines have top boxes or player tracking features. Further, some gaming machines have only a single game display—mechanical or video, while others are designed for bar tables and have displays that face upwards. As another example, a game may be generated in on a host computer and may be displayed on a remote terminal or a remote gaming device. The remote gaming device may be connected to the host computer via a network of some type such as a local area network, a wide area network, an intranet or the Internet. The remote gaming device may be a portable gaming device such as but not limited to a cell phone, a personal digital assistant, and a wireless game player. Images rendered from 3-D gaming environments may be displayed on portable gaming devices that are used to play a game of chance. Further a gaming machine or server may include gaming logic for commanding a remote gaming device to render an image from a virtual camera in a 3-D gaming environments stored on the remote gaming device and to display the rendered image on a display located on the remote gaming device. Thus, those of skill in the art will understand that the present invention, as described below, can be deployed on most any gaming machine now available or hereafter developed.

Returning to the example of FIG. 9, when a user selects a gaming machine 2, he or she inserts cash through the coin acceptor 28 or bill validator 30. Additionally, the bill validator may accept a printed ticket voucher, which may be accepted by the bill validator 30 as indicia of credit. Once the gaming machine has accepted cash, credits or promotional credits, a game of chance may be wagered upon on the gaming machine. Typically, the player may use all or part of the cash entered or credit into the gaming machine to make a wager on a game play. During the course of a game, a player may be required to make a number of decisions, which affect the outcome of the game. For example, a player may vary his or her wager, select a prize, or make game-time decisions, which affect the game play. These choices may be selected using the player-input switches 32, the main video display screen 34 or using some other device which enables a player to input information into the gaming machine including a key pad, a touch screen, a mouse, a joy stick, a microphone and a track ball.

Using input devices such as but not limited to the player-input switches 32, the main video display screen 34 or using some other device which enables a player to input information into the gaming machine including a key pad, a touch screen, a mouse, a joy stick, a microphone and a track ball, properties of 3-D objects in the 3-D gaming environment and thus, the corresponding presentation of these 3-D objects rendered to one or more of the display screens on the gaming machine may be altered. For instance, in 3-D gaming environment with a rotating object, such as but not limited to rotating reel, rotating wheel, rotating reel segment, or a rotating sphere, the gaming machine may be capable of receiving input via one of the input devices, that starts an object spinning, stops an object spinning or affects a rotation rate of the object. In another example, the gaming machine may be capable of receiving input via one or more input devices, that initiates translational movement in one or more 3-D objects in the 3-D gaming environment, stop translational movement or affects a rate of translation movement.

In general, the gaming machine may be capable of receiving input information for controlling a plurality motion parameters for 3-D objects in the gaming environment. The motion parameters may vary depending upon degrees of movement freedom modeled for a particular 3-D object. The input information may be used to alter a game outcome presentation, a bonus game outcome presentation or any other type of presentation generated on the gaming machine.

In some embodiments, to change the format of a game outcome presentation on the gaming machine or to utilize different gaming machine functions, the player may use an input device on the gaming machine to control a virtual camera in a virtual gaming environment implemented on the gaming machine. For instance, a player may use the virtual camera to "zoom in" or "expand on demand" a portion of the virtual gaming environment such as one poker hand of a hundred poker hands displayed on display screen 34. In another example, the game player may alter the game outcome presentation, such as the view or perspective of the game outcome presentation, by controlling the virtual camera. In yet another example, the player may be able to select a type of game for game play on the gaming machine, select a gaming environment in which a game is played, receive casino information or obtain various casino services, such as dinner reservations and entertainment reservations, by navigating through a virtual casino implemented on the gaming machine. The virtual casino may correspond to the actual casino where the gaming machine is located. Thus, the virtual casino may be used to give the player directions to other portions of the casino.

In other embodiments of the present invention, CAD/CAM models of the gaming machine 2 may be used to generate a virtual 3-D model of the gaming machine. The virtual 3-D model may be used to visually demonstrate various operating features of the gaming machine 2. For instance, when a player-tracking card is inserted incorrectly in the card reader 24, the virtual 3-D model of the gaming machine may be used to display a visual sequence of the card being removed from the card reader 24, flipped over and correctly inserted into the card reader 24. In another example, a visual sequence showing a player inputting an input code on the keypad 22 may be used to prompt and show the player how to enter the information. In another example, when the gaming machine 2 is expecting an input from the player using one of the player input switches 32, the virtual 3-D model of the gaming machine may be used to display a visual sequence of the correct button on the gaming machine being depressed. In yet another example, the manner in which a bill or ticket is inserted into the bill validator may be shown to the player using a sequence of photographs generated from the 3-D model.

During certain game events, the gaming machine 2 may display visual and auditory effects that can be perceived by the player. These effects add to the excitement of a game, which makes a player more likely to continue playing. Auditory effects include various sounds that are projected by the speakers 10, 12, 14. Visual effects include flashing lights, strobing lights or other patterns displayed from lights on the gaming machine 2 or from lights behind the belly glass 40. The ability of a player to control a virtual camera in a virtual gaming environment to change the game outcome presentation may also add to the excitement of the game. After the player has completed a game, the player may receive game tokens from the coin tray 38 or the ticket 20 from the printer 18, which may be used for further games or to redeem a prize.

FIG. 10 is a flow chart depicting a method for generating a game outcome presentation from a virtual gaming environment. In 600, after receiving a wager for one or more games played on a gaming machine, an input signal is received on the gaming machine to initiate a game of chance. The input signal may be input by a player using a various input devices available on the gaming machine, such as input buttons and a touch screen. In 602, one or more game outcomes are determined for the one or more games initiated by the game player. Typically, a game outcome is determined by generating one or more random numbers and comparing the numbers with a paytable stored on the gaming machine.

In 603, based upon the one or more game outcomes determined in 602, one or more game displays are rendered in a 3-D virtual gaming environment in the gaming machine. In 604, at least one virtual camera in the 3-D gaming environment is used to render a sequence of 2-D projection surfaces (e.g. images) derived from three-dimensional coordinates of surfaces in the 3-D gaming environment. As described with reference to FIG. 2, the position of the virtual camera may vary with time. In 606, the sequence of rendered 2-D projection surfaces is displayed to one or more game display screens on the gaming machine as part of a game outcome presentation or a bonus game presentation. In 608, the game outcome (e.g. an amount awarded for one or more games) is displayed to the display screen. The method described above is not limited to game outcome presentations. Other types of gaming information such as attract mode presentations, maintenance operation information, game operation information and casino information may be generated in a 3-D virtual gaming environment and displayed to a display screen on the gaming machine. Further, transition screens that allow a smooth transition between different gaming presentations may also be generated and displayed on the display screen. For instance, a transition screen may be generated to for a display a smooth transition between a game outcome presentation and a bonus game.

FIG. 11 is a block diagrams of gaming machines that utilize distributed gaming software and distributed processors to generate a game of chance for one embodiment of the present invention. A master gaming controller 250 is used to present one or more games on the gaming machines 61, 62 and 63. The master gaming controller 250 executes a number of gaming software modules to operate gaming devices 70, such as coin hoppers, bill validators, coin acceptors, speakers, printers, lights, displays (e.g. 34) and other input/output mechanisms. The master gaming controller 250 may also execute gaming software enabling communications with gaming devices located outside of the gaming machines 61, 62 and 63, such as player tracking servers, bonus game servers, game servers and progressive game servers. In some embodiments, communications with devices located outside of the gaming machines may be performed using the main communication board 252 and network connections 71. The network connections 71 may allow communications with remote gaming devices via a local area network, an intranet, the Internet or combinations thereof.

The gaming machines 61, 62 and 63 may use gaming software modules to generate a game of chance that may be distributed between local file storage devices and remote file storage devices. For example, to play a game of chance on gaming machine 61, the master gaming controller may load gaming software modules into RAM 56 that may be may be located in 1) a file storage device 251 on gaming machine 61, 2) a remote file storage device 81, 2) a remote file storage device 82, 3) a game server 90, 4) a file storage device 251 on gaming machine 62, 5) a file storage device 251 on gaming machine 63, or 6) combinations thereof. The gaming software modules may include script files, data files and 3-D models used to generate 3-D objects in the 3-D gaming environments of the present invention. In one embodiment of the present invention, the gaming operating system may allow files stored on the local file storage devices and remote file storage devices to be used as part of a shared file system where the files on the remote file storage devices are remotely mounted to the local file system. The file storage devices may be a hard-drive, CD-ROM, CD-DVD, static RAM, flash memory, EPROM's, compact flash, smart media, disk-on-chip, removable media (e.g. ZIP drives with ZIP disks, floppies or combinations thereof. For both security and regulatory purposes, gaming software executed on the gaming machines 61, 62 and 63 by the master gaming controllers 250 may be regularly verified by comparing software stored in RAM 56 for execution on the gaming machines with certified copies of the software stored on the gaming machine (e.g. files may be stored on file storage device 251), accessible to the gaming machine via a remote communication connection (e.g., 81, 82 and 90) or combinations thereof.

The game server 90 may be a repository for game software modules and software for other game services provided on the gaming machines 61, 62 and 63. In one embodiment of the present invention, the gaming machines 61, 62 and 63 may download game software modules from the game server 90 to a local file storage device to play a game of chance or the game server may initiate the download. One example of a game server that may be used with the present invention is described in co-pending U.S. patent application Ser. No. 09/042,192, filed on Jun. 16, 2000, entitled "Using a Gaming Machine as a Server" which is incorporated herein in its entirety and for all purposes. In another example, the game server might also be a dedicated computer or a service running on a server with other application programs.

In one embodiment of the present invention, the processors used to generate a game of chance may be distributed among different machines. For instance, the game flow logic to play a game of chance may be executed on game server 92 by processor 90 while the master gaming controller 250 may execute the game presentation logic on gaming machines 61, 62 and 63. The gaming operating systems on gaming machines 61, 62 and 63 and the game server 90 may allow gaming events to be communicated between different gaming software modules executing on different gaming machines via defined APIs. Thus, a game flow software module executed on game server 92 may send gaming events to a game presentation software module executed on gaming machine 61, 62 or 63 to control the play of a game of chance or to control the play of a bonus game of chance presented on gaming machines 61, 62 and 63. As another example, the gaming machines 61, 62 and 63 may send gaming events to one another via network connection 71 to control the play of a shared bonus game played simultaneously on the different gaming machines or in general to affect the game play on another machine.

Although the foregoing invention has been described in some detail for purposes of clarity of understanding, it will be apparent that certain changes and modifications may be practiced within the scope of the appended claims. For instance, while the gaming machines of this invention have been depicted as having top box mounted on top of the main gaming machine cabinet, the use of gaming devices in accordance with this invention is not so limited. For example, gaming machine may be provided without a top box or a secondary display. Both of these types of gaming machines may be modeled in a virtual gaming environment stored on a gaming machine.

What is claimed is:

1. A method comprising:

receiving a wager for a game of chance on a gaming machine, said gaming machine controlled by a master gaming controller and comprising the master gaming controller, a display device, a memory device, and a 3-D graphical rendering system, said gaming machine storing, in the memory device: 1) a font texture for representing a plurality of characters associated with a particular font style, 2) one or more font parameters for defining global characteristics of the plurality of characters in the font texture; and 3) one or more character parameters for defining characteristics of each character in the font texture;

determining a game outcome presentation for the game of chance, said game outcome presentation comprising a text string, corresponding to a game outcome, the text string including a plurality of elements for display on the display device;

generating a plurality of 3-D objects wherein each one of the plurality of 3-D objects corresponds to a respective one of the plurality of elements in the text string and wherein said generating comprises for each of the elements in the text string, i) locating in the font texture a first texture representing a first character corresponding to a first element of the text string; ii) determining vertices for a first 3-D object defined in a 3-D coordinate system associated with the 3-D graphical rendering system using the font parameters and character parameters associated with the first texture; and iii) mapping the first texture to the first 3-D object;

determining a location of each of the plurality of 3-D objects relative to one another as defined in the 3-D coordinate system, by applying a plurality of typesetting rules to improve a visual quality of the text string rendered from the plurality of 3-D objects and their associated textures, wherein each of the plurality of typesetting rules is selected from the group consisting of: (i) applying hinting to small scale characters; (ii) adjusting the color of text to be rendered; (iii) insuring that each glyph is readable; (iv) determining the spacing of characters and words to maximize spacing regularity, (v) adjusting the weight of the strokes used to draw the glyphs; (vi) adjusting the vertical and horizontal alignments of characters in a text string;

rendering the text string using the 3-D graphical rendering system;

displaying the rendered text string on the display device;

displaying the game outcome using the 3-D graphical rendering system to the display device.

2. The method of claim 1, wherein the game of chance is selected from the group consisting of a slot game, a keno game, a poker game, a pachinko game, a video black jack game, a bingo game, a baccarat game, a roulette game, a dice game and a card game.

3. The method of claim 1, wherein the text string is rendered to convey textual information associated with one or more of i) a game outcome presentation for the game of chance, ii) a gaming maintenance operation, iii) an attract mode feature, iv) a promotional feature, v) casino information, or vi) a bonus game presentation.

4. The method of claim 1, wherein the applying the plurality of typesetting rules comprises justifying the 3-D objects representing the text string.

5. The method of claim 1, wherein the applying the plurality of typesetting rules comprises centering the 3-D objects representing the text string.

6. The method of claim 1, wherein the applying the plurality of typesetting rules comprises adjusting dimensions of strokes in the first texture associated with the first character including changing one or more of pixels or texels in the first texture.

7. The method of claim 1, wherein the applying the plurality of typesetting rules comprises aligning one or more of the 3-D objects representing the text string with a baseline.

8. The method of claim 1, wherein the applying the plurality of typesetting rules comprises positioning the 3-D objects representing the text string along two or more lines.

9. The method of claim 1, wherein the applying the plurality of typesetting rules comprises adjusting a spacing between two or more lines along which the 3-D objects representing the text string are aligned.

10. The method of claim 1, wherein the applying the plurality of typesetting rules comprises adjusting the vertical or horizontal alignment of the 3-D objects representing the text string.

11. The method of claim 1, further comprising scaling the one or more 3-D objects to fit within a boundary defined in the 3-D coordinate system.

12. The method of claim 1, wherein each of the 3-D objects comprise two triangular polygons.

13. The method of claim 1, further comprising rendering the text string in a sequence of images wherein one or more of a shape, a position and an angular orientation of the 3-D objects representing the text string change in the sequence of images.

14. The method of claim 1, wherein the font parameters are one or more of a font name, a font style, a font typeface, a font weight, a font baseline, a font ascent, a font descent, a font slant, a font maximum height, a font maximum width and a number of characters in the font texture.

15. The method of claim 1, wherein the character parameters are one or more of a character height, a character width, a character ascent, a character descent, a character origin, character information for indicating where to place an adjacent character, a character shape or character location coordinates for locating the character in the font texture.

16. The method of claim 1, wherein the font texture comprises a bit map.

* * * * *